US009713039B2

(12) United States Patent
Watfa et al.

(10) Patent No.: US 9,713,039 B2
(45) Date of Patent: Jul. 18, 2017

(54) METHODS, APPARATUS AND SYSTEMS FOR ENABLING MANAGED REMOTE ACCESS

(71) Applicant: InterDigital Patent Holdings, Inc., Wilmington, DE (US)

(72) Inventors: Mahmoud Watfa, Saint Leonard (CA); Saad Ahmad, Montreal (CA); Pascal M Adjakple, Great Neck, NY (US); Ulises Olvera-Hernandez, Kirkland (CA); Behrouz Aghili, Commack, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 84 days.

(21) Appl. No.: 13/626,957

(22) Filed: Sep. 26, 2012

(65) Prior Publication Data

US 2013/0083773 A1    Apr. 4, 2013

Related U.S. Application Data

(60) Provisional application No. 61/541,825, filed on Sep. 30, 2011.

(51) Int. Cl.
*H04Q 7/00* (2006.01)
*H04W 36/00* (2009.01)
*H04W 36/02* (2009.01)
*H04W 84/04* (2009.01)

(52) U.S. Cl.
CPC ........ *H04W 36/0033* (2013.01); *H04W 36/02* (2013.01); *H04W 84/045* (2013.01)

(58) Field of Classification Search
CPC .......... H04W 36/0033; H04W 84/045; H04W 36/02
(Continued)

(56) References Cited

U.S. PATENT DOCUMENTS 8,830,961 B2 * 9/2014 Hori ...................... H04W 36/12
370/331
9,167,413 B2 * 10/2015 Vesterinen ............ H04W 8/082
(Continued)

FOREIGN PATENT DOCUMENTS

| CN | 101217781 | 7/2008 |
|---|---|---|
| CN | 101720119 | 6/2010 |

(Continued)

OTHER PUBLICATIONS

WO2010127683 A1.*

(Continued)

*Primary Examiner* — Chuong T Ho
(74) *Attorney, Agent, or Firm* — Eric Berkowitz

(57) ABSTRACT

Methods, apparatus, and systems are disclosed for handover of a Wireless Transmitter/Receiver Unit (WTRU) moving between a local network and another network. The WTRU established a local IP access (LIPA) session in the local network via a first Access Point (AP). The method includes receiving, by a second AP in the other network, a request to connect to the other network; and transitioning the LIPA session in the local IP network to a managed remote access (MRA) session in the other network. The transitioning includes establishing a path between the first AP and the second AP via a gateway, and informing the gateway of the transition to the MRA session.

14 Claims, 26 Drawing Sheets

(58) Field of Classification Search
USPC .................................................. 370/331, 338
See application file for complete search history.

(56) References Cited

U.S. PATENT DOCUMENTS

| | | | |
|---|---|---|---|
| 2003/0124976 A1* | 7/2003 | Tamaki et al. ................... | 455/15 |
| 2005/0053043 A1* | 3/2005 | Rudolf et al. ................. | 370/337 |
| 2008/0165735 A1* | 7/2008 | Chen et al. .................... | 370/331 |
| 2009/0252133 A1* | 10/2009 | Watanabe ........... | H04W 76/022 370/338 |
| 2010/0172301 A1 | 7/2010 | Watfa et al. | |
| 2010/0272013 A1* | 10/2010 | Horn et al. ................... | 370/328 |
| 2010/0284386 A1* | 11/2010 | Ulupinar ................ | H04W 8/22 370/338 |
| 2011/0014918 A1* | 1/2011 | Padfield et al. ............. | 455/442 |
| 2011/0126016 A1* | 5/2011 | Sun .............................. | 713/171 |
| 2011/0170517 A1 | 7/2011 | Bakker et al. | |
| 2011/0171953 A1 | 7/2011 | Faccin et al. | |
| 2011/0176485 A1 | 7/2011 | Pudney et al. | |
| 2011/0228750 A1 | 9/2011 | Tomici et al. | |
| 2011/0235605 A1* | 9/2011 | Yeoum .................. | H04W 72/04 370/329 |
| 2011/0274087 A1* | 11/2011 | Liang et al. ................... | 370/331 |
| 2012/0020290 A1* | 1/2012 | Kanauchi et al. ............ | 370/328 |
| 2012/0046058 A1* | 2/2012 | Vesterinen ............ | H04W 8/082 455/509 |
| 2012/0076121 A1* | 3/2012 | Choi et al. .................... | 370/338 |
| 2012/0207137 A1* | 8/2012 | Zhou et al. .................... | 370/331 |
| 2013/0003697 A1* | 1/2013 | Adjakple .......... | H04W 36/0011 370/331 |
| 2013/0003698 A1* | 1/2013 | Olvera-Hernandez ............ | H04W 8/082 370/331 |
| 2013/0230024 A1 | 9/2013 | Lim et al. | |
| 2013/0308527 A1 | 11/2013 | Chin et al. | |

FOREIGN PATENT DOCUMENTS

| | | | |
|---|---|---|---|
| CN | 101841886 | | 9/2010 |
| JP | 2007-150424 | | 6/2007 |
| WO | WO-2008/148432 | | 12/2008 |
| WO | WO-2009/139575 | | 11/2009 |
| WO | WO-2010/127437 | | 11/2010 |
| WO | WO2011118196 | * | 9/2011 |
| WO | WO-2012/066759 | | 5/2012 |

OTHER PUBLICATIONS

"3rd Generation Partnership Project; Technical Specification Group, Services and System Aspects; Local IP Access and Selected IP Traffic Offload (LIPA-SIPTO) (Release 10)", 3GPP TR 23.829 V10.0.0, Mar. 2011, 43 pages.

"3rd Generation Partnership Project; Technical Specification Group, Services and System Aspects; 3GPP System Architecture Evolution; GPRS enhancements for LTE access; Release 8", 3GPP TS 23.401, Dec. 2006, 8 Pages.

"3rd Generation Partnership Project; Technical Specification Group Core Network and Terminals; Access to the 3GPPEvolved Package Core (EPC) via non-3GPP access networks; Stage 3 (Release 10)", 3GPP TS 24.302 V10.4.0, Jun. 2011, 58 pages.

"3rd Generation Partnership Project; Technical Specification Group Radio Access Network; Evolved Universal Terrestrial Radio Access Network (E-UTRAN); S1 Application Protocol (S1AP) (Release 10)", 3GPP TS 36.413 V10.1.0, Mar. 2011, 256 pages.

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT)", 3GPP TS 37.320 V10.2.0, Jun. 2011, 17 pages.

"3rd Generation Partnership Project; Technical Specification Group Services and System Aspects; General Packet Radio Services (GPRS); Service Description Stage 2 (Release 10)", 3GPP TS 23.060 V10.3.0, Mar. 2011, 320 pages.

"3rd Generation Partnership Project; Technical Specification Group Services and System Aspects; LIPA Mobility and SIPTO at the Local Network; (Release 11)", 3GPP TR 23.859 V0.2.0, Apr. 2011, 15 Pages.

"3rd Generation Partnership Project; Technical Specification Group TSG SA; Study on Continuity of Data Sessions to Local Networks (Release 11)", 3GPP TR 22.896 V1.0.1, Sep. 2011, 13 pages.

"International Search Report and Written Opinion", International Application No. PCT/US2012/057239, Feb. 4, 2013, 20 pages.

"LIPA Mobility and SIPTO at the Local Network", 3GPP TR 23.859 V0.4.0, Jul. 2011, 55 Pages.

"Solving the problem of PLMN mismatch in Kasme", 3GPP TSG SA WG2 Meeting#77; TD S2-100705; Jan. 18-22, 2010, Shenzhen, China, 2 pages.

Ericsson, et al., "Introducing support for relaying for E-UTRAN", 3GPP TSG-SA WG2 Meeting #83, S211170; Feb. 2011, Salt Lake City (US), 7 Pages.

LG Electronics, et al., "Inter-H(e)NB Mobility via user plane tromboning", 3GPP TSG SA WG2 Meeting #80; TD S2-103513; Aug. 30-Sep. 3, 2010, Brunstad, Norway, 4 Pages.

ZTE, "Comparison of stand-alone L-GW solution with Sxx interface", 3GPP TSG SA WG2 Meeting #83, TD S2-100514; Feb. 21-25, 2011, Salt Lake City, USA, 9 pages.

"3rd Generation Partnership Project; Technical Specification Group Services and System Aspects; LIPA Mobility and SIPTO at the Local Network; (Release 11)", 3GPP TR 23.859 V0.4.0 (with Marking to show version of 3GPP TR 23.859 V0.3.0), Jun. 2011-Jul. 2011, 56 pages.

"3rd Generation Partnership Project; Technical Specification Group TSG SA; Study on Continuity of Data Sessions to Local Networks (Release 11)", 3GPP TR 22.896 V0.2.2, Feb. 2011, 12 pages.

NEC, "Architectural Requirements for SIPTO for the local network", 3GPP Tdoc S2-111270; 3GPP TSG SA WG2 Meeting #83, Salt Lake City, Utah, USA, Feb. 21-25, 2011, 5 pages.

"3rd Generation Partnership Project; Functions related to Mobile radio interface Layer 3 specification; Core network protocols; Stage 3 (Release 10)", 3GPP TS 24.008 V10.1.0, Dec. 2010, 625 pages.

"3rd Generation Partnership Project; Technical Specification Group Core Network and Terminals; Non-Access-Stratum (NAS) protocol for Evolved Packet System (EPS); Stage 3 (Release 10)", 3GPP TS 24.301 V10.1.0, Dec. 2010, 305 pages.

"3rd Generation Partnership Project; Technical Specification Group Services and System Aspects; Circuit Switched (CS) fallback in Evolved Packet System (EPS); Stage 2 (Release 9)", 3GPP TS 23.272 V9.6.0, Dec. 2010, 74 pages.

"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP TS 23.401 V10.1.0, Sep. 2010, 271 pages.

"3rd Generation Partnership Project; Technical Specification Group Services and System Aspects; Local IP Access and Selected IP Traffic Offload (Release 10)", 3GPP 23.829 V1.3.0, Sep. 2010, 44 pages.

"International Search Report and Written Opinion", International Patent Application No. PCT/US2012/021014, Mar. 20, 2012, 17 pages.

"Japanese Notice of Rejection", Japanese Application No. 2013-549533, Nov. 4, 2015, 4 pages.

"Japanese Notice of Rejection (English Translation)", Japanese Application No. 2013-549533, Nov. 4, 2015, 4 pages.

"Patent Abstract of JP 2007-150424", Jun. 14, 2007, 2 pages.

"Taiwanese Office Action", Taiwanese Application No. 101101226, Feb. 25, 2016, 8 pages.

"Taiwanese Office Action (English Translation)", Taiwanese Application No. 101101226, Feb. 25, 2016, 5 pages.

"United States Final Office Action", U.S. Appl. No. 13/348,712, Dec. 3, 2013, 18 Pages.

"United States Office Action", U.S. Appl. No. 13/348,712, Jul. 16, 2013, 17 pages.

(56) References Cited

OTHER PUBLICATIONS

"United States Office Action", U.S. Appl. No. 13/348,712, Apr. 6, 2015, 22 pages.

"United States Office Action", U.S. Appl. No. 13/348,712, May 21, 2014, 23 pages.

Alcatel-Lucent, et al., "Correction to LIPA deactivation", Change Request for 23.401 (CR 1911) 3GPP TSG SA WG2 Meeting #82, Jacksonville, Florida, USA, S2-106008, Nov. 15-19, 2010, 22 pages.

NEC, et al., "Discussion on LIPA mobility", 3GPP TSG-SA WG1 Meeting #52, La Valetta, Malta, S1-103039, Oct. 28, 2010, 5 pages.

Samsung, "Suspending EPS bearers", 3GPP SA WG2 Meeting #64b adhoc, Prague, Czech Republic, TD S2-084145, May 7, 2008, 5 pages.

Vodafone, et al., "Mobility/Continuity Aspects for LIPA", 3GPP TSG-SA WG1 Meeting #51, Seoul, South Korea, S1-102086, Aug. 16, 2010, 1 page.

"Chinese Office Action", Chinese Application No. 201280005444.3, Mar. 28, 2016, 13 pages.

"Chinese Office Action (English Translation)", Chinese Application No. 201280005444.3, Mar. 28, 2016, 9 pages.

"English Abstract of CN101720119", Jun. 2, 2010, 1 page.

"English Abstract of CN101841886", Sep. 22, 2010, 1 pages.

SA WG2, "New WID: LIPA Mobility and SIPTO at the Local Network", 3GPP Tdoc SP-100705; TSG SA Meeting #50, Istambul, Turkey, Dec. 13-15, 2010, 6 pages.

"Chinese Office Action", Chinese Application No. 201280048144.3, Mar. 2, 2017, 5 pages.

"Japanese Notice of Allowance", Japanese Application No. 2014-533669, Mar. 28, 2017, 3 pages.

Nokia Siemens Networks, et al. "Local GW functionality for LIPA and related control functionality", 3GPP Tdoc S2-093507, 3GPP TSG-SA WG2 Meeting #73, Tallinn, Estonia, May 15, 2009, 6 pages.

Alcatel-Lucent, "key issue #L4: LIPA deactivation", 3GPP Tdoc S2-113244; SA WG2 Meeting #86, Naantali, Finland, Jul. 11-15, 2011, 6 pages.

\* cited by examiner

| REMOTE H(e)NB'S HOSTING PARTY ACCESS CREDENTIAL IN THAT H(e)NB | | | | | |
|---|---|---|---|---|---|
| | | CSG access Y, LIPA Y, MRA N | CSG access Y, LIPA Y, MRA Y | CSG Access Y, LIPA N, MRA N, | CSG Access Y, LIPA N, MRA Y |
| MRA remote user access credential in the H(e)NB being remotely access | CSG access Y, LIPA Y, MRA N | | | | |
| | CSG access Y, LIPA Y, MRA Y | | | | |
| | CSG Access Y, LIPA N, MRA N, | | | | |
| | CSG Access Y, LIPA N, MRA Y | | | | |
| Legend | | Possible access right scenarios | | | |
| | | Unlikely access right scenerios | | | |

FIG. 17

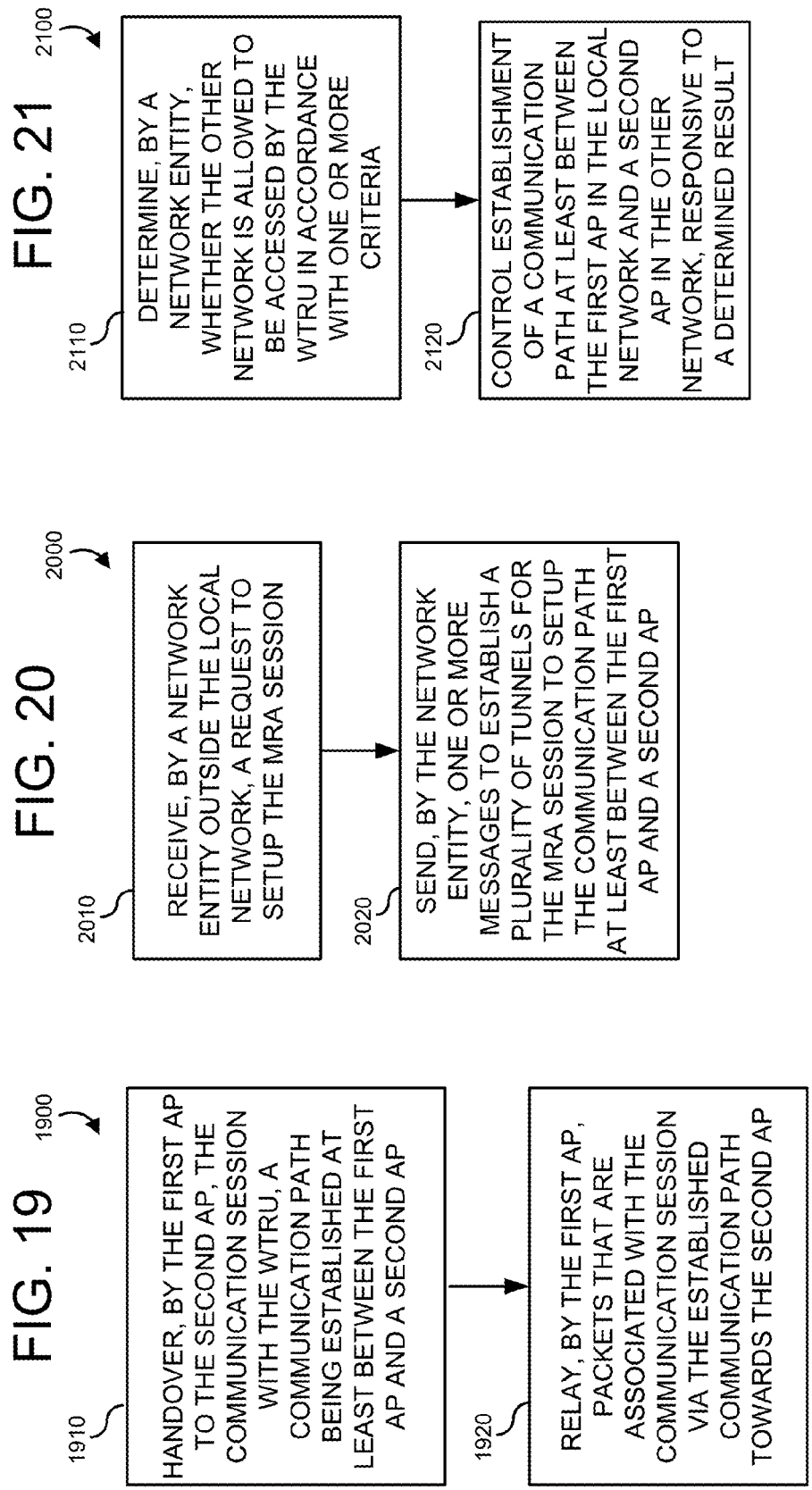

FIG. 22 2200

2210 — RECEIVE, BY A SECOND AP IN THE OTHER NETWORK, A REQUEST TO CONNECT TO THE OTHER NETWORK

↓

2220 — TRANSITION THE LIPA SESSION IN THE LOCAL NETWORK TO A MANAGED REMOTE ACCESS (MRA) SESSION IN THE OTHER NETWORK

FIG. 23 2300

2310 — RELAY, BY THE FIRST AP, PACKETS THAT ARE ASSOCIATED WITH THE COMMUNICATION SESSION VIA THE ESTABLISHED COMMUNICATION PATH TOWARDS THE SECOND AP

↓

2320 — ESTABLISH AT LEAST ONE RADIO BEARER BETWEEN THE FIRST AP AND THE WTRU

↓

2330 — TRANSITION THE MRA SESSION BETWEEN THE SECOND AP AND THE WTRU IN THE OTHER NETWORK TO A LOCAL IP ACCESS (LIPA) SESSION IN THE LOCAL NETWORK USING THE ESTABLISHED AT LEAST ONE RADIO BEARER BETWEEN THE FIRST AP AND THE WTRU

FIG. 24 2400

2410 — RECEIVE, BY A NETWORK ENTITY OUTSIDE THE LOCAL NETWORK, A REQUEST TO SETUP THE LIPA SESSION

↓

2420 — SEND, BY THE NETWORK ENTITY, ONE OR MORE MESSAGES TO DISCONTINUE AT LEAST A FIRST TUNNEL BETWEEN A GATEWAY AND THE FIRST AP IN THE LOCAL NETWORK AND A SECOND TUNNEL BETWEEN THE GATEWAY AND THE SECOND AP IN THE LOCAL NETWORK OR THE OTHER NETWORK

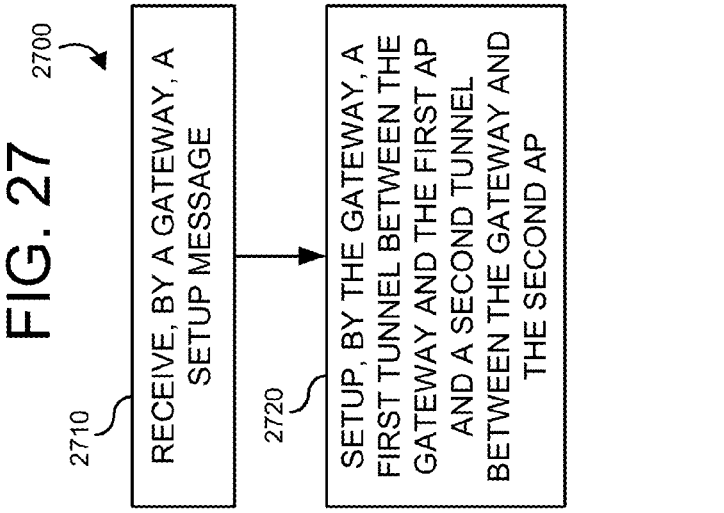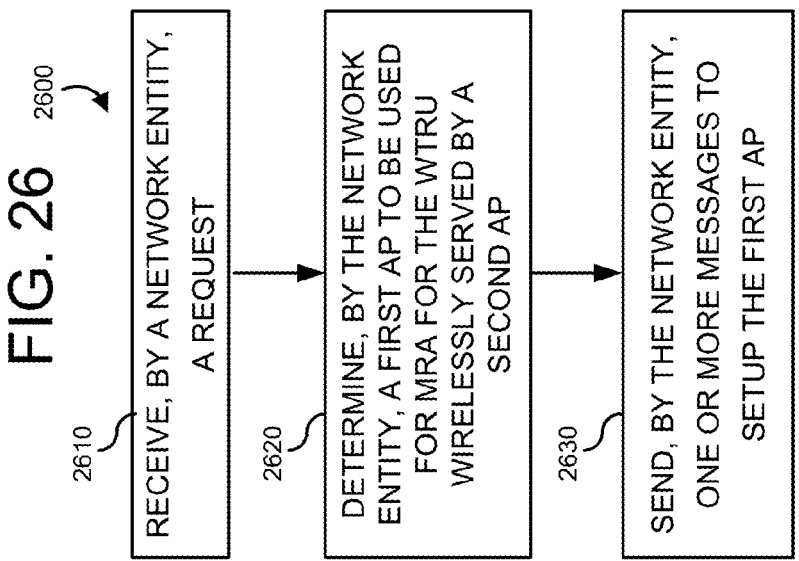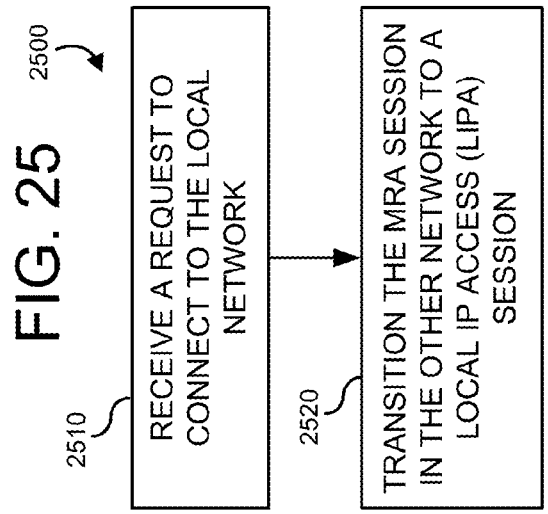

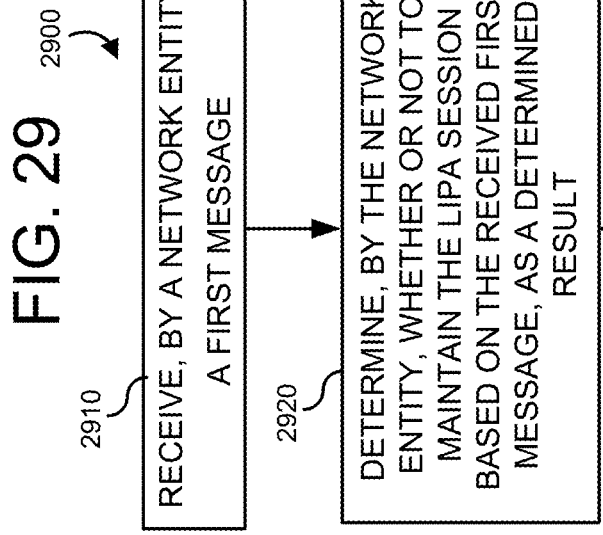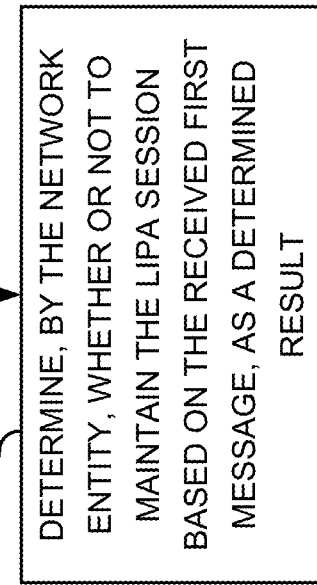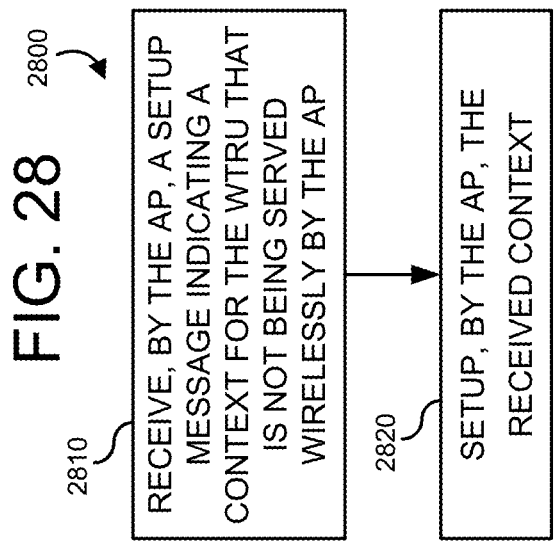

METHODS, APPARATUS AND SYSTEMS FOR ENABLING MANAGED REMOTE ACCESS

CROSS REFERENCE TO RELATED APPLICATIONS

This application claims priority from U.S. Provisional Application No. 61/541,825, filed on Sep. 30, 2011, the contents of which are incorporated by reference herein.

FIELD OF INVENTION

The field of this invention relates to wireless communications and, more particularly, methods, apparatus and systems for enabling managed remote access.

BACKGROUND OF THE INVENTION

LIPA (local IP access) may provide an IP connection to a local network (LN) using radio access of a Home eNode B and/or a Home Node B (e.g., referred to as H(e)NB).

SUMMARY

Embodiments of the disclosure are directed to methods, apparatus, and systems for handover of a Wireless Transmitter/Receiver Unit (WTRU) moving between a LN and another network. The WTRU may have established a local IP access (LIPA) session in the LN via a first Access Point (AP). The method may include receiving, by a second AP in the other network, a request to connect to the other network; and transitioning the LIPA session in the local IP network to a managed remote access (MRA) session in the other network. The transitioning may include establishing a path between the first AP and the second AP via a gateway, and informing the gateway of the transition to the MRA session.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein:

FIG. 17 is a diagram illustrating representative access control scenarios;

FIG. 19 is a flow chart illustrating a representative handover method;

FIG. 20 is a flow chart illustrating a representative setup method;

FIG. 21 is a flow chart illustrating another representative handover method;

FIG. 22 is a flow chart illustrating a further representative handover method;

FIG. 23 is a flow chart illustrating an additional representative handover method;

FIG. 24 is a flow chart illustrating a representative termination method; and

FIG. 25 is a flow chart illustrating yet another representative handover method;

FIG. 26 is a flow chart illustrating a representative selection method;

FIG. 27 is a flow chart illustrating a representative setup method;

FIG. 28 is a flow chart illustrating a representative setup method; and

FIG. 29 is a flow chart illustrating a representative method.

DETAILED DESCRIPTION

Although the detailed description is illustrated and described herein with reference to specific embodiments, the invention is not intended to be limited to the details shown. Rather, various modifications may be made in the details within the scope and range of equivalents of the claims and without departing from the invention.

Figure 1A:
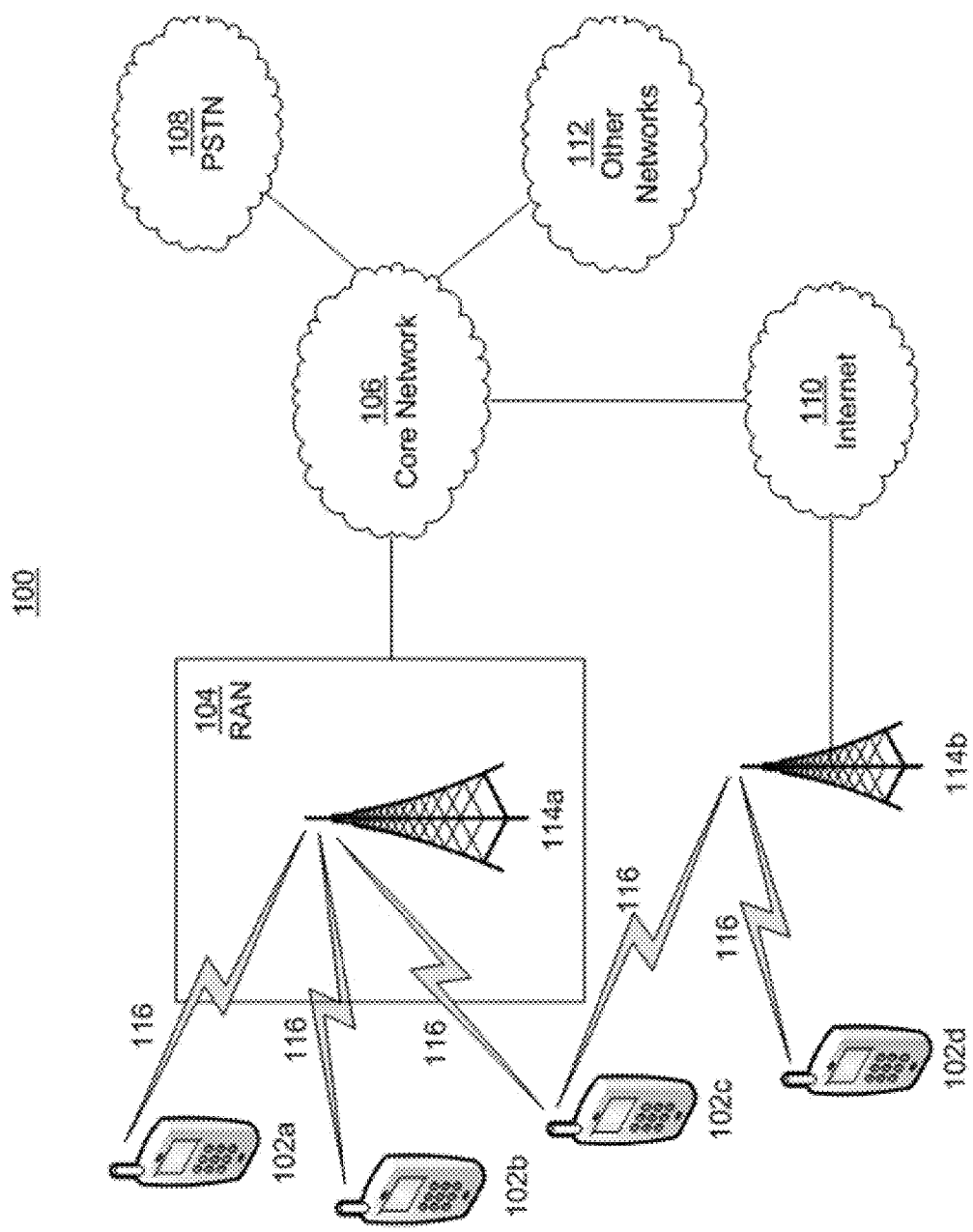
FIG. 1A is a diagram illustrating a representative communication system in which one or more disclosed embodiments may be implemented.

FIG. 1A is a diagram of a representative communications system 100 in which one or more disclosed embodiments may be implemented. The communications system 100 may be a multiple access system that provides content, such as, data, video, messaging, broadcast, etc., to multiple wireless users. The communications system 100 may enable multiple users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communication system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communication systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communication system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunication System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communication system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
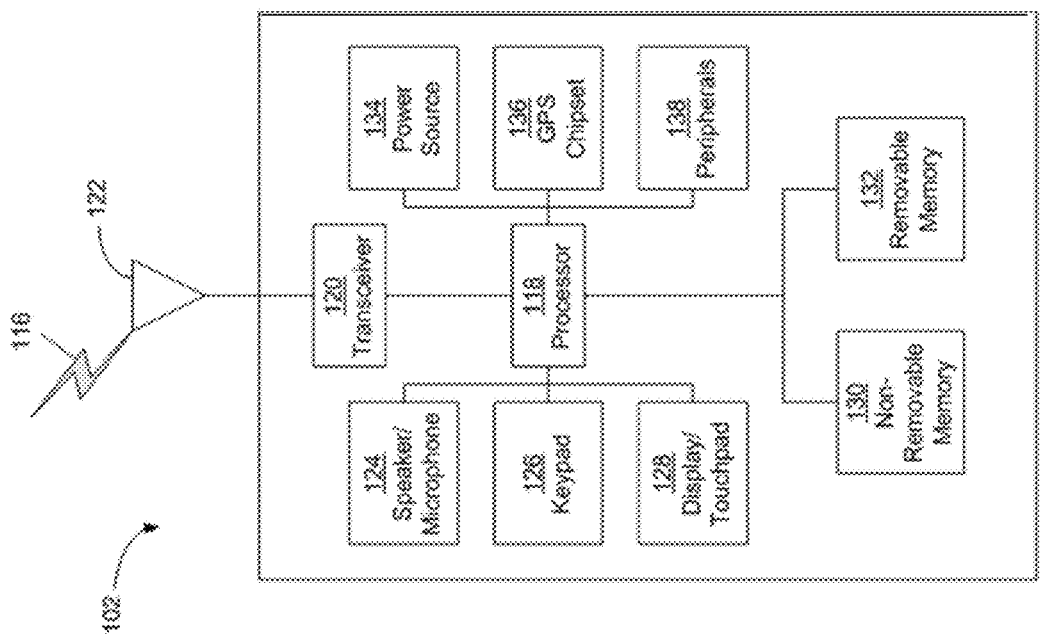
FIG. 1B is a diagram illustrating a representative wireless transmit/receive unit (WTRU) that may be used within the communication system illustrated in FIG. 1A.

FIG. 1B is a system diagram of a representative WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
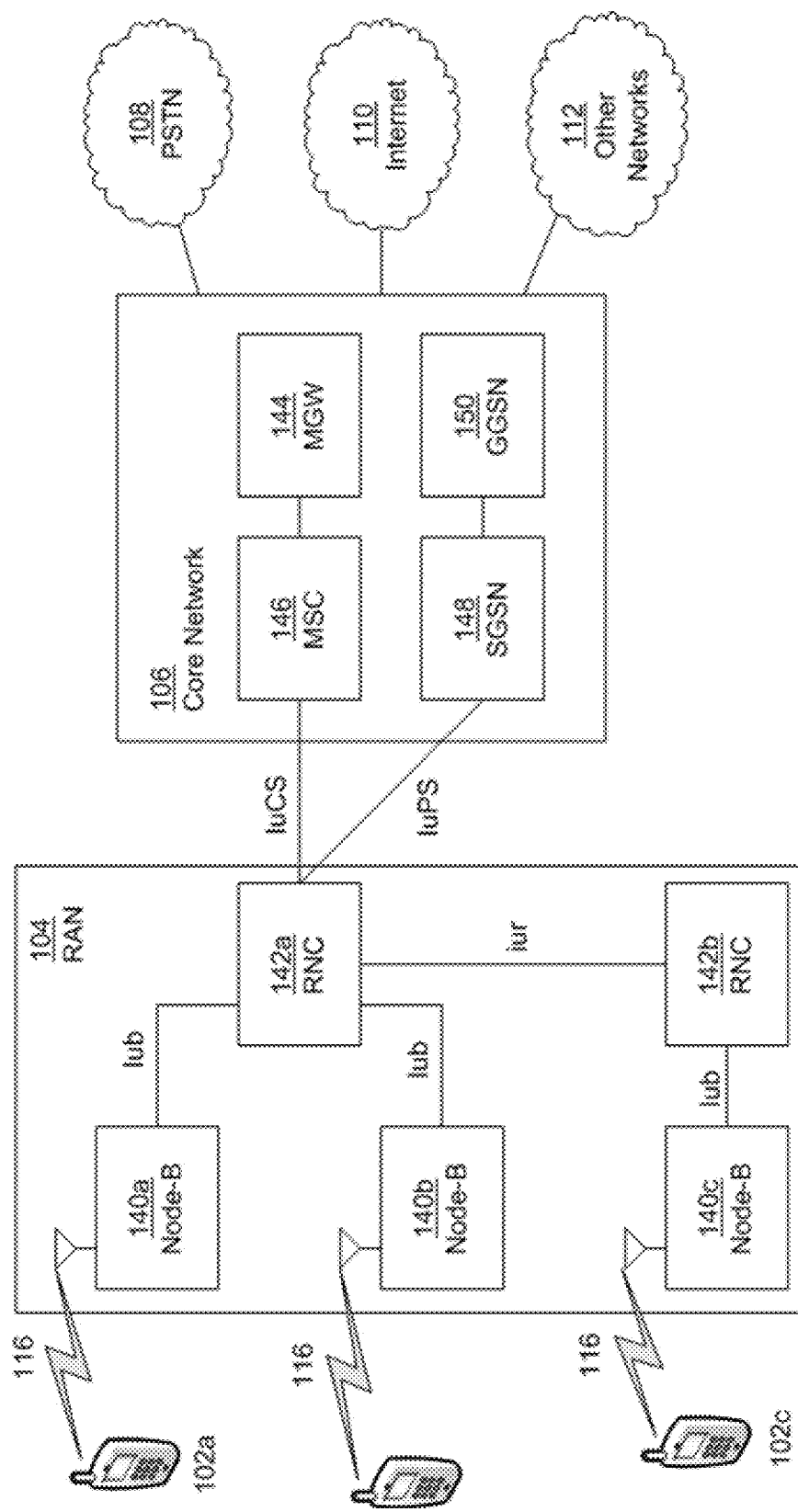
FIGS. 1C, 1D, and 1E are system diagrams of representative radio access networks and representative core networks that may be used within the communication system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, and 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
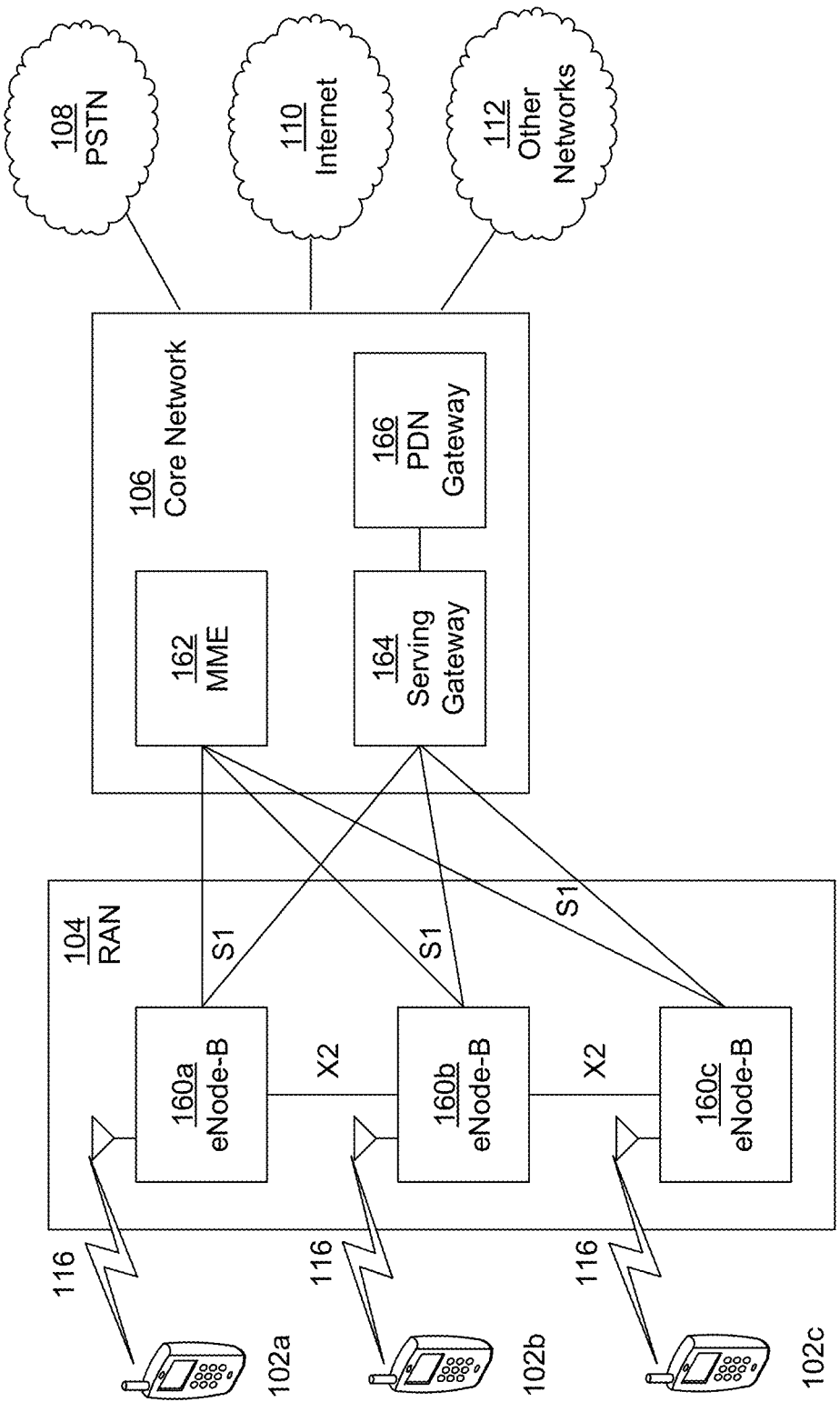

FIG. 1D is a system diagram of the RAN 104 and the core network 106 according to another embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 106 shown in FIG. 1D may include a mobility management gateway (MME) 162, a serving gateway (SGW) 164, and a packet data network (PDN) gateway (PGW) 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, and 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, and 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
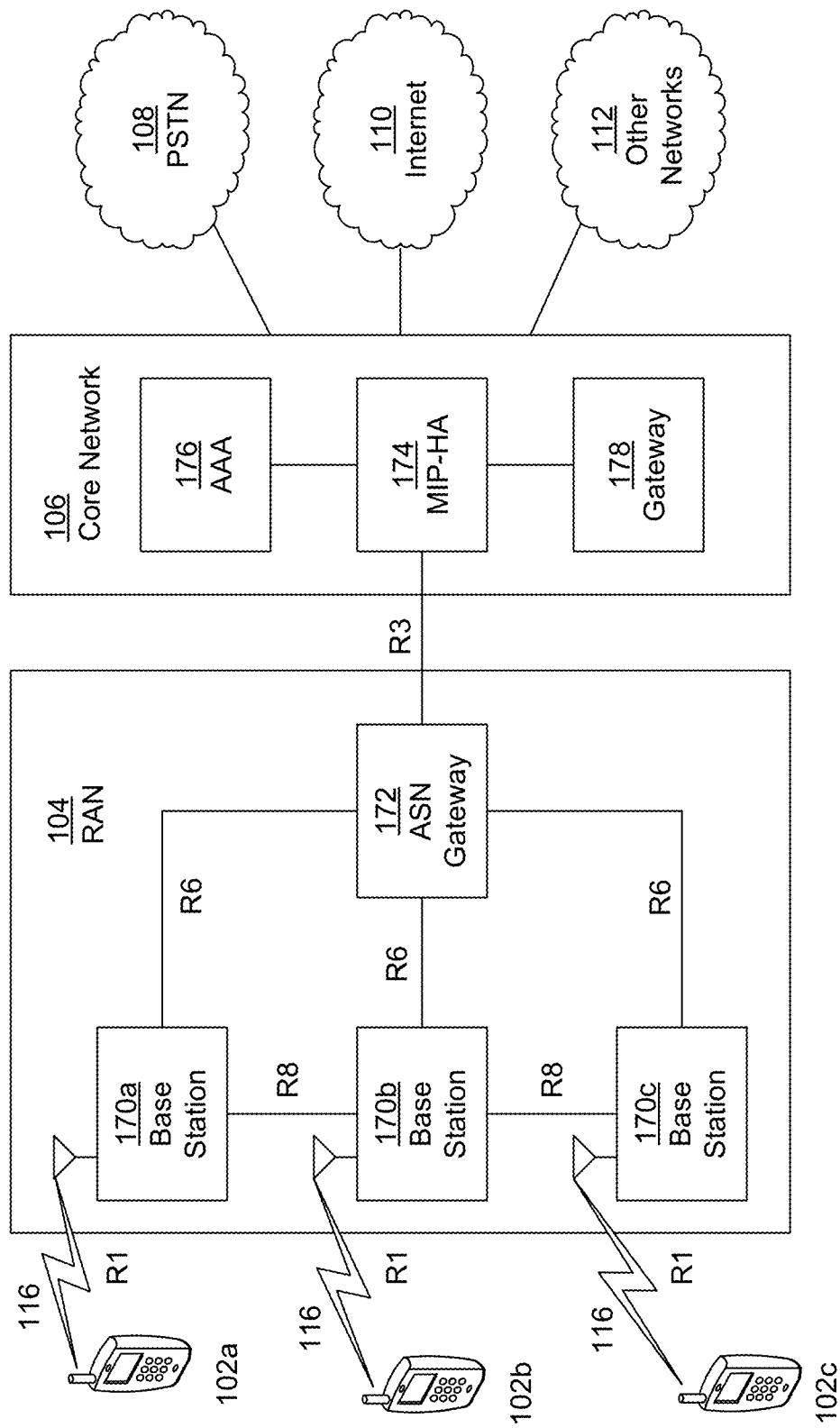

FIG. 1E is a system diagram of the RAN 104 and the core network 106 according to another embodiment. The RAN 104 may be an access service network (ASN) that employs IEEE 802.16 radio technology to communicate with the WTRUs 102a, 102b, and 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, and 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, and 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, and 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, and 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, and 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

A mobile user may choose from a wide range of technologies to access networks such as GPRS, EDGE, 3G and/or 4G for wide area access, and/or WiFi for local area access. Mobile hosts are increasingly becoming multi-homed (e.g., connected via multiple access technologies and/or multi-access points) and may possess two or more heterogeneous interfaces. Internet content is being increasingly distributed (e.g., over a "cloud") such that content delivery is becoming more complex (e.g., to get the right content from the right location).

In certain representative embodiments, a multi-homed wireless device (e.g., a mobile host, mobile device, netbook and/or WTRU 102, among others) may access or receive (e.g., efficiently access or receive) content (e.g., internet-based content).

In certain representative embodiments, a multi-homed mobile host may use (e.g., may fully utilize) a subset or all of the available interfaces (e.g., wireless and/or wired) to send content or to receive content (e.g., efficiently receive content).

Although the receiver is described in FIGS. 1A-1E as a wireless terminal, it is contemplated that in certain representative embodiments that such a terminal may use wired communication interfaces with the communication network.

Figure 2:
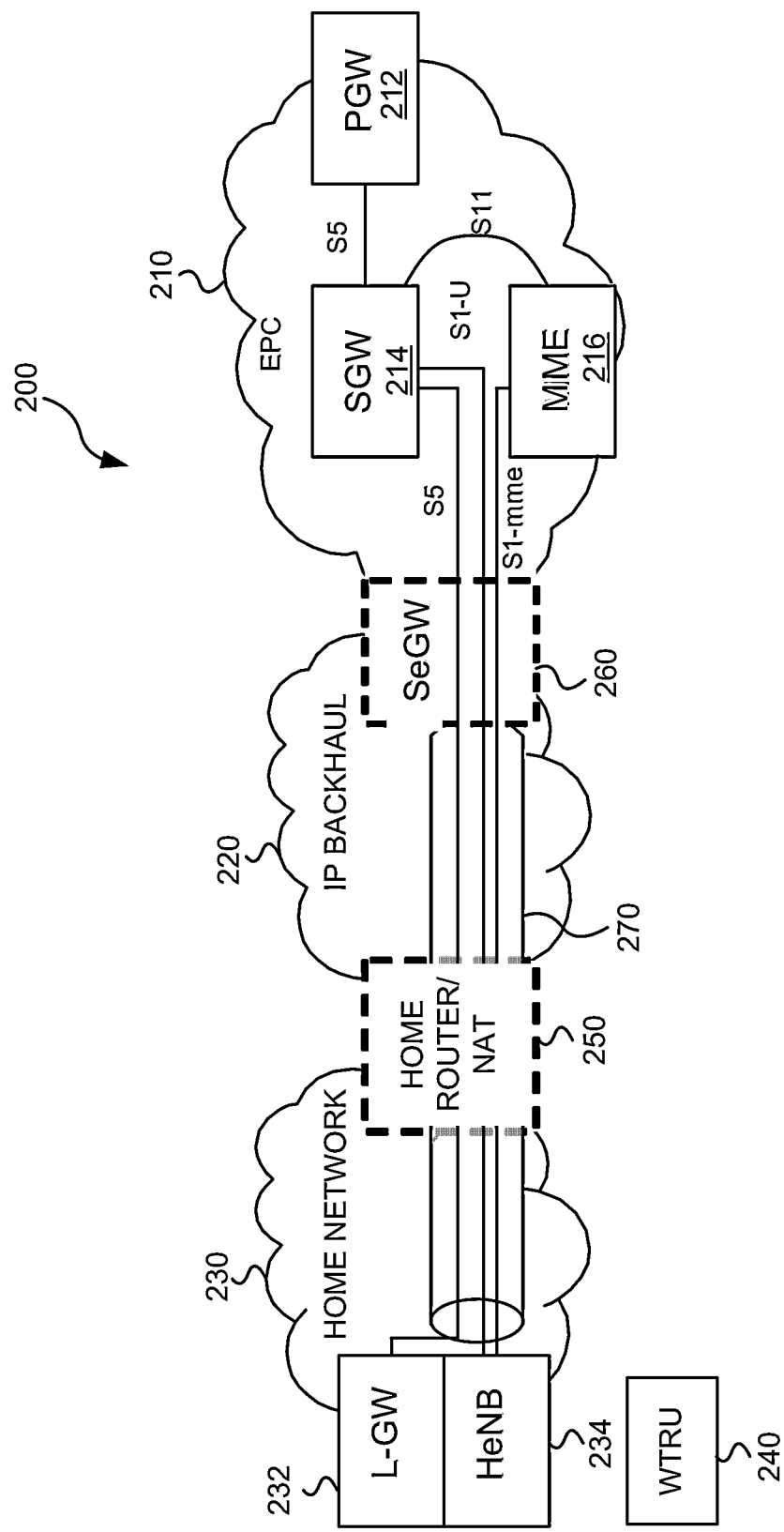
FIG. 2 is a diagram illustrating a representative communication system similar to that of FIG. 1D.

FIG. 2 is a diagram illustrating a representative communication system 200 similar to that of FIG. 1D in which the L-GW may be collocated with the Home evolved NodeB (HeNB).

Referring to FIG. 2, the representative communication system 200 may include an Evolved Packet Core (EPC) 210 (e.g., 3GPP Evolved Packet Core), an IP backhaul 220 and/or a home network 230, among others. The EPC 210 may include a PGW 212, an SGW 214 and a MME 216. The home network may include a local gateway LGW 232 and a Home eNB 234. A Security Gateway (SeGW) may provide security and/or authentication functions between the EPC 210 and, for example, home network 230. A home router (HR) and/or network address translator (NAT) HR/NAT 250 may act or operate as a router for packets traversing to or from the LGW 232 and/or HeNB 234. The HR/NAT 250, for example, may hide the IP address space of the home network (e.g., private IP addresses) behind a single IP address (or a group of IP addresses) and may include a Network Address Table for routing IP packets to the private IP addresses of the LGW 232 and/or HeNB 234.

The SeGW 260 may act or operate as a first endpoint (e.g., corresponding to a first IP address) of a tunnel 270 and the home network (e.g., the HR/NAT 250 or other device in the home network 230) may act or operate as a second endpoint (e.g., corresponding to a second IP address) of the tunnel 270. The WTRU 102 may communicate (e.g., wirelessly communicate) with the HeNB 234.

The PGW 212 may be coupled (e.g., connected) via an S5 interface to the SGW 214 and the SGW 214 may be coupled (e.g., connected) via an S11 interface to the MME 216. The MME 216 of the EPC 210 may couple (e.g., connect) with the HeNB 234 via a S1-mme interface via the SeGW 260 and HR/NAT 250. The SGW 214 of the EPC 210 may couple (e.g., connect) with the HeNB 234 via a S1-U interface via the SeGW 260 and HR/NAT 250 and may couple (e.g., connect) with the LGW 232 via a S5 interface via the SeGW 260 and HR/NAT 250.

In certain representative embodiments, a MRA connection setup may be used in which an Access Point (AP) (e.g., a HNB or a HeNB, among others) may be selected for the MRA and data may go (e.g., traverse) via the selected AP.

In certain representative embodiments, the procedure may setup the context at the AP (e.g., a HNB or HeNB) such that no radio resource may be active and resources (e.g., only resources) towards the SGW 214 and the LGW 232 may be active.

In certain representative embodiments, a handover (HO) may be initiated between a MRA and a LIPA in either direction based on the movement of the WTRU 102. For the LIPA to the MRA, after the HO, radio resources (e.g., only radio resources) may be released at the source AP (e.g., the HNB or the HeNB) while resources with the LGW 232 and the SGW 214 may be maintained. The data path for MRA may be changed to go (e.g., traverse) via the SGW 214. Representative examples of triggers that may be used to initiate the change may include: (1) idle mode mobility, which may have different handling of MRA/LIPA transitions based on whether the WTRU 102 is performing signaling procedure or procedures associated with user data; and/or (2) MRA access checks, among others.

Access to a local IP network may be achieved by the use of the LGW that may have similar functions to those of a PGW (or GGSN).

Although HeNBs are used herein to describe APs, other access point technologies may be used such as HNB (UTRAN), for example. The terms H(e)NB, HeNB or HNB may be interchangeable through the specification and may define a Home Node B and/or a Home eNode B.

The LGW 232 may be collocated at or with the HeNB 234. Since the LGW 232 may be collocated with the HeNB 234, if a WTRU 102 moves out of the coverage of the HeNB 234 (e.g., in either idle or connected mode) the LIPA connection may be deactivated. For a WTRU 102 in connected mode, which is about to perform handover (HO) to another cell, the HeNB 232 may first inform the LGW 232 about the HO so that the latter deactivates the LIPA PDN connection. After (e.g., only after) the LIPA PDN connection is deactivated, may the WTRU 102 be handed over to another cell. During the HO, if the MME 216 determines that the LIPA bearer/PDN connection is no deactivated, the MME 216 may reject the HO.

Figure 3:
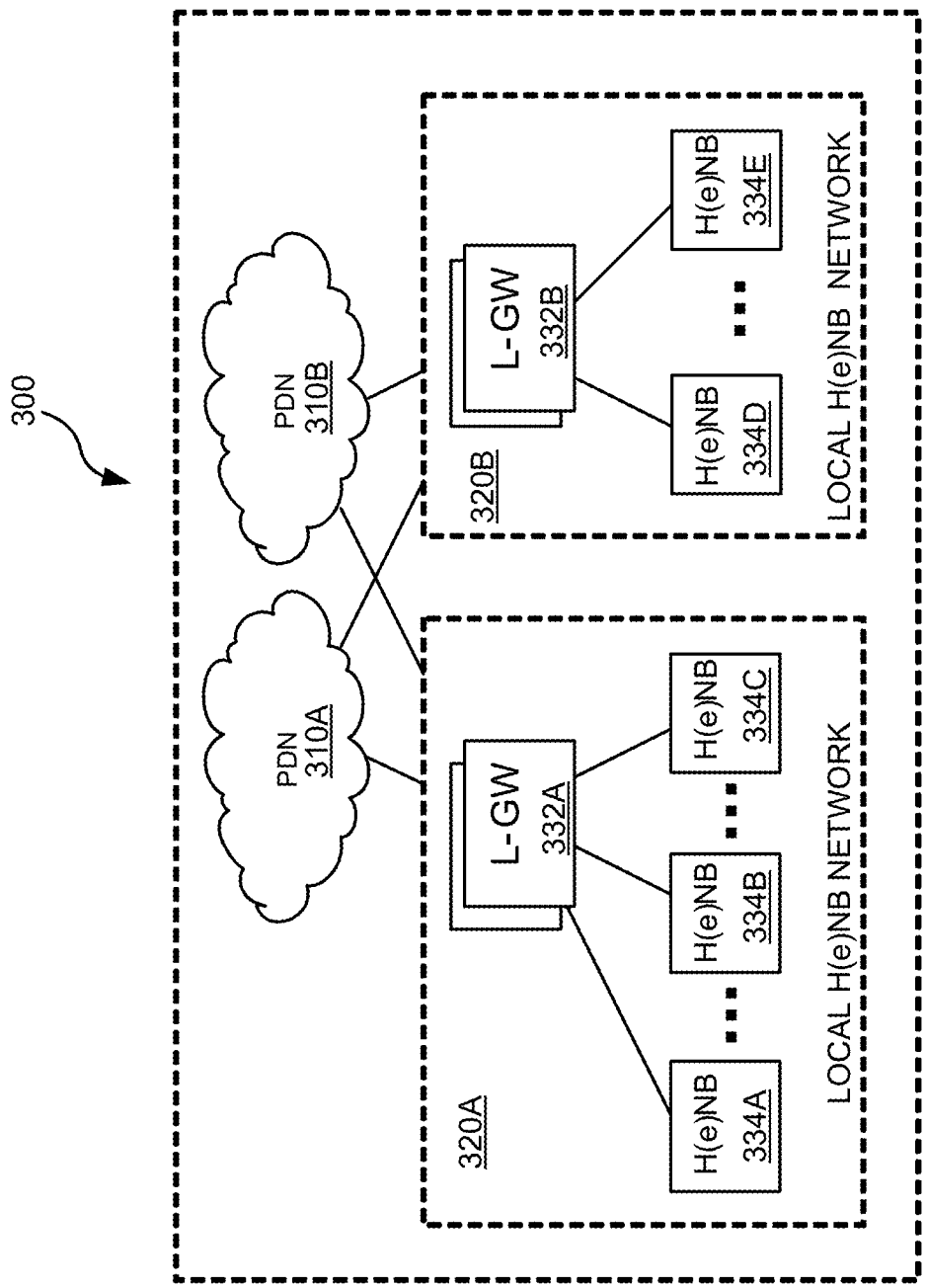
FIG. 3 is a diagram illustrating another representative communication system including a plurality of local gateways (LGWs) each with respective H(e)NBs.
Figure 4:
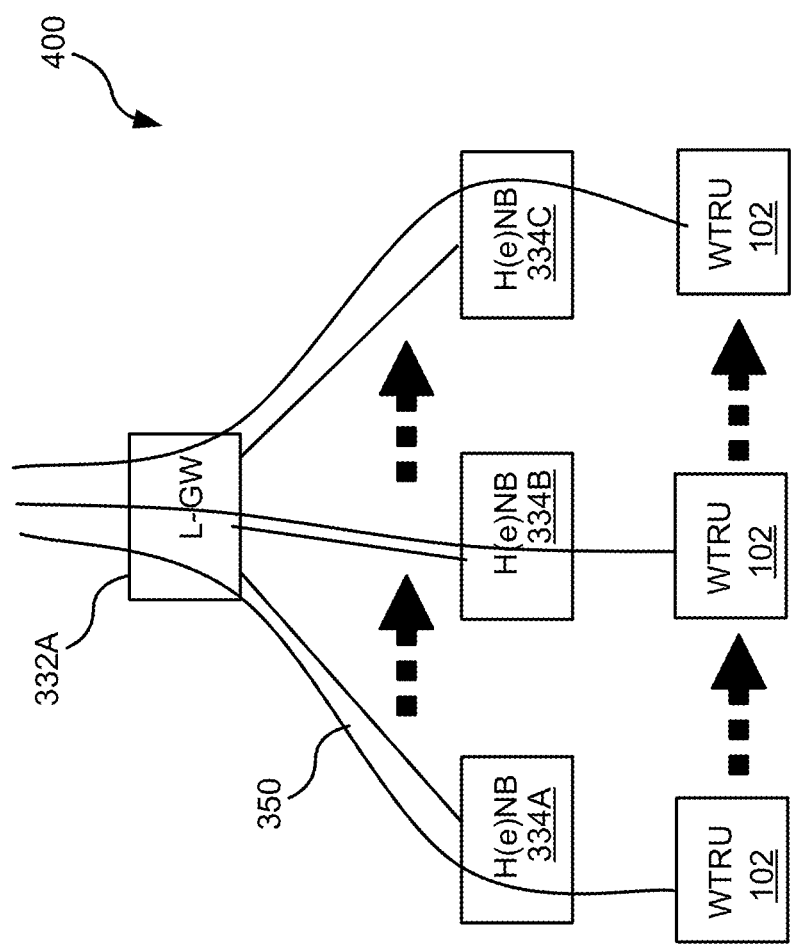
FIG. 4 is a diagram illustrating a portion of the representative communication system of FIG. 3 with a WTRU moving and connecting to (e.g., accessing the system via) different respective H(e)NBs along a movement path.

FIG. 3 is a diagram illustrating another representative communication system 300 including a plurality of LGWs 332, each with respective HeNBs 334. FIG. 4 is a diagram illustrating a portion of the representative communication system of FIG. 3 with a WTRU 102 moving and connecting to (e.g., accessing the system via) different respective HeNBs 334 along a movement pat (e.g., the WTRU 102 may move between different HeNBs connected to same L-GW).

Referring to FIG. 3, a representative communication system 300 may include a plurality of Pack Data Networks 310A and 310B and a plurality of local HeNB networks 320A and 320B connected to the plurality of Packet Data Networks 310A and 310B via interfaces. Local HeNB network 320A may include LGW 332A and one or more HeNBs 334A, 334B and 334C coupled (e.g., connected) to the LGW 332A. Local HeNB network 320B may include LGW 332B and one or more HeNBs 334D and 334E coupled (e.g., connected) to the LGW 332B.

Referring to FIG. 4, the WTRU 102 may move between HeNBs 334A, 334B and 334C along a movement path denoted by the arrows. To allow continuity of a LIPA PDN connection 350 as the WTRU 102 moves between HeNBs 334A, 334B and 334C of Local HeNB network 320A, the LGW 332A may be remote or separated from the HeNBs 334A, 334B and 334C. Multiple HeNBs may connect to the same LGW such that the WTRU 102 with a LIPA PDN connection 350 may move across these HeNBs (referred to as HeNB subsystem) 334 while maintaining its LIPA PDN connection 350.

It is contemplated that, if a WTRU 102 moves out of the HeNB subsystem 334 altogether (e.g., moves out of coverage of all the HeNBs 334A, 334B and 334C that connect to a LGW 332A), the WTRU's PDN connection 350 for LIPA may be deactivated.

Figure 5:
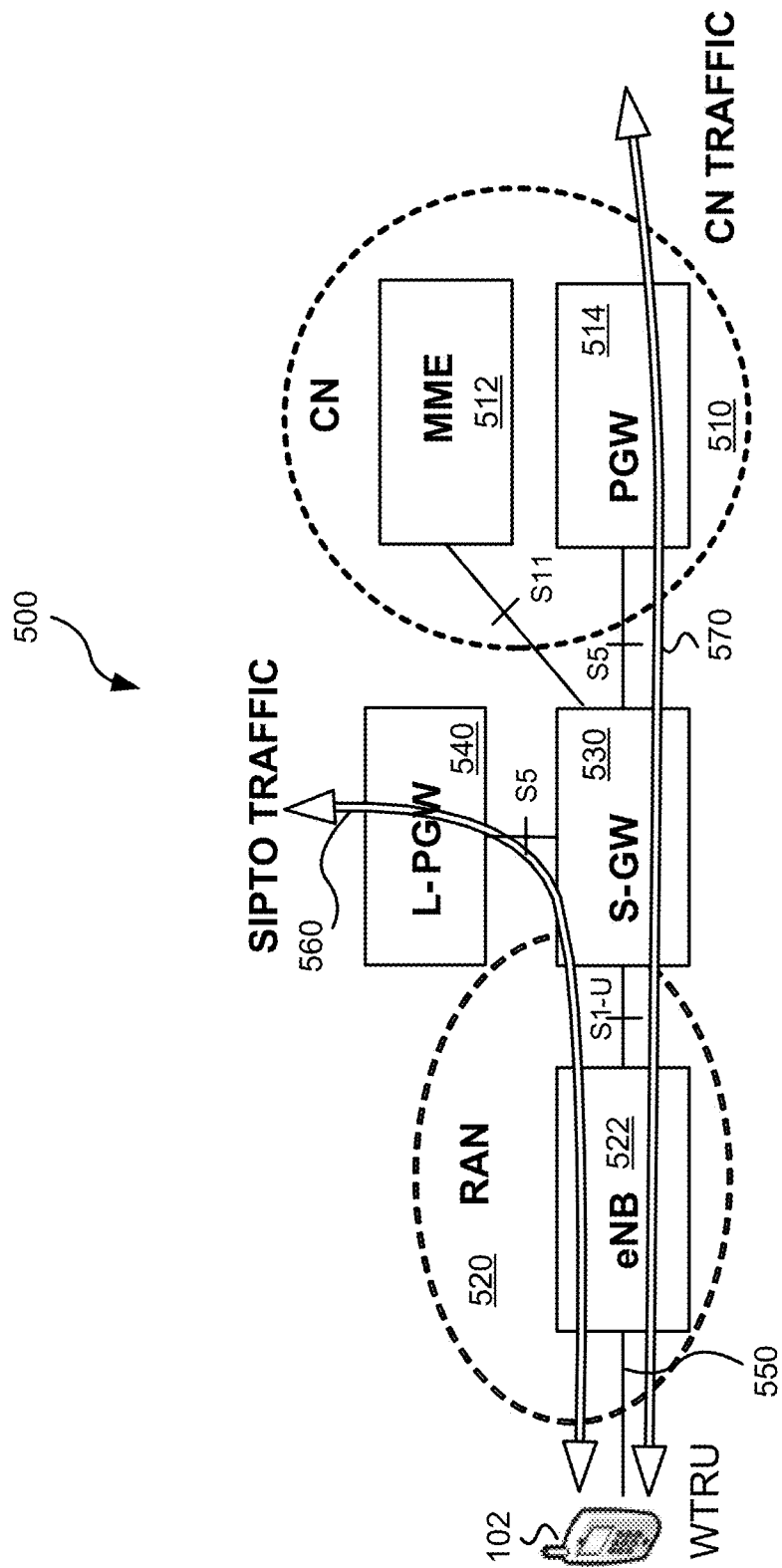
FIG. 5 is a diagram illustrating selected IP Traffic Offload (SIPTO)

FIG. 5 is a diagram illustrating Selected IP Traffic Offload (SIPTO) using a representative communication system 500.

Referring to FIG. 5, the representative communication system 500 may include a core network (CN) 510 and a radio access network (RAN) 520. The CN 510 may include an MME 512 and a PGW 514. The RAN 520 may include an AP 522 (e.g., an eNB or other AP). A SGW 530 and a local PGW (L-PGW) 540 may be located at the RAN 520 (e.g., local to the RAN 520 or operationally before the CN 510. The WTRU 102 may communicate with the AP 522.

The PGW 514 may be coupled (e.g., connected) via an S5 interface to the SGW 530 and the MME 512 may be coupled (e.g., connected) via an S11 interface to the SGW 530. The SGW 530 may be coupled (e.g., connect) to the AP 522 via a S1-U interface and may be coupled (e.g., connect) with the L-PGW 540 via the S5 interface.

Selected IP Traffic Offload (SIPTO) generally refers to an offload in which a network operator chooses a PGW to offload traffic to the Internet such that the WTRU's physical location or IP topological location makes it favorable to select a PGW (e.g., L-PGW 540) different from the PGW 514 of the CN 510. SIPTO may be achieved above (e.g., or external to) the RAN 520 and regardless of whether the radio connection of the WTRU 102 is obtained via the AP 522 (e.g., an eNB, a HeNB or any other AP). The selection of another PGW may not be known to the WTRU 102, and the offload of the traffic of the WTRU 102 to the L-PGW 540 may degrade the user's service experience. Two traffic streams are shown in FIG. 5, a SIPTO traffic stream 560 that may be routed through the SGW 530 to the L-PGW 540, and a CN traffic stream 570 that may be routed through the SGW 530 to the PGW 514 in the CN 510.

The eNB 522 may be a HeNB configured to perform SIPTO in a home network of the user of the WTRU 102 and traffic may be offloaded locally to a user's home network. The home network may be an IP network that is connected to other devices such as a printer, a television, and/or a personal computer, among others.

SIPTO may include single or multiple packet data network (PDN) connections, and/or deployment behind network address translation (NAT), among others.

For traffic going through the mobile operator's core network, the SGW 530 user plane functions may be located within the CN 510. Mobility management signaling between the WTRU 102 and the network may be handled in the CN 510. Session management signaling, such as bearer setup, for SIPTO traffic, and traffic going through the CN 510 may terminate in the CN 510. Reselection of a WTRU's offload point for SIPTO traffic that is geographically or topologically close to the WTRU 102 may be possible during idle mode mobility procedures.

The representative system 500 may include the L-PGW 540 that is close to a WTRU's point of attachment to the RAN 520. The L-PGW 560 may perform IP traffic 560 offload based on some policy or configuration, for example, based on the IP address destination and/or services requested (e.g., video and/or streaming services), among others. IP traffic 560 may go through the L-PGW 540 rather than through the operator's CN 510 (via for example, the SGW 530 and the PGW 514 or via an SGSN and a GGSN (not shown)).

The L-PGW 540 may have certain functionalities of a PDW/GGSN. For example, the L-PGW 540 may include functionalities such as: (1) IP address allocation; (2) direct tunneling with the RAN 520 in connected mode, (3) per WTRU policy based packet filtering; and/or (4) rate policing/shaping. A PDN connection (e.g., a proper PDN connection) may be used to perform SIPTO and/or LIPA transfers to a LN or the Intranet, The WTRU 102 may set an access point name (APN) to a specific value when requesting a PDN connection or when requesting the establishment of a packet data protocol (PDP) context.

Figure 6:
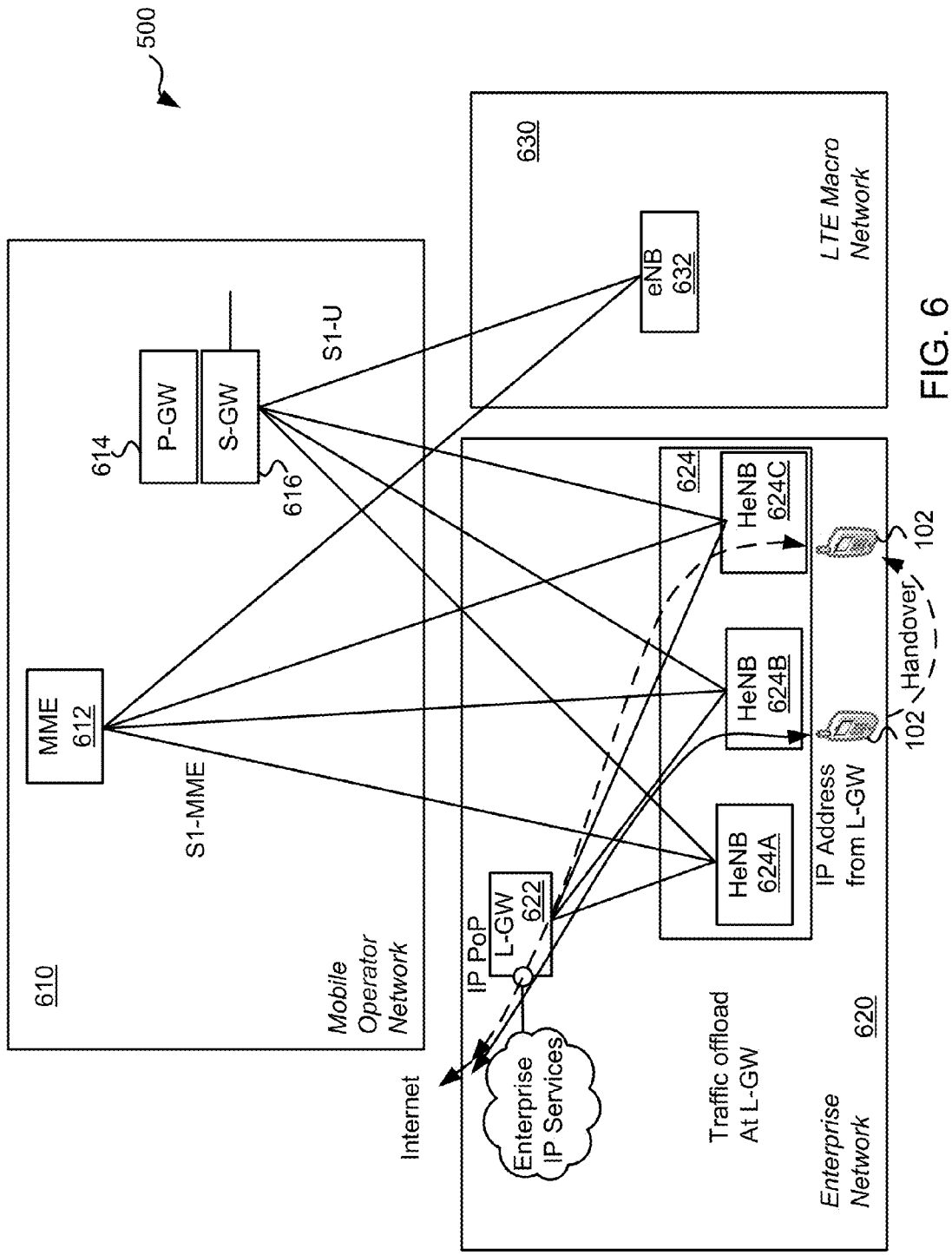
FIG. 6 is a diagram illustrating user data offload to the Internet via a LGW that may be connected to a HeNB subsystem.

FIG. 6 is a diagram illustrating a representative communication system 600 configured for user data offload to the Internet via a LGW that may be connected to a HeNB subsystem.

As shown in FIG. 6, the representative communication system 600 may include a mobile operator network 610, an enterprise network 620 and a LTE macro network 630. The mobile operator network 610 may include an MME 612, a PGW 614 and a SGW 616. The enterprise network 620 may include a LGW 622, a HeNB subsystem 624 (e.g., including a plurality of HeNBs 624A, 624B and 624C). The LTE macro network 630 may include, for example, one or more eNBs 632.

The PGW 614 may be coupled (e.g., connected) via an S5 interface to the SGW 616 and the SGW 616 may be coupled (e.g., connected) via S1-U interfaces to the APs of the enterprise network 602 and/or of the LTE macro network 630 (e.g., the HeNBs 624A, 624B, 624C and/or eNB 632, among others). The MME 612 may be coupled (e.g., connected) with the APs of the enterprise network 620 and/or of the LTE macro network 630 (e.g., the HeNBs 624A, 624B, 624C and/or eNB 632, among others) via S1-MME interfaces. The LGW 622 may be coupled (e.g., connected) with the HeNBs 624A, 624B, 624C of the HeNBs subsystem 624 via other interfaces.

The WTRU 102 may communicate with one of the HeNBs 624B of the HeNB subsystem 624 and may handover to the HeNB 624C of the HeNB subsystem 624 based on one or more criteria including: (1) the movement of the WTRU 102; (2) the signal strength of the communication with the HeNBs 624B and 624C; (3) loading of the HeNB 624B; (4) capabilities of the WTRU 102 and/or HeNB 624B and 624C; and/or (5) services requested by the WTRU 102, among others.

The offload of user data to the Internet may be provided via the LGW 622 that is coupled or connected to the HeNB subsystem 624. In this representative system 600 (e.g., architecture), local IP network (LIPA) and/or SIPTO may be used (e.g., the LGW 622 may be used to access the LIPA, while also being able to offload a WTRU's data to the Internet via the same LGW 622. The system/architecture may enable both LIPA mobility and SIPTO service continuity.

In certain representative embodiments, a PDN connection via a HeNB 624B of a HeNB subsystem 624 may be established to perform LIPA transfers between the WTRU 102 and the Intranet. If a handover of the HeNB occurs to another HeNB 624C of the HeNB subsystem 624, the PDN connection may be moved, transferred and/or reestablished with the HeNB 624C to continue/reestablish the PDN connection.

Stand-Alone Logical LGW

Figure 7:
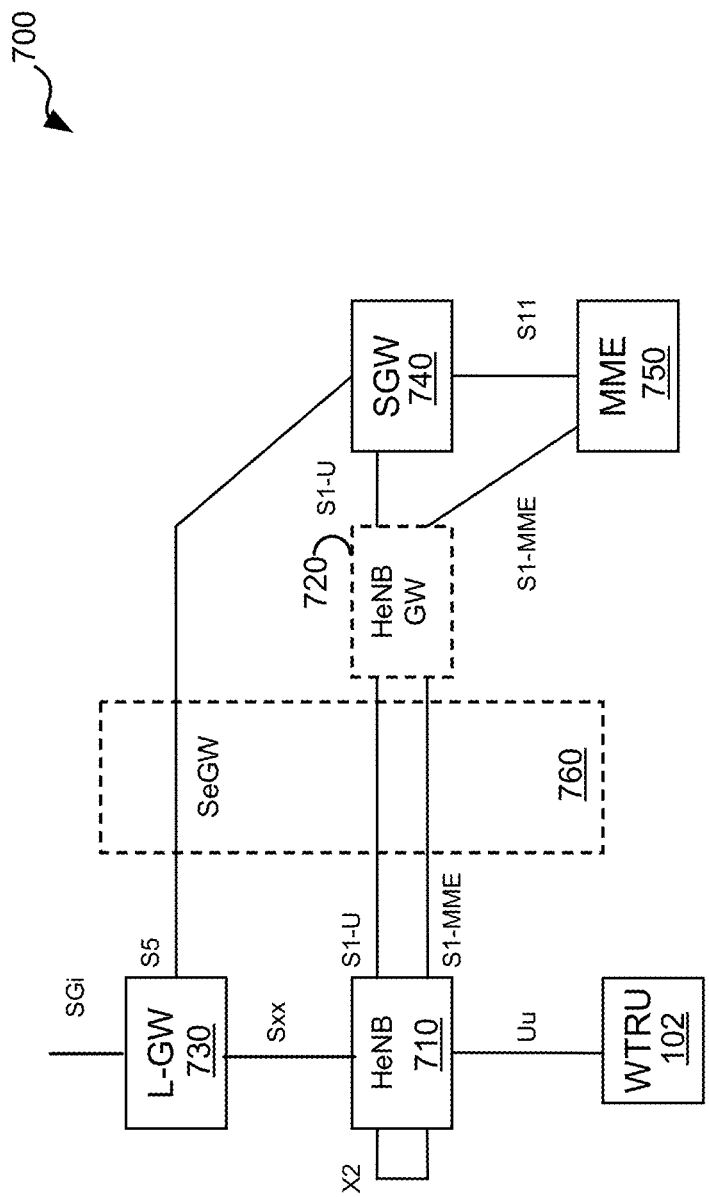
FIG. 7 is a diagram illustrating a representative standalone LGW architecture for a HeNB subsystem in which the HeNB may interface with the HeNB GW via an S1-U interface.

FIG. 7 is a diagram illustrating a representative stand-alone LGW architecture 700 for a HeNB subsystem in which the HeNB 710 may interface with the HeNB GW 720 via the S1-U interface.

Referring to FIG. 7, the representative standalone LGW architecture 700 may include one or more HeNBs 710 (collectively the HeNB subsystem not shown), a HeNB Gateway 720 a LGW 730, a SGW 740, an MME 750, a SeGW 760 and/or a WTRU 102.

The LGW 730 may be coupled to (e.g., connected to): (1) a packet data network (PDN) or internet via a SGi interface; (2) the one or more HeNBs 710 via an Sxx interface; and/or (3) the SGW 740 via an S5 interface. The SGW 740 may be coupled to (e.g., connected to): (1) the LGW via the S5 interface; (2) the one or more HeNBs 710 via an S1U interface; and/or (3) the MME 750 via an S11 interface. The MME 750 may be coupled to (e.g., connected to): (1) the SGW 740 via the S11 interface; and/or (2) the one or more HeNBs 710 via an S1-MME interface. The one or more HeNBs 710 may be coupled to (e.g., connected to): (1) the LGW 730 via the Sxx interface; (2) the SGW 740 via the S1-U interface; (3) the WTRU 102 via a Uu interface; and/or (4) the MME 750 via the S1-MME interface. Each HeNB 710 of the HeNB subsystem may be coupled to (e.g., connected to) other HeNBs 710 of the HeNB subsystem via an X2 interface.

In certain representative embodiments, the HeNB GW 720 may be included: (1) in the pathway of the S1-MME interface between the MME 750 and the HeNBs 710; and/or (2) in the pathway of the S1-U interface between the SGW 740 and the HeNBs 710.

In certain representative embodiments, the SeGW 760 may be included: (1) in the pathway of the S5 interface between the LGW 730 and the SGW 740; (2) in the pathway of the S1-U interface between the SGW 740 and the HeNBs 710; and/or (3) in the pathway of the S1-MME interface between the MME 750 and the HeNBs 710.

Figure 8:
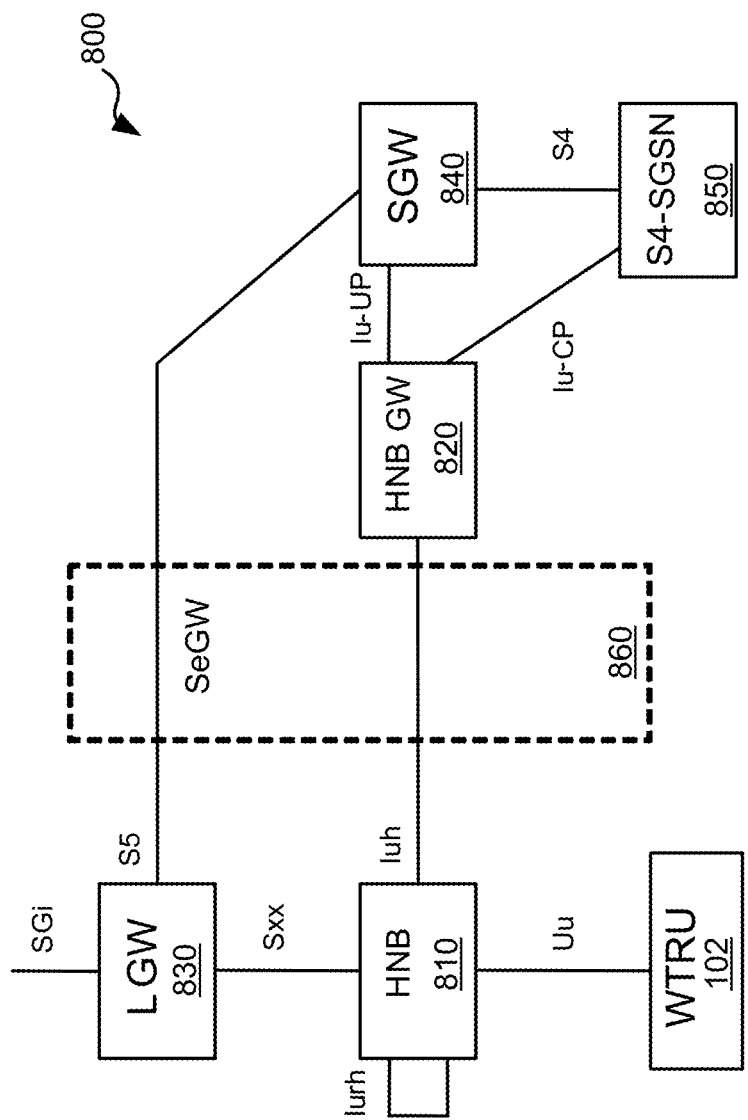
FIG. 8 is a diagram illustrating another representative standalone LGW architecture for an HNB subsystem in which the HNB may interface with the HNB GW via a Iuh interface and HNB may interface with LGW via an Sxx interface for an Evolved Packet System (EPS)

FIG. 8 is a diagram illustrating another representative standalone LGW architecture 800 for an HNB subsystem in which the HNB may interface with the HNB GW via the Iuh interface for an Evolved Packet System (EPS).

Referring to FIG. 8, the representative architecture 800 may include one or more home NodeBs (HNBs) 810 (collectively the HNB subsystem, not shown), a HNB Gateway 820 a LGW 830, a SGW 840, an S4-SGSN 850, a SeGW 860 and/or a WTRU 102.

The LGW 830 may be coupled to (e.g., connected to): (1) a PDN or internet via a SGi interface; (2) the one or more HNBs 810 via an Sxx interface; and/or (3) the SGW 840 via an S5 interface. The SGW 840 may be coupled to (e.g., connected to): (1) the LGW 830 via the S5 interface; (2) the HNB GW 820 via a Iu-UP interface; and/or (3) the S4 SGSN 850 via an S4 interface. The S4-SGSN 850 may be coupled to (e.g., connected to): (1) the SGW 840 via the S4 interface; and/or (2) the HNB GW 820 via a Iu-CP interface. The one or more HNBs 810 may be coupled to (e.g., connected to): (1) the LGW 830 via the Sxx interface; (2) the HNB GW 820 via a Iuh interface; and/or (3) the WTRU 102 via a Uu interface. Each HNB 810 of the HNB subsystem may be coupled to (e.g., connected to) other HNBs 810 of the HNB subsystem via a Iurh interface. The HNB GW 820 may be coupled to (e.g., connected to): (1) the HNBs 810 via the Iuh interface; (2) the SGW 840 via a Iu-UP interface and/or (3) the S4-SGSN 850 via the Iu-CP interface.

In certain representative embodiments, the SeGW 860 may be included: (1) in the pathway of the S5 interface between the LGW 830 and the SGW 840; and/or (2) in the pathway of the Iuh interface between the HNB GW 820 and the HNBs 810.

Figure 9:
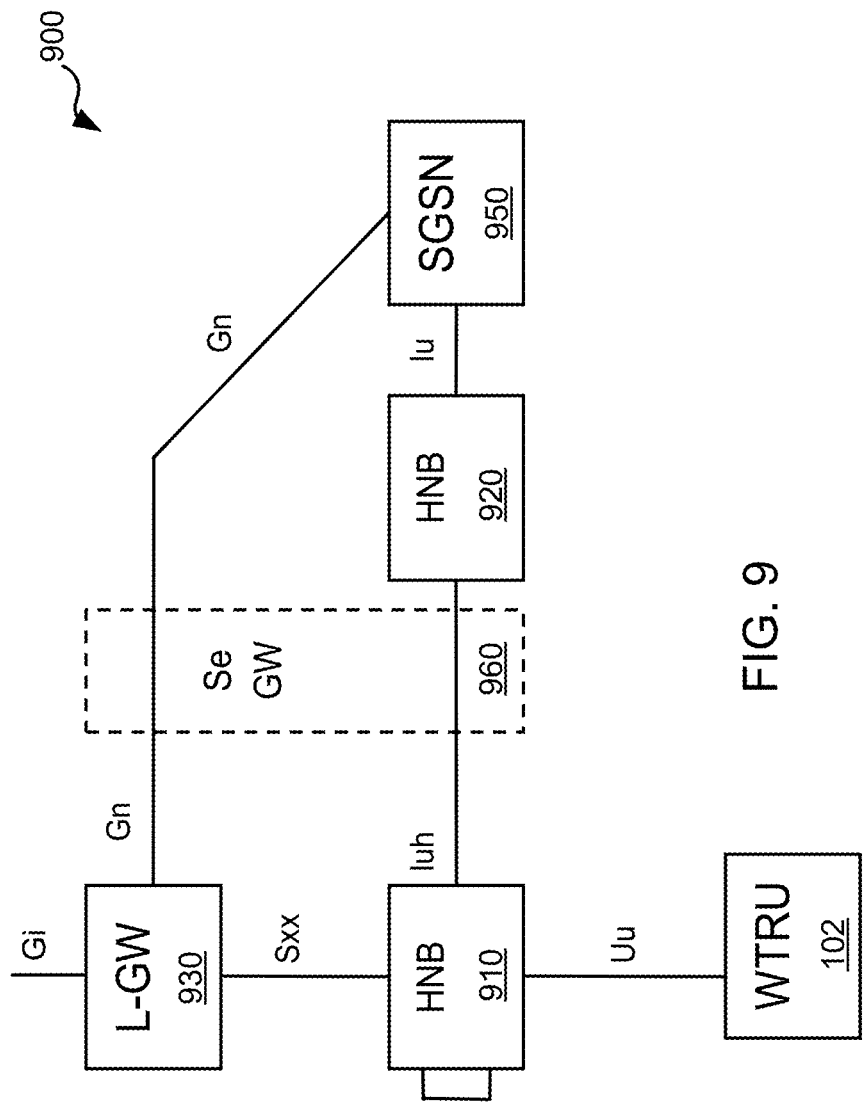
FIG. 9 is a diagram illustrating a further representative standalone LGW architecture for an HNB subsystem in which the HNB may interface with the HNB GW via the Iuh interface and HNB may interface with LGW via an Sxx interface for a Universal Mobile Telecommunications System (UMTS)

FIG. 9 is a diagram illustrating a further representative standalone LGW architecture 900 for an HNB subsystem in which the HNB 910 may interface with the HNB GW 920 via the Iuh interface for a Universal Mobile Telecommunications System (UMTS).

Referring to FIG. 9, the representative architecture 900 may include one or more home NodeBs (HNBs) 910 (collectively the HNB subsystem not shown), a HNB Gateway 920 a LGW 930, a SGSN 950, a SeGW 960 and/or a WTRU 102.

The LGW 930 may be coupled to (e.g., connected to): (1) a PDN or the Internet via a Gi interface; (2) the one or more HNBs 910 via an Sxx interface; and/or (3) the SGSN 950 via a Gn interface. The SGSN 850 may be coupled to (e.g., connected to): (1) the LGW 930 via the Gn interface; and/or (2) the HNB GW 920 via a Iu interface. The one or more HNBs 910 may be coupled to (e.g., connected to): (1) the LGW 930 via the Sxx interface; (2) the HNB GW 920 via the Iuh interface; and/or (3) the WTRU 102 via a Uu interface. Each HNB 910 of the HNB subsystem may be coupled to (e.g., connected to) other HNBs 910 of the HNB subsystem via a Iurh interface. The HNB GW 920 may be coupled to (e.g., connected to): (1) the HNBs 910 via the Iuh interface; and/or (2) the SGSN 950 via the Iu interface.

In certain representative embodiments, the SeGW 960 may be included: (1) in the pathway of the Gn interface between the LGW 930 and the SGSN 950; and/or (2) in the pathway of the Iuh interface between the HNB GW 920 and the HNBs 910.

Figure 10:
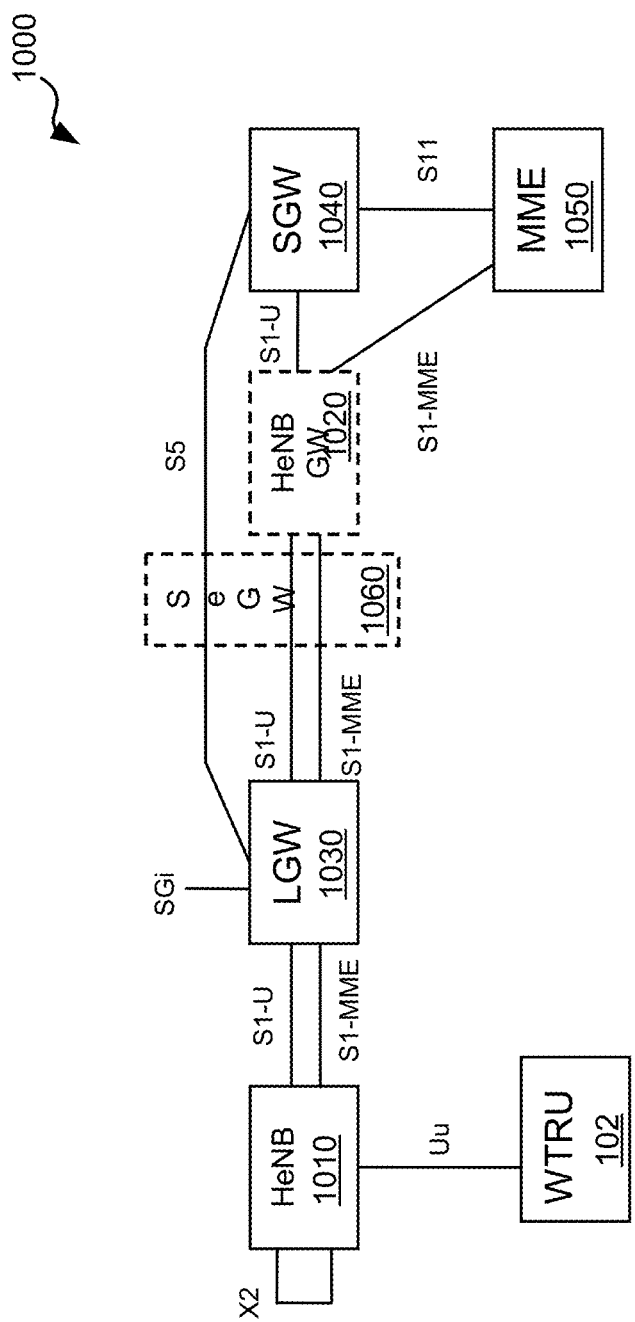
FIG. 10 is a diagram illustrating an additional representative standalone LGW architecture for an HeNB subsystem in which the HeNB may interface with the HeNB GW via an S1-U interface and the LGW is on an S1 path.

FIG. 10 is a diagram illustrating an additional representative standalone LGW architecture 1000 for a HeNB subsystem in which the HeNB 1010 may interface with the HeNB GW 1020 via the S1-U interface and the LGW 1030 is on the S1 path.

Referring to FIG. 10, the representative architecture 1000 may include one or more HeNBs 1010 (collectively the HeNB subsystem, not shown), a HeNB Gateway 1020, a LGW 1030, a SGW 1040, an MME 1050, a SeGW 1060 and/or a WTRU 102.

The LGW 1030 may be coupled to (e.g., connected to): (1) a PDN or the Internet via a SGi interface; (2) the one or more HeNBs 1010 via an S1-U interface and/or the S1-MME interface; (3) the MME 1050 via the S1-MME interface; (4) the SGW 1040 via the S1-U interface; and/or (5) the SGW 740 via an S5 interface. For example, the LGW 1030 may be disposed in the path of the S1U interface and/or S1-MME interface.

The SGW 1040 may be coupled to (e.g., connected to): (1) the LGW 1030 via the S5 interface; (2) the one or more HeNBs 1010 via an S1-U interface through the LGW 1030; and/or (3) the MME 1050 via an S11 interface. The MME 1050 may be coupled to (e.g., connected to): (1) the SGW 1040 via the S11 interface; and/or (2) the one or more HeNBs 1010 via an S1-MME interface through the LGW 1030. The one or more HeNBs 1010 may be coupled to (e.g., connected to): (1) the SGW 1040 via the S1-U interface through the LGW 1030; (2) the MME 1050 via the S1-MME interface through the LGW 1030; and/or (3) the WTRU 102 via a Uu interface. Each HeNB 1010 of the HeNB subsystem may be coupled to (e.g., connected to) other HeNBs 1010 of the HeNB subsystem via an X2 interface.

In certain representative embodiments, the HeNB GW 1020 may be included: (1) in the pathway of the S1-MME interface between the MME 1050 and the LGW 1030; and/or (2) in the pathway of the S1-U interface between the SGW 1040 and the LGW 1030.

In certain representative embodiments, the SeGW 1060 may be included: (1) in the pathway of the S5 interface between the LGW 1030 and the SGW 1040; (2) in the pathway of the S1-U interface between the SGW 1040 and the LGW 1030; and/or (3) in the pathway of the S1-MME interface between the MME 1050 and the LGW 1030.

Figure 11:
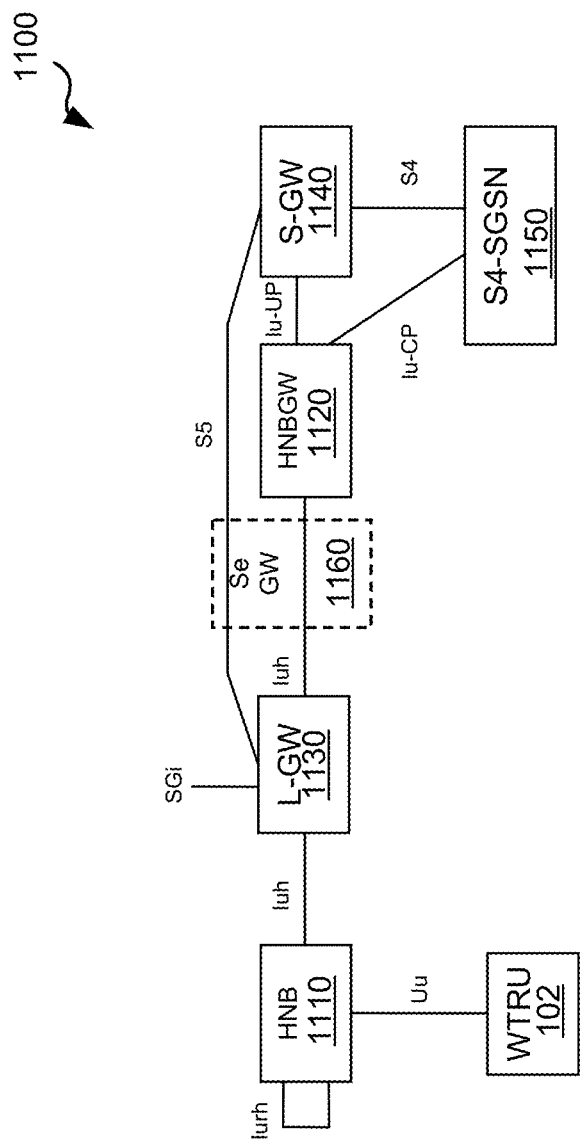
FIG. 11 is a diagram illustrating a representative standalone LGW architecture for an HNB subsystem in which the HNB may interface with the HNB GW via the Iuh interface for an Evolved Packet System (EPS) and the LGW is on a Iuh path.

FIG. 11 is a diagram illustrating a representative standalone LGW architecture 1100 for an HNB subsystem in which the HNB 1110 may interface with the HNB GW 1120 via the Iuh interface for an Evolved Packet System (EPS) and the LGW 1130 is on the Iuh path.

Referring to FIG. 11, the representative architecture 1100 may include one or more home NodeBs (HNBs) 1110 (collectively the HNB subsystem, not shown), a HNB Gateway 1120, a LGW 1130, a SGW 1140, an S4-SGSN 1150, a SeGW 1160 and/or a WTRU 102.

The LGW 1130 may be coupled to (e.g., connected to): (1) a PDN or the Internet via a SGi interface; (2) the one or more HNBs 1110 via a Iuh; (3) the HNB GW 1120 via the Iuh interface; and/or (4) the SGW 1140 via an S5 interface. For example, the LGW 1130 may be disposed in the path of the Iuh interface.

The SGW 1140 may be coupled to (e.g., connected to): (1) the LGW 1130 via the S5 interface; (2) the HNB GW 1120 via a Iu-UP interface; and/or (3) the S4-SGSN 1150 via an S4 interface. The S4-SGSN 1150 may be coupled to (e.g., connected to): (1) the SGW 1140 via the S4 interface; and/or (2) the HNB GW 1120 via the Iu-CP interface. The one or more HNBs 1110 may be coupled to (e.g., connected to): (1) the HNB GW 1120 via the Iuh interface through the LGW 1130; and/or (2) the WTRU 102 via the Uu interface. Each HNB 1110 of the HNB subsystem may be coupled to (e.g., connected to) other HNBs 1110 of the HNB subsystem via a Iurh interface.

In certain representative embodiments, the SeGW 1160 may be included: (1) in the pathway of the S5 interface between the LGW 1130 and the SGW 1140; and/or (2) in the pathway of the Iuh interface between the HNB GW 1120 and the LGW 1130.

Figure 12:
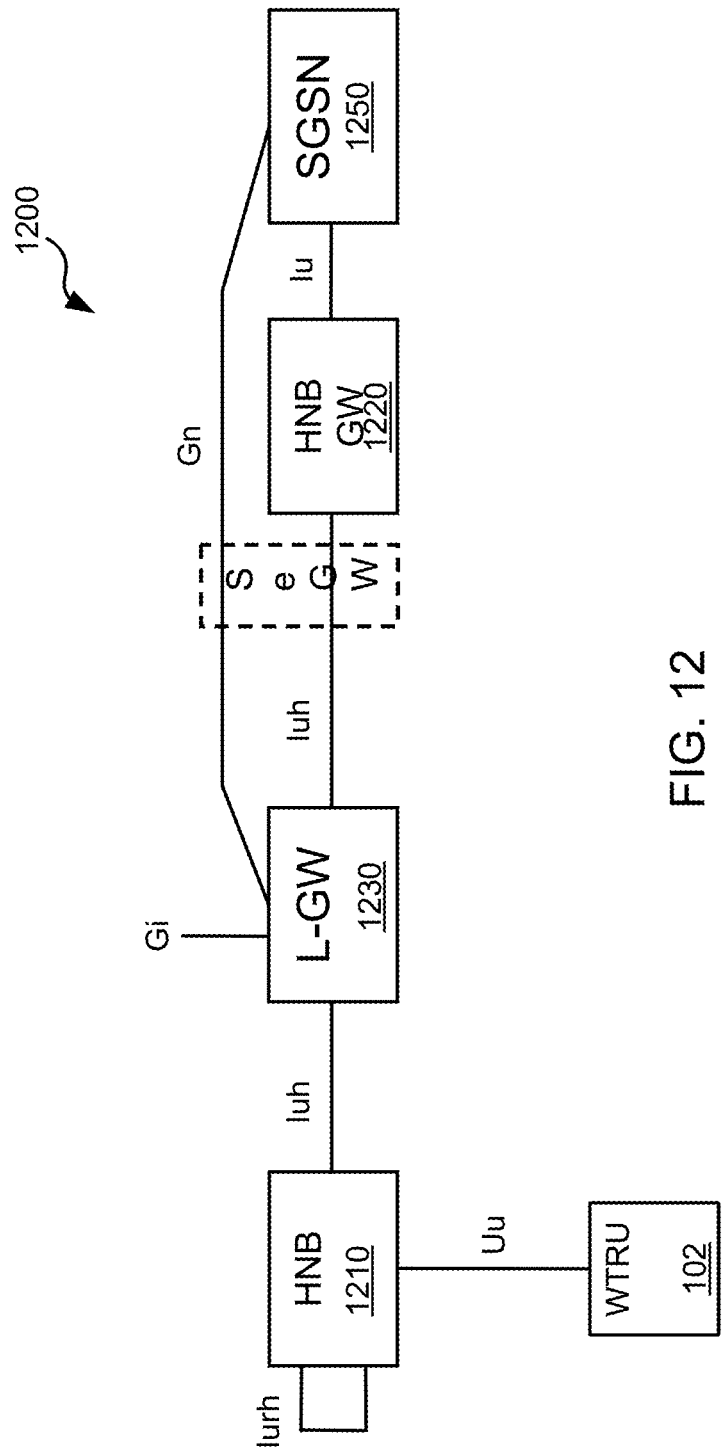
FIG. 12 is a diagram illustrating a representative standalone LGW architecture for an HNB subsystem in which the HNB may interface with the HNB GW via the Iuh interface for UMTS and the LGW is on the Iuh path.

FIG. 12 is a diagram illustrating a standalone representative LGW architecture 1200 for an HNB subsystem in which the HNB 1210 may interface with the HNB GW 1220 via the Iuh interface for a Universal Mobile Telecommunications System (UMTS) and the LGW 1230 is on the Iuh path.

Referring to FIG. 12, the architecture 1200 may include one or more home NodeBs (HNBs) 1210 (collectively the HNB subsystem not shown), a HNB Gateway 1220 a LGW 1230, a SGSN 1250, a SeGW 1260 and/or a WTRU 102.

The LGW 1230 may be coupled to (e.g., connected to): (1) a PDN or internet via a Gi interface; (2) the one or more HNBs 1210 via a Iuh; (3) the HNB GW 1220 via the Iuh interface; and/or (4) the SGSN 1250 via a Gn interface. For example, the LGW 1230 may be disposed in the path of the Iuh interface.

The SGSN 1250 may be coupled to (e.g., connected to): (1) the LGW 1230 via the Gn interface; and/or (2) the HNB GW 1220 via a Iuh interface. The one or more HNBs 1210 may be coupled to (e.g., connected to): (1) the HNB GW 1220 via the Iuh interface through the LGW 1230; and/or (2) the WTRU 102 via a Uu interface. Each HNB 1210 of the HNB subsystem may be coupled to (e.g., connected to) other HNBs 1210 of the HNB subsystem via a Iurh interface. The HNB GW 1220 may be coupled to (e.g., connected to): (1) the SGSN 1250 via the Iu interface; and/or (2) the LGW 1230 via the Iuh interface.

In certain representative embodiments, the SeGW 1260 may be included: (1) in the pathway of the Gn interface between the LGW 1230 and the SGSN 1250; and/or (2) in the pathway of the Iuh interface between the HNB GW 1220 and the LGW 1230.

Managed remote access (MRA) or Remote LIPA (RIPA generally refers to continuity of data sessions as users move between local and macro network/coverage. For example, a user might connect to a LN via the macro coverage (e.g., a macro cell, or a HeNB that is not part of a LN).

Figure 13:
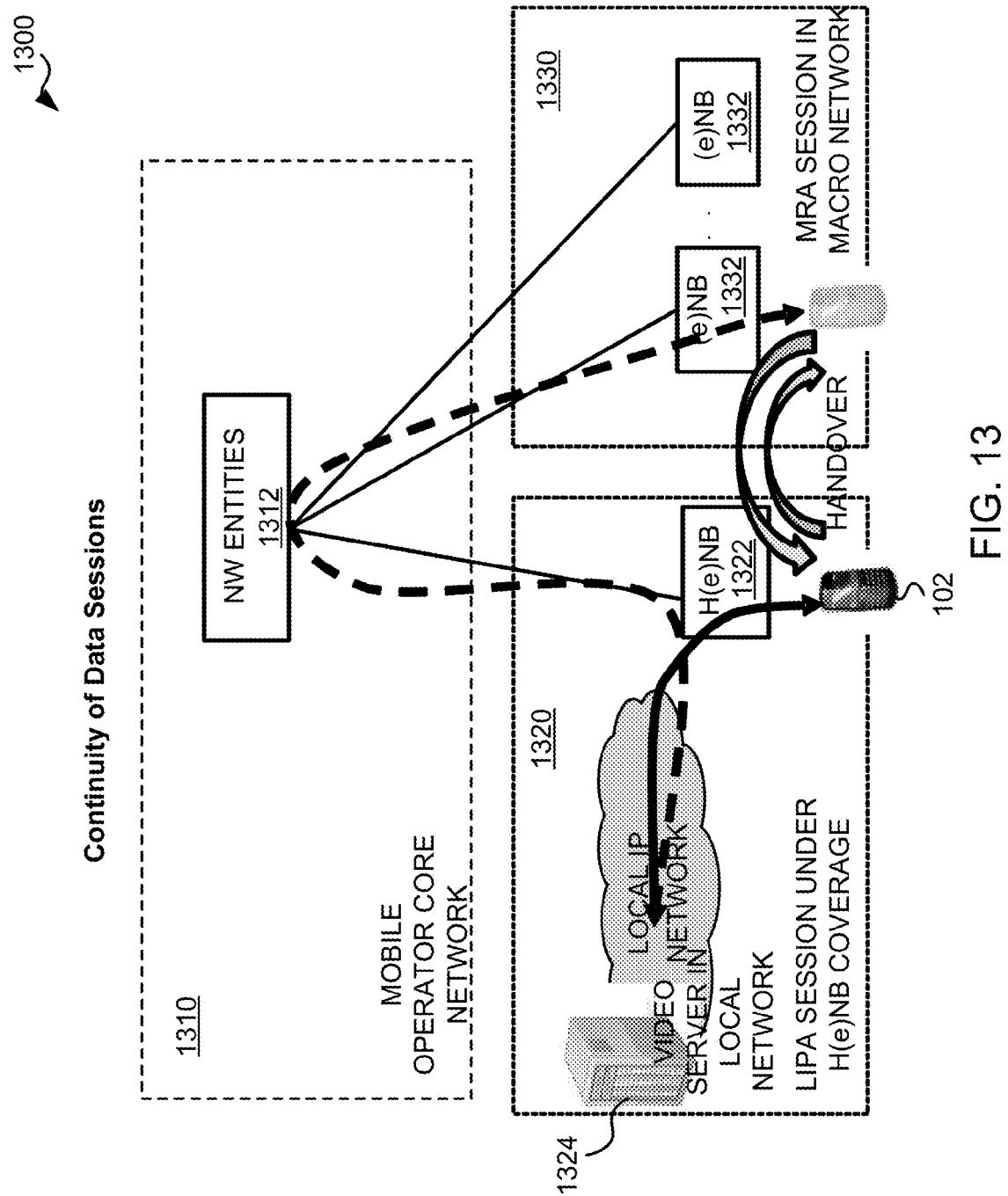
FIG. 13 is a diagram illustrating a handover procedure including a transition between a LIPA session and a MRA session using an eNB in a macro network.

FIG. 13 is a diagram illustrating a handover procedure including a transition between a LIPA session and a MRA session using an eNB in a macro network.

Referring to FIG. 13, a representative communication system 1300 may include a mobile operator core network 1310, an enterprise network (or LN) 1320 and/or a macro network 1330. The mobile operator core network 1310 may include one or more network entities 1312. The macro network 1330 may include one or more second APs (e.g., one or more eNBs) 1332.

The enterprise network or LN 1320 may include one or more APs 1322 (e.g., a HNB, a HeNB, a HeNB subsystem, and/or an HNB subsystem, among others). A WTRU 102 may be positioned in a coverage area of the LN 1320 and may be provided a connection via the one or more APs 1322 in the LN 1320. The LN 1320 may be configured for user data offload to the Internet or the LN 1320 (e.g., a local IP network via the LN 1320). The one or more APs 1322 of the LN 1320 may provide coverage to the WTRU 102 (e.g., a LIPA session for the WTRU 102 to connect, for example to a video server 1324 in the LN 1320).

Although a video server 1324 is shown in the LN 1320, it is contemplated that the connection may be to any type of server or other network resource inside of or external to the LN 1320.

In certain representative embodiments, the WTRU 102 may communicate with the AP 1322 of the LN 1320 and may handover to the second AP 1332 of the macro network 1330 based on one or more criteria including (1) the movement of the WTRU 102; (2) the signal strength of the communication with the APs 1322 and 1332; (3) loading of the APs 1322 and 1332; (4) capabilities of the WTRU 102, of the AP 1322 and/or the AP 1332; (5) velocity of the WTRU 102 and/or (5) services requested by the WTRU 102, among others.

When the user (e.g., WTRU 102) moves into the coverage area of a macro network 1330, a LIPA session may be continued as a MRA session. In general, a session is referred to as MRA session when the actual cell (macro or HeNB) does not connect to the LN 1320. For example, a WTRU 102 with a LIPA session may move to an eNB 1332 that is not part of the LN 1320 and the LIPA session may be continued as a MRA in the target eNB.

In certain representative embodiments, the WTRU 102 may communicate with the second AP 1332 of the macro network 1330 and may handover to the AP 1332 of the macro network 1330 based on, for example the criteria set forth above.

When the user (e.g., WTRU 102) moves into the coverage area of a LN 1320, the MRA session may be continued as a LIPA session. In certain representative embodiments, the WTRU 102 may have an MRA session using the eNB 1332 that does not connect to the LN 1320, but when the user moves into the coverage area of the LN 1320 and hands off to the AP 1322 of the LN 1320, the MRA session may be continued as a LIPA session.

Figure 14:
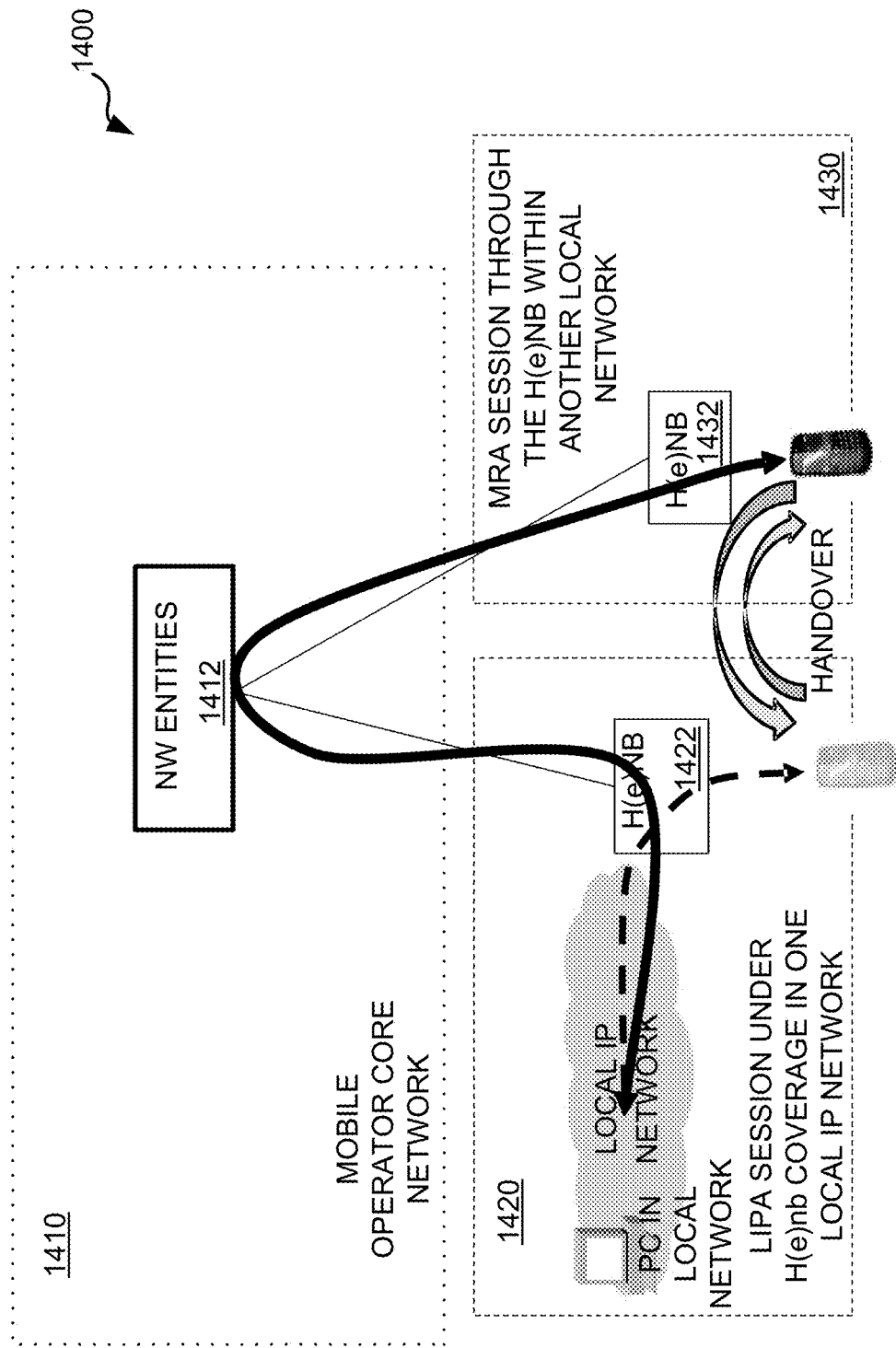
FIG. 14 is a diagram illustrating a handover procedure including a transition between a LIPA session and a MRA session using a HeNB within another LN.

FIG. 14 is a diagram illustrating a handover procedure including a transition between a LIPA session and a MRA session using a HeNB or HNB in another LN.

Referring to FIG. 14, a representative communication system 1400 may include the mobile operator core network 1410, an enterprise network (or LN) 1420 and/or another LN 1430. The mobile operator core network 1410 may include one or more network entities 1412. The enterprise network or LN 1420 may include one or more APs 1422 (e.g., a HNB, a HeNB, a HeNB subsystem, and/or an HNB subsystem, among others). A WTRU 102 may be positioned in a coverage area of the LN 1420 and may be provided a connection via the one or more APs 1422 in the LN 1420. The LN 1420 may be configured for user data offload to the Internet or the LN 1420 (e.g., a local IP network via the LN 1420). The one or more APs 1422 of the LN 1420 may provide coverage to the WTRU 102 (e.g., a LIPA session for the WTRU 102 to connect, for example, to a personal computer or other network resource 1424 in the LN 1420 or external to the LN 1420 via the Internet). The other LN 1430 may include one or more second APs (e.g., one or more HeNBs or HNBs) 1432.

In certain representative embodiments, the WTRU 102 may communicate with the AP 1422 of the LN 1420 and may handover to the second AP 1432 of the other LN 1430 based on one or more criteria, for example, as set forth herein.

When the user (e.g., WTRU 102) moves into the coverage area of the other LN 1430, a LIPA session may be continued as a MRA session. For example, a WTRU 102 with a LIPA session may move to a coverage area of a HeNB 1432 of the other LN 1430 that is not part of the LN 1420 and the LIPA session may be continued as a MRA in the target HeNB or HNB 1432.

In certain representative embodiments, the WTRU 102 may communicate with the second AP 1432 of the other LN 1430 and may handover to the AP 1422 of the LN 1420 based on, for example the criteria set forth herein.

When the user (e.g., WTRU 102) moves into the coverage area of a LN 1420, the MRA session may be continued as a LIPA session. In certain representative embodiments, the WTRU 102 may have an MRA session in the HeNB or HNB 1432 that does not connect to the LN 1420, but when the user moves into the coverage area of the LN 1420 and hands off to the AP 1422 of the LN 1420, the MRA session may be continued as a LIPA session.

Although the examples above are related to LIPA, they may apply to SIPTO, as well. For example, SIPTO@LN can occur within a LN or via macro coverage (or via another LN using a HeNB or HNB) that may not be part of the local coverage) as a MRA.

In certain representative embodiments, a continuity procedure may be used when the WTRU remains within the LN and connects to the AP of the LN (for example, when the WTRU is not allowed to have a LIPA session/service from a particular closed subscriber group (CSG) (e.g., due to subscription information).

Figure 15:
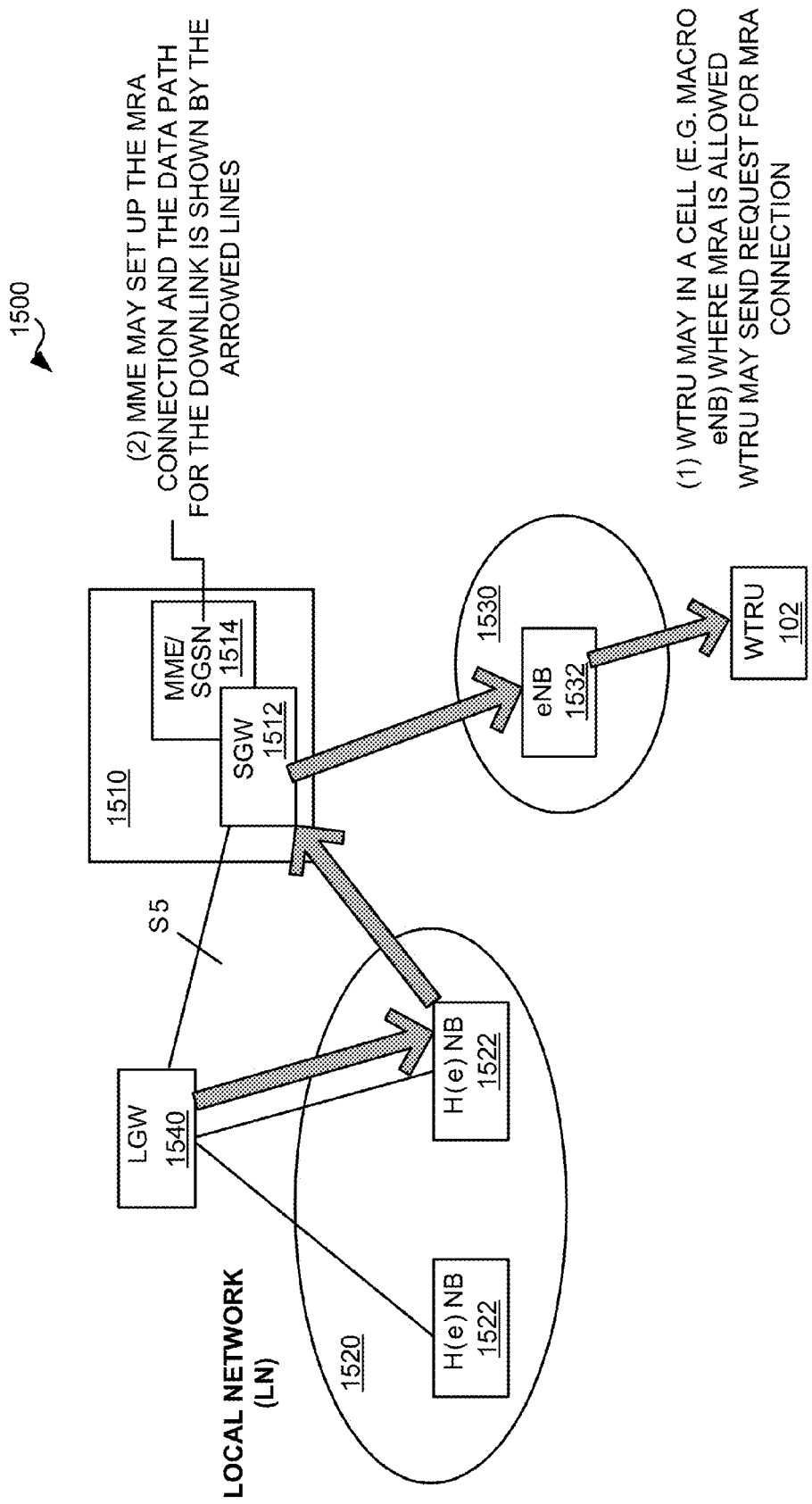
FIG. 15 is a diagram illustrating a representative data path for a downlink for a MRA session.

FIG. 15 is a diagram illustrating a representative data path for the downlink.

Referring to FIG. 15, a representative communication system 1500 may include operator's resources 1510, LN resources 1520, and/or other network resources 1530. The operator's resources 1510 may include, for example, an SGW 1512 and/or an MME/SGSN 1514. The SGW 1512 and the MME/SGSN 1514 each may be part of the core network or the SGW 1512 may be located outside of the core network. The LN resources 1520 may include one or more APs (e.g., one or more HeNBs or HNBs). The other LN resources 1530 may include one or more second APs (e.g., one or more eNBs).

The data path (represented by arrows) for an MRA session may traverse (e.g., go through) the HeNB or HNB 1522. In the downlink, the data path may traverse (e.g., go) from a LGW 1540 to the HeNB or HNB 1522, and from the HeNB or HNB 1522 to the network entities or operator's resource 1510 (which may be the SGW 1512), and from the operator's resource 1510 (e.g., the SGW 1512) to the serving cell, and to the WTRU 102. The data path may be reversed in the uplink Radio Access Network (RAN) generally refers to networks having radio access points such as eNBs, HeNBs, NBs, and/or HNBs, among others. Core Network (CN) generally refers to different type of networks, for example, including MME, SGSN, MSC/VLR, and/or SGW, among others.

A WTRU 102 may transition to connected mode (e.g., using radio resource control (RRC)) to perform a procedure with the CN. When a WTRU 102 sends a NAS message that is received at the CN, the WTRU 102 may establish a NAS signaling connection. For example, in LTE, a registered WTRU 102 in idle mode (e.g., where RRC and NAS may be idle) may initiate a NAS Service Request procedure to transition from idle mode to connected mode. After establishing the RRC connection with the eNB 1532, the WTRU 102 may send the NAS Service Request message included with (e.g., piggy backed in) a RRC Connection Setup Complete message (e.g., an RRC message that may include the establishment of the RRC connection). The eNB 1532 may send the NAS message to the CN over an S1 interface using an Initial WTRU Message. The eNB 1532 may include in the message an identifier that may be used by the MME/SGSN 1514 for communicating with the eNB 1532 information (e.g., any information) that may be relevant for the connection. The identifier may be a reference point for a particular WTRU 102 (e.g., for any information that may be sent with reference to this identifier). The eNB 1532 may map the information to a particular WTRU 102 that is being served. The identifier may be referred to as an eNB WTRU S1AP ID. The contents of the Initial WTRU Message sent by the eNB 1532 to transfer the initial layer 3 message to the MME/SGSN 1514 over the S1 interface is shown below in Table 1.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| eNB WTRU S1AP ID | M | | 9.2.3.4 | | YES | reject |
| NAS-PDU | M | | 9.2.3.5 | | YES | reject |
| TAI | M | | 9.2.3.16 | Indicating the Tracking Area from which the WTRU has sent the NAS message. | YES | reject |
| E-UTRAN CGI | M | | 9.2.1.38 | Indicating the E-UTRAN CGI from which the WTRU has sent the NAS message. | YES | ignore |
| RRC Establishment cause | M | | 9.2.1.3a | | YES | Ignore |
| S-TMSI | O | | 9.2.3.6 | | YES | reject |
| CSG Id | O | | 9.2.1.62 | | YES | reject |
| GUMMEI | O | | 9.2.3.9 | | YES | reject |
| Cell Access Mode | O | | 9.2.1.74 | | YES | reject |
| GW Transport Layer Address | O | | Transport Layer Address 9.2.2.1 | Indicating GW Transport Layer Address if the GW is collocated with eNB | YES | ignore |
| Relay Node Indicator | O | | 9.2.1.79 | Indicating a relay node | YES | reject |

A typical response from the CN may be the Initial Context Setup Request message that may be used to inform the eNB 1532 to setup a context for a respective WTRU 102. The message may include an identifier assigned by the MME 1514 that the eNB 1532 may use when the eNB 1532 desires to communicate (e.g., with the MME/SGSN 1514) information that is related to a particular WTRU 102. The identifier may be referred to as a MME WTRU S1AP ID and may be included in the Initial Context Setup Request (ICSR). The ICSR message may be sent by the MME/SGSN 1514 to request the setup of a WTRU 102 context and may include the contents as shown below in Table 2 (e.g., including the eNB WTRU S1AP ID that may be provided by the eNB 1532 in a first message sent towards the MME/SGSN 1514).

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME WTRU S1AP ID | M | | 9.2.3.3 | | YES | reject |
| eNB WTRU S1AP ID | M | | 9.2.3.4 | | YES | reject |
| WTRU Aggregate Maximum Bit Rate | M | | 9.2.1.20 | | YES | reject |
| E-RAB to Be Setup List | | 1 | | | YES | reject |
| >E-RAB to Be Setup Item IEs | | 1 to <maxnoofE-RABs> | | | EACH | reject |
| >>E-RAB ID | M | | 9.2.1.2 | | — | |
| >>E-RAB Level QoS Parameters | M | | 9.2.1.15 | Includes QoS parameters | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| >>Correlation ID | O | | 9.2.2.80 | | YES | ignore |
| WTRU Security Capabilities | M | | 9.2.1.40 | | YES | reject |
| Security Key | M | | 9.2.1.41 | The KeNB may be provided after the key-generation in the MME | YES | reject |
| Trace Activation | O | | 9.2.1.4 | | YES | ignore |
| Handover Restriction List | O | | 9.2.1.22 | | YES | ignore |
| WTRU Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | This IE indicates the MME serving the WTRU | YES | ignore |
| MME WTRU S1AP ID 2 | O | | 9.2.3.3 | This IE indicates the MME WTRU S1AP ID assigned by the MME | YES | ignore |

For a respective WTRU 102, to setup a context at the eNB 1532, the eNB 1532 may send the first uplink (UL) NAS message to the CN, which then may trigger the context setup request from the CN (e.g., the MME/SGSN 1514). An H(e)NB generally refers to a HeNB, HNB, and/or CSG, among others. There may not be a context setup request that originates from the CN without any trigger, such as receiving an initial NAS message from the eNB.

Figure 16:
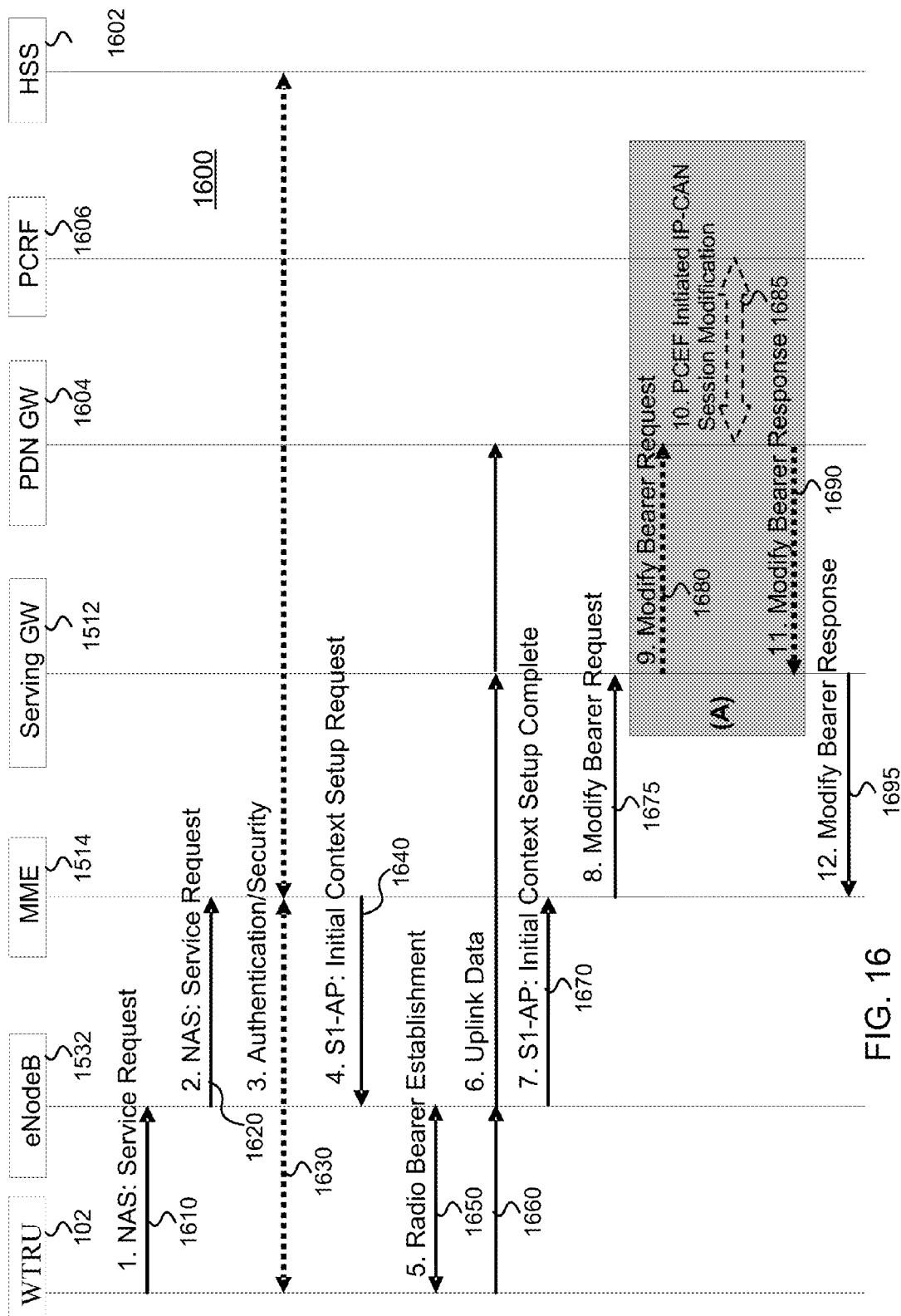
FIG. 16 is a diagram illustrating a representative Service Request procedure.

FIG. 16 is a diagram illustrating a representative Service Request procedure 1600, which may lead to the setting up of a context at the eNB 1532 for the particular WTRU 102.

Referring to FIG. 16, at 1610, a NAS Service Request message may be sent from the WTRU 102 to the eNB 1532. At 1620, a NAS Service Request message may be sent or forwarded from the eNB 1532 to the MME/SGSN 1514. At 1630, the MME/SGSN 1514 may authenticate the WTRU 102 using, for example, a Home Subscriber Server (HSS) 1602.

At 1640, an S1-AP Initial Context Setup Request message may be sent from the MME/SGSN 1514 to the eNB 1532.

The Initial Context Setup Request message may include any of following parameters: (1) the E-RAB to be setup (e.g., that may identify the radio bearer to be setup by the eNB) and/or the QoS parameters that may be associated to each bearer; (2) the WTRU Security Capabilities and/or Security Key that may be used by the eNB 1532 to establish a secure communication with the WTRU 102 on the radio interface; and/or (3) other information elements, among others.

At 1650, the eNB 1532 may initiate with the WTRU 102 a Radio Bearer Establishment (RBE). The RBE may include information, such as a bearer reference and QoS parameters. At 1660, uplink data may be provided by the WTRU 102 to the eNB 1532, SGW 1512 and/or PGW 1604, for example to synchronize the uplink data between the WTRU 102, the eNB 1532, the SGW 1512 and/or the PGW 1604. After the uplink data is received, at 1670, an Initial Context Setup Complete message may be sent by the eNB 1532 to the MME/SGSN 1514.

At 1675, a Modify Bearer Request message may be sent from the MME/SGSN 1514 to the SGW 1512 and, at 1680, the Modify Bearer Request message may be sent (or forwarded) by the SGW 1512 to the PGW 1604.

In certain representative embodiments, at 1685 a Policy and Charging Enforcement Function (PCEF) Initiated Internet Protocol Connectivity Access Network (IP-CAN) Session Modification message may be sent between the PGW 1604 and the Policy and Charging Rules Function (PCRF) 1606.

At 1690, a Modify Bearer Response may be sent from the PGW 1604 to the SGW 1512 and, at 1695, the Modify Bearer Response message may be sent (or forwarded) by the SGW 1512 to the MME/SGSN 1514.

In certain representative embodiments, RRC integrity protection may be provided over the radio interface and the eNB 1532 may run the security procedure (Security Mode Command) with the WTRU 102 before further RRC signaling or user data may be exchanged.

In certain representative embodiments, if the data path is via a HNB/HeNB 1522 that is part of the LN 1520, a procedure may be used to setup the connection between the LGW 1540 and the HNB/HeNB 1522 and/or the same or a different procedure may be used to setup the connection between the HNB/HeNB 1522 and the SGW 1512. Typically, a context may be setup at the RAN nodes when a specific node forwards an initial NAS message to the CN.

In certain representative embodiments, for the MRA procedure, a context may be setup at the HNB/HeNB 1522 that is not serving the WTRU 102 from a radio perspective (e.g., as an access point). The HNB/HeNB 1522 may not be the entity that sends the initial NAS message to the CN to setup the context at the HNB/HeNB 1522. In certain representative embodiments, another cell (e.g., the eNB of another cell) may send the initial NAS message and may trigger a setup of context in the eNB 1532 and/or at the HNB/HeNB 1522 that may be part of the MRA data path.

The HNB/HeNB 1522 may not be serving the WTRU 102 from a radio perspective and the HNB/HeNB 1522 may be setup to receive and respond to the Initial Context Setup Request message for a WTRU 102 that is not being served by the HNB/HeNB 1522. The HNB/HeNB 1522 may be provided with an identifier to be used by the MME/SGSN 1514 (e.g., the eNB WTRU S1AP ID). The HNB/HeNB 1522 may use the security parameters and may interpret the E-RAB to be setup for a WTRU 102 that is not being served at the radio level. In the MRA mode, the HNB/HeNB 1522 may not forward (e.g., may not directly forward) the data to the WTRU 102, the HNB/HeNB 1522 may send the data to an entity or resource in the CN and an indication (e.g., an MRA indicator) may be used to inform the HNB/HeNB 1522 about its MRA procedures/behaviors. The MRA indicator may be used by the HNB/HeNB 1522 (and/or the LGW 1540) to differentiate the MRA bearers/sessions from other bearers/sessions (e.g., LIPA bearers/sessions, SIPTO bearers/sessions, and/or other bearers/sessions) such that a differentiated treatment such as a differentiated packet forwarding path, and/or a differentiated QoS, among others may be rendered.

Typically, the SGW 1512 has (e.g., only has) one active S1 connection for the respective WTRU 102. If the MRA data path has to traverse (e.g., go through) the HNB/HeNB 1522 and the SGW 1512 for downlink traffic, the procedures or behavior in the SGW 1512 may be changed or modified such that more than one S1 connection may be simultaneously active for the respective WTRU 102.

A Local Home Network (LHN) may include multiple HeNBs and/or HNBs 1522 and multiple LGWs 1540. During the MRA call establishment, a determination may occur of which particular HNB/HeNB 1522 and/or LGW 1540 may be used as an entry point into the LN being access. The timing during the MRA session establishment and selection may be established as set forth below.

When the network supports enhanced mobility procedures and when an active MRA connection exists, the MRA service may be billed differently from the LIPA service. If a service started as a LIPA service and evolved into an MRA service, the information may be provided to the CN such that the service may be charged, accordingly. During CN mobility, the transition from LIPA to MRA or from MRA to LIPA may be detected via triggers, which may be reported to the CN.

In typical handover (HO) procedures, after the HO is completed, the source cell may release resources (e.g., all resources) that are being used for the respective WTRU 102. The resources may include radio and/or S1 resources. In a LIPA to MRA HO, if the source HNB/HeNB 1522 is to remain in the data path for MRA, the current resource release procedure may not be used as it may clear the resources (e.g., all of the resources) that were established for the LIPA. For the MRA, the HNB/HeNB 1522 may forward data to the SGW 1512 such that a procedure may be used to indicate the MRA to the HNB/HeNB 1522 that is in the data path. Other procedures (e.g., with similar methods/behaviors) may be used for the HNB/HeNB and LGW interface. The SGW 1512 may have one or more S1 connection for a respective WTRU 102 and the MRA functionality may use enhanced procedures to indicate the WTRU's capabilities to the SGW 1512 that more than one S1 connection may be used for the respective WTRU 102.

In certain representative embodiments, the MRA data path may be fixed (e.g., always fixed). In certain representative embodiments, the MRA data path may be dynamic (e.g., changed based on a condition or a triggering event). In certain representative embodiments, the downlink and uplink paths may follow the same line or paths but may be reversed in direction. In certain representative embodiments, the downlink path and uplink path may be different.

In certain representative embodiments, MRA procedures may enable idle mode mobility when either a LIPA or an MRA session is active for the respective WTRU 102. For example, such procedures may address problem that may otherwise arise.

A first problem may include a WTRU 102 that may be in idle mode while its NAS EPS bearers (e.g., PDN connection and associated bearers) remain active in the WTRU 102 (and the CN) even if no radio or CN resources are being used. For example, an idle mode WTRU 102 with a LIPA PDN connection may maintain a LIPA PDN connection and associated bearers until a condition is met to deactivate the PDN connection and/or the LIPA bearers. As an example, when the MME/SGSN 1514 notices that the WTRU 102 has moved out of the HeNB or HNB (e.g., the coverage area of the HeNB or HNB 1522) where the LIPA session was activated, the MME/SGSN 1514 may deactivate the associated PDN connection. With the MRA procedures, the WTRU's mobility in idle mode may not cause the PDN deactivation, when the CN notices that the WTRU has moved out (e.g., mobility out) of the LN. If the WTRU 102 is allowed to (and/or configured to) have an MRA (e.g., MRA session) when the WTRU 102 moves out of the LN (while in idle or connected mode), the MME/SGSN 1514 may not deactivate the LIPA PDN connection and may resume the PDN connection as an MRA session. In certain representative embodiments, the WTRU 102 going from (e.g., transitioning from) idle mode to connected mode may do so: to enable signaling (e.g., periodic updates) and/or to establish a user plane. In certain representative embodiments, CN procedures may be implemented regarding the LIPA PDN connection when the WTRU 102 moves while in idle mode and sends a NAS message (e.g., for either signaling or to send user data, among others).

As a second problem, if the WTRU 102 is allowed to have an MRA from its current cell, the WTRU 102 is performing only signaling (e.g., a periodic Tracking Area Update (TAU)) and does not use the user plane, the MME/SGSN 1514 may or may not take any actions to change the LIPA session (e.g., an existing LIPA session) to a MRA session.

As a third problem, when the WTRU 102 is not allowed to have MRA, if the WTRU 102 is signaling (e.g., a TAU), the MME/SGSN 1514 may not deactivate the LIPA PDN connection even if the WTRU 102 cannot have LIPA or MRA from its current location as the WTRU 102 may move back to the HeNB or HNB 1522 (e.g., the coverage area of the HeNB or HNB 1522) where the LIPA may be provided.

Although the representative embodiments are discussed using representative examples, the representative procedures may apply to any LTE and/or 3G/GERAN system.

MRA Connection Setup: HNB Selection and Setup of Resources

The WTRU 102 may be in a cell where LIPA is not allowed (for example, a macro or HNB cell that is not part of the LN, or in a CSG cell that is part of the LN but LIPA is not allowed due to subscription). Certain representative embodiments may apply to either the PDN connection procedure that can be standalone or part of the Attach procedure.

In certain representative embodiments, the selection of HNB/HeNB 1522 for MRA session setup, the procedure used to setup MRA context at a HNB/HeNB 1522, and signaling procedure used to setup resources between the affected nodes e.g., the HNB/HeNB 1522, the LGW 1540, and/or the SGW 1512 may be provided.

For example, when the MME/SGSN 1514 receives a PDN Connection request for the MRA, the MME/SGSN 1514 may setup a plurality of user plane tunnels (e.g., three extra user plane tunnels, for example: (1) between the SGW 1512 and the HNB/HeNB 1522 in the LHN; (2) between the SGW 1512 and the LGW 1540; and (3) between the LGW 1540 and the HNB/HeNB 1522 in the LHN).

In certain representative embodiments, the establishment of S1-U tunnel between the HeNB 1522 and the SGW 1512 may be performed by either the HeNB 1522 in the LHN or the SGW 1512. The MME 1514 may send a create session request (CSR) in a CSR message to the SGW 1512. The CSR message may include the address of the HeNB 1522 and/or the address of the LGW 1540, which may be used to establish the tunnel between the HeNB 1522 and the LGW 1540. The MME 1514 may, via any S1AP message (used for the S1-MME interface), inform the HeNB 1522 that the S1-U tunnel may be created for a MRA PDN connection so that packets received by the HeNB 1522 will be forwarded to the SGW (e.g., and may be achieved by the MME 1514 sending an indication to the HeNB 1522 while setting up the S1-U tunnel. The indication may be in the form an IE in a current S1-AP message (e.g., a Context Setup Request) or a new S1-AP message for MRA enablement). When the HeNB 1522 receives packets from the LGW 1540, the HeNB 1522 may use the indication (or based on this indication that may be saved in the HeNB as part of the WTRU's context) to send or forward the packets towards the SGW 1512. The LGW address that may be sent to the HeNB 1522 in any S1AP message may serve as an indication to the HeNB 1522 that the tunnel is established for a MRA connection even though the WTRU 102 is not being served by the HeNB from a radio perspective.

After the HeNB 1522 receives a request (e.g. in any S1AP message) to create a session or connection with the SGW 1512 for the MRA connection/service, the HeNB 1522 may in addition create the tunnel between itself and the LGW 1540. The HeNB 1522 may receive the LGW address in the message from the SGW 1512 or the MME 1514. The HeNB 1522 may use this address to establish the connection with the LGW 1540. When the LGW 1540 is co-located with the HeNB 1522, the HeNB 1522 may not use this address, which may be discarded. The HeNB 1522 may send an indication to the LGW 1540 indicating that the tunnel is being established for a MRA PDN connection and may be accomplished either by forwarding the same indication, which the HeNB 1522 receives from the MME 1514 or the SGW 1512, or by sending a new type of indication.

In the case where the HeNB 1522 and the LGW 1540 cannot exchange control plane messages directly, a user plane tunnel may be established by the SGW 1512 sending a Create Bearer Request (CBR) message to the LGW 1540. The CBR message may include the address of the HeNB 1522 and an indication that the connection is being established for the MRA. The CBR message may establish the S5 connection between the LGW 1540 and the SGW 1512. Upon reception of the CBR by the LGW 1540 with an indication that the connection is for an MRA connection, and/or with a HeNB address, the LGW 1540 may establish a tunnel with the HeNB 1522 (via the interface that connects both entities together) and inform the HeNB 1522 that the connection is an MRA connection. The LGW 1540 may provide the SGW address that the LGW 1540 may have received in the CBR message from the SGW 1512.

In certain representative embodiments, the HeNB or HNB 1522 selection during MRA session setup may include the following.

(1) The MME/SGSN 1514 may already be configured such that a particular HNB/HeNB 1522 is selected (e.g., always selected) for the MRA. The HNB/HeNB 1522 selection and configuration at the MME/SGSN 1514 may be based on operator policies. The MME/SGSN 1514 may have a list of such HNBs/HeNBs 1522 that it may select in a priority order. For example, if the session fails with a selected HNB/HeNB 1522, the MME/SGSN 1514 may retry with another selection of the HNB/HeNB 1522.

(2) When the MME/SGSN 1514 receives a request to setup an MRA session/connection, the MME/SGSN 1514 may select a CSG/HNB/HeNB that is allowed to be accessed by the WTRU 102. For example, the MME/SGSN 1514 may perform a CSG access check for the respective WTRU 102 as if the WTRU 102 was accessing that cell from the radio perspective. If the access check fails, the MME/SGSN 1514 may reject the connection and may send a reject cause to the WTRU 102 to inform the WTRU 102 about the reason for the rejection. The reject cause may be an existing cause or a new cause (e.g., "cause #25—not allowed on CSG" with a modification such that the WTRU 102 knows that this is for a CSG that is not being accessed by the WTRU 102 from the radio perspective). The new code may be defined to indicate that the reason for rejecting an MRA session (e.g., PDN connection) may be due to CSG subscription failure at the selected HNB/HeNB 1522. The MME/SGSN 1514 may include a CSG ID for which the access check failed. When the WTRU 102 receives the reject cause, the WTRU 102 may remove the CSG ID from its whitelist (e.g., even though the WTRU 102 did not receive a cause code while in the radio coverage of the CSG/HNB/HeNB 1522 for which the access check failed). When the WTRU 102 receives the reject cause with the additional indication as to why the session failed, the WTRU 102 may not initiate a PDN connection for the same MRA session (e.g., which is identified by a well known APN) for a known or preconfigured time duration, or until the WTRU's CSG lists (e.g., the allowed list and/or the operator list) are modified.

In certain representative embodiments, the MME/SGSN 1514 may not reject the connection and may attempt (e.g., try) to select another HNB/HeNB 1522 that the WTRU 102 may be a member of. The MME/SGSN 1514 may still select a HNB/HeNB 1522 that the WTRU 102 is not a member of, if the resources at the HNB/HeNB 1522 allow (e.g., policies/rules allow) the selection or if the network operator may allow such a selection (e.g., at the same, higher or different charging rate/fee). The MME/SGSN 1514 may prioritize: (1) the selection of the HNB/HeNBs 1522 for which a WTRU 102 may be a member; (2) selection of the HNB/HeNBs 1522 that may operate in a hybrid mode; and/or (3) the HNB/HeNBs 1522 that are not allowed to be accessed by the WTRU 102 (e.g., if such a selection is permitted by dynamic or pre-established rules). The prioritizes may be in the order set forth above or in any other order set forth in the policies/rules for such prioritization.

In certain representative embodiments, MRA session setup may include the following.

(1) When the MME/SGSN 1514 receives a request to setup an MRA PDN connection (session), the MME/SGSN 1514 may verify with the HNB/HeNB 1522 whether resources allow the setup of such a connection by, for example, using an explicit message. The message may be sent to the HNB/HeNB 1522 before the setup of the PDN connection. If the message is received by the HNB/HeNB 1522, the HNB/HeNB 1522 may respond to indicate whether resources allow such a connection to take place (e.g., a connection between the HNB/HeNB 1522 and the LGW 1540). In certain representative embodiments, the MME/SGSN 1514 may continue with the processing and setup of the connection. The HNB/HeNB 1522 may reject such a connection, if resources are not available. The HNB/HeNB 1522 may take into account the WTRU's CSG subscription information to determine or decide on either permitting or rejecting the connection. The MME/SGSN 1514 may provide the information in the messages (e.g., all the messages such as but not limited to S1AP messages) that are sent to the HNB/HeNB 1522 for setting up an MRA connection. A HNB/HeNB 1522 may release the resources for an MRA session, if: (1) the WTRU 102 is not a member of the HNB/HeNB 1522, (2) the HNB/HeNB 1522 is experiencing congestion; and/or (3) member WTRUs 102 are accessing the cell.

During the setting of the MRA connection, the HNB/HeNB 1522 may reject the request, if resources are not available at the HNB/HeNB 1522 and, for example, the request may be signaled directly to the MME/SGSN 1514 using an explicit new or existing message. In certain representative embodiments, the HNB/HeNB 1522 may signal the rejection and the rejection cause to the LGW 1540, which may forward the indication to the MME/SGSN 1514. When the MME/SGSN 1514 receives an indication about failure to setup the MRA session due to rejection at the HNB/HeNB 1522 (e.g., for any reason), the MME/SGSN 1514 may select another HNB/HeNB 1522, as described above, or the MME/SGSN 1514 may provide the MRA session using an alternative path for the data (e.g., via the SGW 1512). The MME/SGSN 1514 may select the data path for the MRA based on resources availability or network policies such that in one case the data path may involve a HNB/HeNB 1522 in the LN 1520, or the data path may not involve any HNB/HeNB 1522 in the LN 1520.

It is contemplated to have a procedure in which, for example, the MME/SGSN 1514 may setup a context at the RAN nodes (e.g., the HNB/HeNB 1522 or any other RAN node such as an eNB, among other) even if these nodes may not be serving the WTRU 102 on the radio interface. The CN (e.g., the MME/SGSN 1514) may use a new message or an existing message on the S1 interface to enable the procedure such that the message may include an indication for the setup of a context that may not be used for radio resource provisioning. The new or enhanced existing message (e.g., the Initial Context Setup Request message) may include: (1) an indication to notify the RAN node (e.g., the HNB/HeNB) that the connection may involve resources on the S1AP interface and other interfaces (e.g., the Sxx interface between the HNB 1522 and the LGW 1540). For example, the connection type may be defined to indicate "MRA only" or "CN resources only" and/or "no radio resource". With the indication, the HNB/HeNB 1522 may setup (e.g., only setup) the appropriate context such that no radio resources are involved and other radio-related procedures are executed.

An identifier (e.g., "MME WTRU S1AP ID") may be included by the MME/SGSN 1514 and may be unique. The MME/SGSN 1514 may maintain (e.g., keep) a mapping between the identifiers used with the HNB/HeNB 1522 and other identifiers used with the serving cell with (e.g., under) which the WTRU 102 is being served with radio coverage.

An identification of the LGW 1540 to which the HNB/HeNB 1522 may connect may be included. At least one correlation ID may be provided.

If the MME/SGSN 1514 uses an existing message, the MME/SGSN 1514 may take the above set forth actions. The MME/SGSN 1514 may not include parameters (e.g., any parameter) that are used for operation on the radio interface. For example, the MME/SGSN 1514 (or any equivalent CN node) may not include the security parameters and/or the E-RAB to be setup. The MME/SGSN 1514 may include NAS identifiers that have been assigned to this WTRU 102 (e.g., S-TMSI, and the like). The HeNB/HNB 1522 may store any NAS identifiers that are received from the MME/SGSN 1514.

When the HNB/HeNB 1522 receives a new or existing message with an indication to setup resources for an MRA session, the HNB/HeNB 1522 may respond to the request to confirm that the procedure is to be or is being processed.

In certain representative embodiments, the response may be sent after the procedure is executed. The HNB/HeNB 1522 may use a new indication to know or to determine that the context is for (or relates to) an MRA for a session that does not involve the use of radio resources for the respective WTRU 102. The HNB/HeNB 1522 may allocate an identifier for this WTRU 102 (e.g., the HNB/HeNB 1522 may allocate and may include an identifier (e.g., "eNB WTRU S1AP ID") in the response to the CN). The HNB/HeNB 1522, responsive to the new message or indicators, may not setup any radio resource with any of the existing WTRUs 102 and may not treat the procedure as an erroneous procedure. The eNB 1532 may store any security parameters that are provided by the CN. In certain representative embodiments, no security procedure may be run with any WTRU 102. The eNB 1532 may assign a virtual C-RNTI (Cell-Radio Network Temporary Identifier) for the WTRU 102 in question so that when the WTRU 102 is served by this eNB 1532, the C-RNTI may be directly used to identify the WTRU 102 at the cell level.

The HNB/HeNB 1522 may use the new or existing indicator (e.g., correlation ID) with any provided LGW address, for example, to establish a data path with the LGW 1540.

Certain representative embodiments may apply to 3GPP Release 10 (e.g., the LGW, for example being collocated with the HNB/HeNB 1522) and/or 3GPP Release 11 (e.g., the LGW, for example, being standalone) deployment scenarios.

The HeNB 1522 may establish the S1-U connection with the SGW 1512. The HeNB 1522 may map the S1-U bearer IDs or Tunnel End IDs (TEIDs) to that with the LGW 1540 such that any data received from the SGW 1512 on a specific TEID or bearer may be forwarded to the LGW 1540 if the mapping matches the TEID (and/or bearer ID) mapped to (e.g., associated with and/or corresponding to) the LGW 1540. Data (e.g., any data) from the LGW 1540 may be verified against the TEID and if it maps to that of the S1-U bearer, the HeNB 1522 may forward the data to the SGW 1512.

The indications, IEs and new messages that are contemplated may be used to: (1) setup resources (e.g., similar to or equivalent to a E-RAB SETUP REQUEST); (2) modify resources (e.g., similar to or equivalent to a E-RAB Modify Request), and/or (3) release resources (e.g., similar to or equivalent to a E-RAB Release Indication) with no (e.g., or insignificant or little) involvement of the radio interface. For example, to setup more bearers for the MRA, the CN may use a new message (which may be the same or a new message as described above, e.g., with new connection type) or it may use the E-RAB Setup Request message with the indications set forth above. The HNB/HeNB 1522 may setup resources towards the LGW 1540 and the SGW 1512, as may be the case for the initial context setup.

It is contemplated that the same or similar procedures may apply to the WTRU 102 Context Modification Request or a new message with the indications as set forth above may be used.

MRA to LIPA Handover and LIPA to MRA Handover

A MRA to LIPA HO procedure may include after the establishment of the path or connection (e.g., a direct path) with the LGW 1540 (that may be providing the LIPA session for a respective WTRU 102), the target HeNB 1522 indicating to the MME 1514 that a connection has been established. Responsive to the indication, e.g., as a trigger, the MME 1514 may inform the SGW 1512 that one (e.g., only one) S1-U connection may be active with the HeNB 1522 and that the session may currently be a LIPA session. With the indication or similar indications, the SGW 1512 may not forward any uplink MRA packets to the HeNB 1522, as may be the case during an MRA session. The SGW 1512 may release its resources with the previous cell (source cell where the WTRU 102 was receiving an MRA service). For example, the MME 1514 may send a modify bearer request message to the SGW 1512 with an indication of modification of the session to a LIPA session. The SGW 1512, upon receiving the bearer request message, may inform the LGW 1540 that the MRA connection (e.g., session) has been transformed into a LIPA connection (e.g., session). The SGW 1512 may release its resources that were established with the source cell. The MME 1514 may inform the SGW 1512 that the first downlink packet after the WTRU 102 changes to connected mode from idle mode is to be transmitted towards, for example, the target eNB 1532 in the neighbor cell. For a LIPA session, when the WTRU 102 moves from idle mode to connected mode, the SGW 1512 may forward the first packet to the HeNB 1522 in the LN 1520 and for a MRA session, the first downlink packet is to be sent, for example, to the target eNB 1532 (or any other AP of a neighboring cell) having an appropriate MRA session established. The indication may be included as part of the bearer modification request message sent by the MME 1514 to the SGW 1512. The SGW 1512 may use the indication to change the path for the first downlink packet towards the target eNB 1532.

A LIPA to MRA HO procedure may include, during the HO procedure when the LIPA session is continued as a MRA session, the source HeNB 1522, after handing the WTRU 102 over to a target cell, may release (e.g., may only release) the radio resources and may maintain the S1-U connection with the SGW 1512. The HeNB 1522 may do this either due to an explicit indication that may be received (e.g., from the MME 1514) during the HO or before the HO (e.g., upon the WTRU 102 context setup procedure, the HeNB 1522 may be informed that specific bearers have such a behavior).

In certain representative embodiments, the HeNB 1522 may query the CN before the HO to learn about the bearers that have such a treatment. As one example, the HeNB 1522 may keep (e.g., always keep) the S1-U resources unless explicitly informed to release the S1-U and/or S1-AP connection (e.g., for the control plane). For example, the HeNB 1522 may perform the current HO procedure using the existing signaling. The MME 1514 may (if the LIPA session is to be continued as the MRA session) send a message to inform the HeNB 1522 to release (e.g., only release) the radio resources and to maintain the S1 connection (e.g., both for the user plane and the control plane). The signaling may be a new message or may be accomplished via a modification of the WTRU Context Release or WTRU Context Modification messages. As another example, the HeNB 1522 may maintain (e.g., keep) the S1 connection based on an indication from the target cell that the bearers have been admitted or allowed, and an indication to identify that the bearers are MRA related. The source HeNB 1522 may release radio related resources and/or parameters (e.g., any radio related resources and/or parameters) when the source HeNB 1522 knows or determines that the S1 connection is to be maintained or when the WTRU 102 is handed over to another cell.

The source HeNB 1522 may not release its direct data path connection that is established with the LGW 1540. Thus, the source HeNB 1522 may maintain its direct connection with the LGW 1540. The procedures described above (e.g., to maintain the S1 connection) may also be used to maintain the direct connection between the source HeNB 1522 and the LGW 1540. Similarly, the SGW 1512 may not release the S1 interface with the source HeNB 1522. The SGW 1512 may maintain the connection using an indication that the session is to be continued as a MRA session or the SGW 1512 may maintain (e.g., always maintain) the connection for a LIPA PDN connection (e.g., any LIPA PDN connection) that may be established.

In certain representative embodiments, the SGW 1512 may be informed to maintain the LIPA PDN connection upon the initial PDN setup procedure with an indication that such a treatment is used for specific bearers. The MME 1514 may provide such indications to the SGW 1512. In certain representative embodiments, the HeNB 1522 may provide the indication to the SGW 1512. For example, if the MME 1514 provides such an indication to the SGW 1512, the MME 1514 may include the indication in a Modify Bearer Request message. The SGW 1512 may use the indication to inform the LGW 1540 about the change of the LIPA session to the MRA session. The LGW 1540 may be informed about the path used for the MRA connection (e.g., the LGW 1540 may be informed to maintain the path via the HeNB 1522 or to change the path via the SGW 1512. The MME 1514 and/or SGW 1512 may provide this indication to the LGW 1540. The MME 1514 may inform the SGW 1512 (e.g. in the Modify Bearer Request message) to establish a tunnel with the cell/eNB 1532 that is now serving the WTRU 102 from a radio perspective (i.e. in the cell where the WTRU 102 is to receive an MRA service).

In any of the representative procedures set forth herein, maintaining the S1 connection may include reusing the existing S1 connection with the given TEIDs or re-assigning new TEIDS (e.g., endpoint IDs). For example, after a LIPA to MRA HO, the source HeNB 1522 may use the assigned SGW 1512 TEID for the uplink as the TEID used for MRA packets in the downlink direction. Even though the HeNB 1522 knows or determines the TEID for the SGW 1512 in the uplink data path (e.g., for non-MRA), the HeNB 1522 may use this same TEID to send downlink MRA data packets. The SGW 1512 may reuse the HeNB S1-U TEID as the tunnel to send uplink MRA data.

In certain representative embodiments, the HeNB 1522 and SGW 1512 may keep or maintain the S1AP (e.g., control plane) connection and may re-assign the TEID for the user plane. Such a re-assignment may be accomplished by the MME 1514 that provides the new TEID to the HeNB 1522, for example, by including the information in the above set forth messages to modify the LIPA to MRA context at the source HeNB 1522. The MME 1514 may request the SGW 1512 to reassign a TEID for the DL MRA packet during the Bearer Context Modification procedure. The request may be passed to the HNB as set forth herein. The HeNB 1522 may contact the SGW 1512 and/or may reassign (e.g., directly re-assign) a TEID for the uplink MRA packets.

Different MRA Data Paths

The MME 1514 may change the data path at a predetermined time, periodically or at any time based on a triggering event (e.g., based on a particular or pre-established events occurring) such as a determination of a 3GPP Release 11 deployment, loading of the LN and/or loading of the serving cell, among others. For example, the MME 1514 may choose to have the MRA data path go (or be established) via a HeNB 1522 in a 3GPP Release 10 deployment scenario, while the data path may be changed to (or be established) directly from the LGW 1540 to the SGW 1512 for the downlink (and vice versa for the uplink) when the HeNB 1522 are deployed in a 3GPP Release 11 deployment scenario such as when the LGW 1540 may be standalone.

In certain representative embodiments, the MME 1514 may choose to change the data path to go from (e.g., directly from) the LGW 1540 to the SGW 1512 for the downlink (and vice versa for the uplink) if the HeNB 1522 does not or may not have resources to provide for the MRA session.

In certain representative embodiments, the MME 1514 may choose or may determine to change the data path such that the HeNB 1522 may be in the data path if resources become available at the HeNB 1522. For example, the determination of the path by the MME 1514 may be based on available resources.

In certain representative embodiments, the MRA packets may traverse through or go via the HeNB 1522 for one direction (e.g., either in the downlink or uplink direction), and the traffic in the other direction (the uplink direction, for example), may not traverse through or go via the HeNB 1522. The uplink may be a path from the serving cell to the SGW 1512, and from the SGW 1512 to the LGW 1540.

In certain representative embodiments, the MRA data path may be direct from the HeNB 1522 to the serving cell using an X2 connection in an LTE system, or using a Iurh connection for a 3G system.

MRA Access Control

In certain representative embodiments, access control may be provided by the LGW 1540, the MME 1514 and/or by coordination between the two nodes. The HNB/HeNB 1522 (or the eNB) that may provide coverage to the WTRU 102, may perform access control for the MRA service, (e.g., in the case of direct interface mobility with a non-involved core network). Access control may be provided by the serving cell that may be an HNB/HeNB that is not part of the LN, or an HNB/HeNB that is part of the LN being remotely accessed. The access control may also be based on the MRA access check result from the WTRU 102.

FIG. 17 is a diagram illustrating representative access control scenarios. Referring to FIG. 17, access control may be based on the access credentials scenarios, for example, in any of the combination listed. The access control may be in accordance with or based on the user CSG subscription right, the LIPA subscription right, the MRA subscription right, and/or their association to a specific APN configuration.

In certain representative embodiments, the access control may be based on the APN configuration alone. The access control, in addition to or in lieu of the APN configuration, may be based on, for example, attributes specific to the LHN being remotely accessed or the LGW 1540 being remotely accessed. Such attribute may be, for example, LHN subscriber group membership information (member, not a member, and/or LHN ID, among others), or LGW subscriber group membership information (member, not a member, and/or LGW ID, among others).

The information used to perform the access control may be stored in the HSS (or HLR) and may be retrieved from the HSS (or HLR) by the MME/SGSN 1514 (and/or MSC. among others) at the time of the MRA PDN connectivity establishment. If another entity is in charge of performing the access control, the MME/SGSN 1514 may provide the information to the other entity during the PDN connectivity establishment procedure. For example, the information may be provided to the LGW 1540 by the MME/SGSN 1514 in the Create Session Request Message. The information may be provided to the HeNB that is providing coverage to the WTRU 102 or to the HeNB being remotely accessed in the WTRU Initial Context Setup Request message (and/or by any of the other messages described herein) or in the Bearer Setup Request message. The entities performing access control may be configured with (e.g., directly with) information on the WTRUs 102 which may be allowed access. The information may include the WTRU IMSI and/or MSISDN number.

The access control may be performed at the time of: (1) an MRA PDN connectivity establishment; (2) bearer establishment; and/or (3) when a LIPA session evolves into an MRA session.

For example, when a WTRU 102 desire to transition from a LIPA session to a MRA session in a CSG cell, if the HeNB 1522 allows access for CSG, LIPA and MRA and the HeNB being remotely accessed also allows access for CSG, LIPA and MRA to the WTRU 102, the WTRU may be allowed to transition to the MRA session. As a second example, when a WTRU 102 desire to transition from a LIPA session to a MRA session in a CSG cell, if the HeNB 1522 allows access for CSG and LIPA and does not allow access for MRA and the HeNB being remotely accessed also allows access for CSG, LIPA and MRA to the WTRU 102, the WTRU may be allowed to transition to the MRA session. As a third example, when a WTRU 102 desires to transition from a LIPA session to a MRA session in a CSG cell, if the HeNB being remotely accessed does not allow access for MRA to the WTRU 102, the WTRU is unlikely to be allowed to transition to the MRA session. As a four example, when a WTRU 102 desire to transition from a LIPA session to a MRA session in a CSG cell, if the HeNB 1522 does not allow access for LIPA to the WTRU 102, the WTRU is unlikely to not be allowed to transition to the MRA session. The shaded matrix in FIG. 17 illustrates various combinations of access rights for the hosting party HeNB 1522 and the HeNB that may be remotely accessed (e.g., as a potential serving cell if an MRA session is allowed) and shows certain combinations that may enable MRA session transitions.

MRA During Idle Mode Mobility and Mobility in CELL_FACH State

Figure 18:
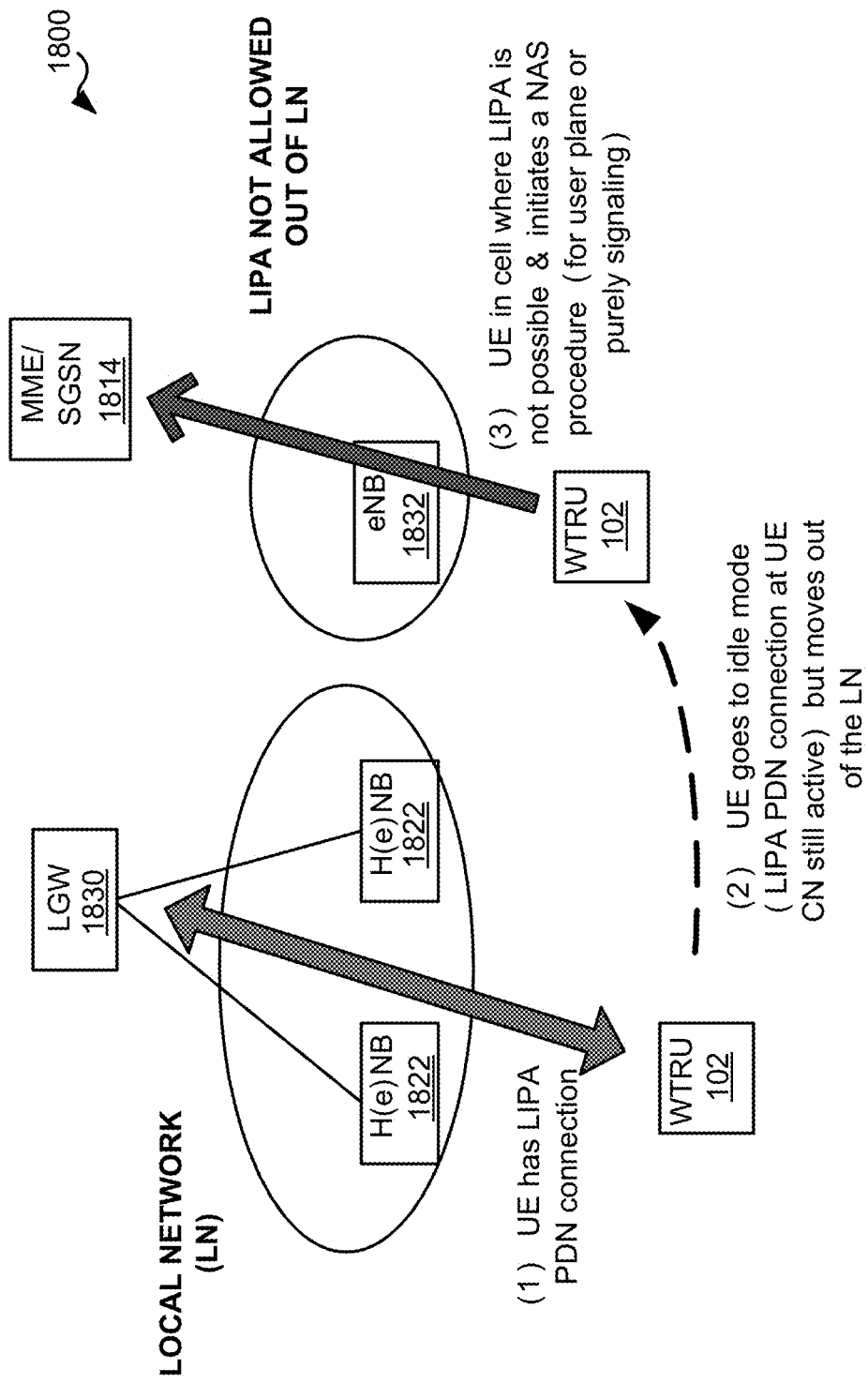
FIG. 18 is a diagram illustrating a WTRU moving out of a LN while in idle mode.

FIG. 18 is a diagram illustrating a WTRU 102 moving out (e.g., outside of the coverage area) of a LN while in idle mode.

Referring to FIG. 18, when the WTRU 102 moves out (e.g., outside of the coverage area) of the LN in idle mode, the WTRU 102 may have established a LIPA PDN connection and may move out of the LN in idle mode to another cell from which it initiates a NAS procedure. The WTRU 102 may not be allowed to have LIPA from the cell on which it initiates the NAS procedure. This scenario is discussed herein.

In a first representative case, the MRA may be allowed for the WTRU 102, which initiates a NAS procedure with the CN in a cell where LIPA is not allowed. If the network receives a NAS message for signaling, the network (e.g., only the network) may take actions to transform the LIPA PDN connection to an MRA session if no user plane (e.g., even if no user plane) is expected by the WTRU 102. The actions taken by the network involve the same or similar procedures (e.g., actions) as the HO case when a LIPA session is resumed as an MRA session.

In a second representative case, the network may not or does not modify the LIPA PDN connection (and/or the associated bearers) if (e.g., even if) the MRA is allowed for the WTRU 102. The network may later resume the LIPA session, as an MRA session, when the WTRU 102 requests user plane resources or initiates a NAS procedure for user plane resources (e.g., via the service request procedure). If the network receives a TAU message with the active flag bit set to 1 (which may indicate that user plane resources are requested by the WTRU 102 via the TAU procedure), the network may respond as if the NAS procedure may be a service request procedure. The network, even though it has received a TAU message, may respond as if a service request procedure is being processed and may resume the LIPA session, as an MRA session.

In a third representative case, the MRA may be currently allowed for the WTRU 102, which may initiate a NAS procedure with the CN in a cell where the LIPA may not be allowed. The following network procedures/actions: may include one or more of:

(1) if the network receives a NAS message for signalling (e.g., only signalling), the network may not deactivate the LIPA PDN connection (e.g., regardless of whether the MRA is allowed or not) for the respective WTRU 102. For example, because the WTRU 102 may return to the HNB/HeNB 1522 where the LIPA was activated and resume the LIPA PDN connection without having to re-establish the PDN connection again;

(2) if the network receives a NAS message for the user plane, the network may deactivate the LIPA PDN connection (e.g., directly) if the MRA is not allowed for the WTRU 102. The same network behaviour is contemplated (e.g., responsive to a TAU message being received with an active flag bit set to 1 (which may indicate user plane resources are requested by the WTRU 102 via the TAU procedure);

(3) the network may start a timer to initiate a guard period during which the WTRU 102 may return to the LN/HeNB where the LIPA is allowed. If the WTRU 102 does not get served by a cell where LIPA is allowed during the lifetime of the timer, the network may deactivate the LIPA PDN connection when the timer expires. If the WTRU 102 resumes the LIPA service before the timer expires, the network may stop the timer. The network may also stop the timer if the WTRU 102 resumes the session as an MRA session from a cell where the MRA is allowed. The WTRU 102 may start a timer as explained above when the WTRU 102 leaves the cell or local network 1520 where a LIPA PDN connection was established. If the timer expires and the WTRU 102 does not return to the cell or local network 1520 where LIPA session was established, the WTRU 102 may send a NAS message e.g. TAU to the MME 1514. The WTRU 102 may indicate that it has deactivated the LIPA PDN connection or the bearers that were associated with the LIPA PDN connection.

The same or a similar network behavior is contemplated for the case when a WTRU 102 with LIPA session performs cell reselection in CELL_FACH state (e.g., an RRC connected mode in a 3G system) to a cell where the MRA is allowed. When the CN (e.g., SGSN) notices that the WTRU 102 has moved to a new cell, the CN may verify if the MRA is allowed for the respective WTRU 102 (when an LIPA PDN connection has been established). If the MRA is allowed, the network may take the same actions as described for connected mode mobility and session setup to resume the LIPA session, as an MRA session.

MRA Activation During Inter RAT Idle Mode Reselection

In certain representative embodiments, the MRA may be activated when a WTRU 102 reselects from LTE (e.g., with LIPA bearers active) to UTRAN. The MRA may be triggered, for example, by allowing a user request: (1) (i) that the LIPA connection be maintained, and/or (ii) that the current Local Service be maintained; and/or (2) pre-configuring the WTRU 102 to request the MRA when reselecting to a new cell. The new cell may be a UTRAN cell. If the Idle state Signaling Reduction (ISR) is active, and no signaling connection exists, although LIPA bearers may still be active, the WTRU 102 may request to maintain the service by sending a Service Request (or any other NAS message) indicating the MRA. The WTRU 102 itself may indicate what bearers are LIPA bearers or the MME 1514 may provide the SGSN with the information.

In certain representative embodiments, the MME 1514 may provide the SGSN with the LIPA (or LIIP) bearer information during a Context Request/Response procedure. The information along with, for example, user request and/or MRA subscription pre-configuration, among others, may allow the SGSN to trigger MRA connectivity for LIPA bearers. The WTRU 102 may provide the LIPA bearer information to the SGSN (e.g., through an enhanced or new Service Request) indicating which bearers are LIPA bearers. The WTRU 102 may get the information from the MME 1514 thorough the PDN Connectivity Type. The WTRU 102 may indicate whether a user desires to tear down, release, or deactivate the LIPA bearers or the user desires to keep or maintain them as MRA bearers. The WTRU 102 may provide the information through the 3G enhanced Service Request messages (e.g., for an ISR case) or through a RAU message, if ISR is not active.

Other Architecture Alternative Solutions for MRA

A representative architecture may be realized which may depending on or be based on the LGW 1540 deployment architecture: for example, (a) with Sxx that may be user plane (e.g., user plane only); (b) with Sxx that may be both user plane and control plane; and/or (c) with a Standalone LGW 1540 on the S1/Iuh path.

In certain representative embodiments, the MRA may also be realized with the core network being bypassed in the user plane or in both the user plane and the control plane. This may be the case for the scenarios where direct interface based procedures are used between the macro network and the femto network. An example of the user plane path may include: (1) for UMTS: LGW→HNB→HNB-GW→NB on DL for user plane only or both user plane and control plane and the reverse path may apply in the uplink direction; (2) for LTE: LGW→HeNB→HeNB-GW→eNB (or LGW→HeNB-eNB) on DL for user plane (e.g., user plane only) or both user plane and control plane and the reverse path may apply in the uplink direction.

Another representative architecture may include bypassing the HNB/HeNB 1522 and accessing the local home network directly through the LGW 1540 (e.g., (1) through CN: LGW→SGW→serving cell→WTRU for DL MRA packets (and the reverse direction for UL packets); and/or (2) LGW→H(e)NB-GW→serving cell→WTRU for DL with the reversed direction for UL packets) for a direct interface.

It is contemplated that all of the representative architectures may be implemented with the same or similar procedure as set forth above to enable LIPA to MRA or MRA to LIPA session operations.

FIG. 19 is a flow chart illustrating a representative handover method.

Referring to FIG. 19, in the representative handover method 1900, a WTRU 102 may move between, for example, a local network 1320 and another network 1330 and the WTRU 102 may have established a communication session, as a LIPA session, in the local network 1320 via a first Access Point (AP) 1322. At block 1910, the first AP 1322 may handover the communication session with the WTRU 102 to the second AP 1332 and a communication path may be established at least between the first AP 1322 and the second AP 1332. At block 1920, the first AP 1322 may relay packets that are associated with the communication session via the established communication path towards the second AP 1332.

In certain representative embodiments, the handing over of the communication session may include the first AP 1322 maintaining at least one wireless resource between the first AP 1322 and the WTRU 102 prior to the handover of the communication session and discontinuing the at least one wireless resource between the first AP 1322 and the WTRU 102 after the handover.

In certain representative embodiments, the maintaining of the at least one wireless resource prior to the handover of the communication session may include maintaining at least one radio bearer between the first AP 1322 and the WTRU 102; and the discontinuing of the at least one wireless resource between the first AP 1322 and WTRU 102 may include terminating the at least one radio bearer between the first AP 1322 and the WTRU 102.

In certain representative embodiments, the LIPA session between the first AP 1322 and the WTRU 102 may be transitioned to a MRA session using the second AP 1332.

In certain representative embodiments, the discontinuing of the wireless resources between the first AP 1322 and the WTRU 102 may be based on completion of the transitioning of the LIPA session to the MRA session.

In certain representative embodiments, the discontinuing of the wireless resources between the first AP 1322 and the WTRU 102 may occur: (1) at the same time as the discontinuing of the LIPA session; (2) after the transitioning to the MRA session based on a trigger condition; or (3) at a predetermined time after the transitioning to the MRA session.

In certain representative embodiments, the communication path between the first AP 1322 and the second AP 1332 may be established by setting the communication path to traverse at least one gateway 1312 disposed outside of the local network 1320 and the other network 1330.

In certain representative embodiments, the handing over of the communication session may include the first AP 1322 discontinuing at least one wireless resource between the first AP 1322 and the WTRU 102 while maintaining a connection with the at least one gateway 1312 disposed outside of the local network 1320 and the other network 1330.

In certain representative embodiments, the first AP 1322 may receive a relay indication indicating whether to relay or whether to stop relaying packets towards the second AP 1332.

In certain representative embodiments, the first AP 1322 may set a context for managing the WTRU 102 that is being wirelessly served by the second AP 1332 and may prevent any allocation of radio resources with the WTRU 102 while the context is set.

FIG. 20 is a flow chart illustrating a representative setup method.

Referring to FIG. 20, in the representative setup method 2000 for setting up a communication path for a MRA session in the local network or another network, a WTRU 102 may have established a communication session, as a LIPA session, in the local network 1520 via a first Access Point (AP) 1522. At block 2010, a network entity 1514 outside the local network 1520 may receive a request to setup the MRA session. At block 2020, the network entity 1514 may send one or more messages to establish a plurality of tunnels for the MRA session to setup the communication path at least between the first AP 1522 and a second AP 1532.

In certain representative embodiments, the sending of the one or more messages may include sending one or more messages to setup a first tunnel between a gateway 1512 and the first AP 1522 in the local network 1520 and to setup a second tunnel between the gateway 1512 and the second AP 1532 in the local network 1520 or the other network 1530.

In certain representative embodiments, the sending of the one or more messages may include sending information or parameters to the first AP 1522 exclusive of information or parameters for operation of the radio interface.

In certain representative embodiments, the network entity may determine the second AP 1532 to be used for the MRA session in accordance with one or more access criteria set forth, for example, in the disclosure related to FIG. 17 above.

In certain representative embodiments, the network entity 1514 may send information to a gateway 1512 that is an endpoint of at least one of the plurality of tunnels to inform the gateway 1512 that the first downlink packet after a specified WTRU 102 transitions to connected mode from idle mode is to be sent towards the second AP 1532.

In certain representative embodiments, the established LIPA session may be continued, as the MRA session by controlling a release of radio resources at the first AP 1522.

In certain representative embodiments, the network entity 1514 may modify a path used for data exchange (e.g., the communication path) by the WTRU 102 based on a configuration of a local gateway in the local network 1520.

In certain representative embodiments, the network entity 1514 may modify the communication path used for the WTRU 102 based on an available resource e.g., (at the first AP 1522, at the second AP 1532 or based on loading criteria, among others).

FIG. 21 is a flow chart illustrating another representative handover method.

Referring to FIG. 21, in the representative handover method 2100, the WTRU 102 may move between, for example, a local network 1520 and another network 1530 and the WTRU 102 may have established a communication session, as a LIPA session, in the local network 1520 via a first AP 1522. At block 2110, the network entity 1514 may determine whether the other network 1530 is allowed to be accessed by the WTRU 102 in accordance with one or more criteria. At block 2120, the network entity 1514 may control establishment of a communication path at least between the first AP 1522 in the local network 1520 and a second AP 1530 in the other network 1530, responsive to a determined result. The controlling of the establishment may include: (1) initiating a first tunnel having a first tunnel endpoint of a local gateway 1540 and a second tunnel endpoint of the first AP 1522; (2) initiating a second tunnel having a first tunnel endpoint of a gateway 1512 and a second tunnel endpoint of the first AP 1522; and (3) setting the communication path to traverse the first and second tunnels via the gateway 1512 disposed outside of the local network 1520 and the other network 1530.

In certain representative embodiments, the network entity 1514 may modify a downlink path from the local gateway to the WTRU 102 and an uplink path from the WTRU 102 to the local gateway 1540 such that at least portions of the downlink and uplink paths are different.

In certain representative embodiments, the data path in the MRA session from the first AP 1522 to the serving cell 1532 (e.g., the second AP) may use an X2 connection in an LTE system, or may use an Iurh connection for a 3G system.

In certain representative embodiments, access control may be performed at a time when the LIPA session transitions into the MRA session.

In certain representative embodiments, a NAS procedure may be implemented in the other network 1530 while the WTRU 102 is in idle mode.

In certain representative embodiments, each connection in the local network 1520 may be maintained for at least a predetermined period; and the WTRU 102 may transition back to the LIPA session before the predetermined period expires.

FIG. 22 is a flow chart illustrating a further representative handover method.

Referring to FIG. 22, in the representative handover method 2200, the WTRU 102 may move between, for example, a local network 1520 and another network 1530 and the WTRU 102 may have established a communication session, as a LIPA session, in the local network 1520 via a first AP 1522. At block 2210, the second AP 1532 in the other network 1530 may receive a request form the WTRU 102 to connect to the other network 1530. At block 2220, the LIPA session in the local network 1520 may be transitioned to a MRA session in the other network 1530. For example, the transitioning may include establishing a communication path between the first AP 1522 and the second AP 1532 via a gateway 1512, and informing the gateway 1512 of the transition to the MRA session.

FIG. 23 is a flow chart illustrating an additional representative handover method.

Referring to FIG. 23, in the representative handover method 2300, the WTRU 102 may move between, for example, a local network 1520 and another network 1530 and the WTRU 102 may have established a communication session, as a MRA session, in the other network 1530 using the established communication path between a first AP 1522 and a second AP 1532 wirelessly serving the WTRU 102. At block 2310, the first AP 1522 may relay packets that are associated with the communication session via the established communication path towards the second AP 1532. At block 2320, the first AP 1522 may establish at least one radio bearer between the first AP 1522 and the WTRU 102. At block 2330, the first AP 1522 may transition the MRA session between the second AP 1532 and the WTRU 102 in the other network 1530 to a LIPA session in the local network 1520 using the established at least one radio bearer between the first AP 1522 and the WTRU 102.

In certain representative embodiments, the transitioning of the MRA session to the LIPA session may include the first AP 1522 terminating relaying of packets that are associated with the communication session via the established communication path.

In certain representative embodiments, the terminating of the relaying of the packets occurs: (1) at the same time as the transitioning to the of the MRA session to the LIPA session; (2) after the transitioning to the MRA session based on a trigger condition; and/or (3) at a predetermined time after the transitioning of the MRA session to the LIPA session.

In certain representative embodiments, the established communication path between the first AP 1522 and the second AP 1532 may be discontinued after establishing of the at least one radio bearer between the first AP 1522 and the WTRU 102.

In certain representative embodiments, the first AP 1522 may receive a relay indication indicating whether to relay or whether to stop relaying packets towards the second AP 1532.

In certain representative embodiments, the first AP 1522 may update a MRA context for managing the WTRU 102 that is being wirelessly served by the second AP 1532 to a second context for the first AP 1522 to wirelessly serve the WTRU 102.

In certain representative embodiments, data from the WTRU 102 during the LIPA session may be sent towards a destination via a local gateway 1540 exclusive of any core network 1512 and 1514.

FIG. 24 is a flow chart illustrating a representative termination method.

Referring to FIG. 24, the representative termination method 2400 may terminate a communication path for a MRA session in the local network 1520 or another network 1530 responsive to a LIPA session being established in the local network 1520 via a first AP 1522. At block 2410, a network entity 1514 outside the local network 1520 may receive a request to setup the LIPA session. At block 2420, the network entity 1514 may send one or more messages to discontinue at least a first tunnel between a gateway 1512 and the first AP 1522 in the local network 1520 and a second tunnel between the gateway 1512 and the second AP 1532 in the local network 1520 or the other network 1530.

In certain representative embodiments, the sending of the one or more messages may include sending information or parameters to the first AP 1522 including information or parameters for operation of the radio interface between the first AP 1522 and the WTRU 102.

FIG. 25 is a flow chart illustrating yet another representative handover method 2500.

Referring to FIG. 25, in the representative handover method 2500, the WTRU 102 may move between the local network 1520 and another network 1530 and the WTRU 102 may have established an MRA session via a first AP 1522. At block 2510, a request to connect to the local network may be received. At block 2520, the MRA session in the other network 1530 may be transitioned to a LIPA session. For example, the transitioning may include discontinuing an established communication path between the second AP 1532 and a local gateway 1540 and informing the local gateway 1540 of the transition to the LIPA session.

In certain representative embodiments, data may be sent from the WTRU 102 during the LIPA session towards a destination via the local gateway 1540 exclusive of any core network 1512 and 1514.

In certain representative embodiments, the network entity 1514 may send a message to inform a second gateway 1512, disposed between the first and second APs 1522 and 1532, to not forward uplink packets towards the local network 1520.

In certain representative embodiments, the transitioning to the LIPA session may include continuing the LIPA session, as the MRA session, by establishing radio resources at the first AP 1522.

In certain representative embodiments, the network entity may include at least one of: (1) a Mobile Management entity 1514; (2) the local gateway 1540 or (3) an AP 1522 that does not directly serve the WTRU 102.

FIG. 26 is a flow chart illustrating a representative selection method 2600.

Referring to FIG. 26, in the representative selection method 2600, an AP 1522 may be selected to enable MRA for a WTRU 102. At block 2610, a network entity (e.g., the MME 1514) via its transmit/receive unit may receive a request (e.g., a request, for example, for an MRA session from the WTRU 102 or second AP 1532). For example, the request may be while the WTRU 102 is in connected mode or after the WTRU 102 transitions from idle mode back to connected mode. At block 2620, the network entity (e.g., the MME 1514) via its processor may determine the first AP 1522 to be used for MRA for the WTRU 102 wirelessly served by the second AP 1532. The determination may be based on criteria previously described herein. At block 2630, the network entity 1514 may send one or more messages to setup the first AP 1522.

FIG. 27 is a flow chart illustrating a representative setup method 2700.

Referring to FIG. 27, in the representative setup method 2700, a MRA session for a WTRU 102 may be setup via first and second APs 1522 and 1532. At block 2710, a gateway (e.g., the SGW 1512) via its transmit/receive unit may receive a setup message (e.g., to setup a plurality of tunnels with the first AP 1522 and the second AP 1532) At block 2720, the gateway (e.g., the SGW 1512) via its processor may setup a first tunnel between the gateway 1512 and the first AP 1522 and a second tunnel between the gateway 1512 and the second AP 1532.

FIG. 28 is a flow chart illustrating a representative setup method 2800.

Referring to FIG. 28, in the representative setup method 2800, a MRA session for a WTRU 102 may be setup via an AP 1522. At block 2810, the AP 1522 (e.g., an HeNB or eNB) via its transmit/receive unit may receive a setup message (e.g., indicating a context associated with the WTRU 102 that is not being served wirelessly by the AP 1522) For example, the WTRU 102 may be served by AP 1532 which has a different context which may include radio resources for the WTRU 102. As another example, the AP 1522 may have resource (e.g., for relaying communication towards the WTRU 102 but may not have radio resources used to directly communicate with the WTRU 102). All resources (radio and/or non-radio resources) may be set via the context. At block 2820, the AP 1522 may setup via its processor the received context.

FIG. 29 is a flow chart illustrating a representative method 2900.

Referring to FIG. 29, in the representative method 2900, a LIPA session for a WTRU 102 that is moving out of a local network 1520 in idle mode may be managed. At block 2910, a network entity (e.g., the MME 1514) may receive via its transmit/receive unit a first message (e.g., a NAS message associated with the WTRU 102, for example, a tracking area update message or another message as disclosed herein). At block 2920, the network entity 1514 via its processor may determine whether or not to maintain the LIPA session based on the received first message, as a determined result. For example, the determination of whether to maintain the LIPA session may be based on the type of message (e.g., the type of NAS message, whether the message identifies a request, the timing of the message and/or other criteria as set forth above). At block 2930, the network entity via its transmit/receive unit may send a second message to maintain or to terminate the LIPA session in accordance with the determined result. For example, the LIPA session may be terminated, terminated after a predetermined time if the WTRU 102 does not return to the local network 1520 or maintained until terminated by an independent termination triggering event. The LIPA session may be maintained while the WTRU 102 is wirelessly served by an AP 1532 outside the local network 1520.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU 102, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Representative Embodiments

In at least one embodiment, a method for handover of a Wireless Transmitter/Receiver Unit (WTRU) moving between a local network and another network or first and second Access Points (APs) in the local network is disclosed, and the WTRU may have established a communication session, as a Local IP access (LIPA) session, in the local network via the first AP. The method may comprise handing over, by the first AP to the second AP, the communication session with the WTRU, a communication path being established at least between the first AP and the second AP; and relaying, by the first AP, packets that are associated with the communication session via the established communication path towards the second AP.

In at least one embodiment, the handing over of the communication session may include maintaining, by the first AP, at least one wireless resource between the first AP and the WTRU prior to the handover of the communication session; and discontinuing, by the first AP, the at least one wireless resource between the first AP and the WTRU.

In at least one embodiment, the maintaining of the at least one wireless resource prior to the handover of the communication session may include maintaining at least one radio bearer between the first AP and the WTRU; and the discontinuing of the at least one wireless resource between the first AP and WTRU may include: maintaining, by the first AP, established resources with one or more gateways associated with the WTRU and deactivating the at least one wireless resource that were being used for the WTRU.

In at least one embodiment, the method may further comprise transitioning the LIPA session between the first AP and the WTRU to a managed remote access (MRA) session using the second AP.

In at least one embodiment, the discontinuing of the wireless resources between the first AP and the WTRU may be based on completion of the transitioning of the LIPA session to the MRA session.

In at least one embodiment, the discontinuing of the wireless resources between the first AP and the WTRU may occur: (1) at the same time as the discontinuing of the LIPA session; (2) after the transitioning to the MRA session based on a trigger condition; or (3) at a predetermined time after the transitioning to the MRA session.

In at least one embodiment, the method may further comprise establishing the communication path between the first AP and the second AP by setting the communication path to traverse at least one gateway disposed outside of the local network and the other network.

In at least one embodiment, the handing over of the communication session may include discontinuing, by the first AP, at least one wireless resource between the first AP and the WTRU while maintaining a connection with the at least one gateway disposed outside of the local network and the other network.

In at least one embodiment, the method may further comprise receiving, by the first AP, a relay indication indicating whether to relay or whether to stop relaying packets towards the second AP.

In at least one embodiment, the method may further comprise: setting, at the first AP, a context for managing the WTRU that is being wirelessly served by the second AP; and preventing, by the first AP, any allocation of radio resources with the WTRU while the context is set.

In at least one embodiment, a method for setting up a communication path for a Managed Remote Access (MRA) session in the local network or another network responsive to a Local IP access (LIPA) session having been established in the local network via a first Access Point (AP) is disclosed. The method may comprise: receiving, by a network entity outside the local network, a request to setup the MRA session; and sending, by the network entity, one or more messages to establish a plurality of tunnels for the MRA session to setup the communication path at least between the first AP and a second AP.

In at least one embodiment, the sending of the one or more messages may include sending one or more messages to setup a first tunnel between a gateway and the first AP in the local network and to setup a second tunnel between the gateway and the second AP in the local network or the other network.

In at least one embodiment, the sending of the one or more messages may include sending information or parameters to the first AP exclusive of information or parameters for operation of the radio interface.

In at least one embodiment, the method may further comprise determining, by the network entity, the second AP to be used for the MRA session in accordance with one or more access criteria.

In at least one embodiment, the method may further comprise continuing the established LIPA session, as the MRA session by controlling a release of radio resources at the first AP.

In at least one embodiment, the method may further comprise modifying, by a network entity, a path used for data exchange by a Wireless Transmitter/Receiver Unit (WTRU) based on a configuration of a local gateway in the local network.

In at least one embodiment, the method may further comprise modifying, by the network entity, a communication path used for a Wireless Transmitter/Receiver Unit (WTRU) based on an available resource at the first AP.

In at least one embodiment, a method for handover of a Wireless Transmitter/Receiver Unit (WTRU) moving between another network is disclosed. The WTRU may have established a communication session, as a Local IP access (LIPA) session, in the local network via a first Access Point (AP). The method may comprise: determining, by a network entity, whether the other network is allowed to be accessed by the WTRU in accordance with one or more criteria; and; controlling establishment of a communication path at least between the first AP in the local network and a second AP in the other network, responsive to a determined result by: initiating a first tunnel having a first tunnel endpoint of a local gateway and a second tunnel endpoint of the first AP; initiating a second tunnel having a first tunnel endpoint of a second gateway and a second tunnel endpoint of the first AP; and setting the communication path to traverse the first and second tunnels via the second gateway disposed outside of the local network and the other network.

In at least one embodiment, the method may further comprise modifying a downlink path from the local gateway to a Wireless Transmitter/Receiver Unit (WTRU) and an uplink path from the WTRU to the local gateway, wherein at least a portion of the downlink and uplink paths are different.

In at least one embodiment, the method may further comprise establishing the data path in the MRA session from the first AP to the serving cell using an X2 connection in an LTE system, or using Iurh connection for a 3G system.

In at least one embodiment, the method may further comprise performing access control at a time when the LIPA session transitions into the MRA session.

In at least one embodiment, the method may further comprise implementing a NAS procedure in the other network while the WTRU is in idle mode.

In at least one embodiment, the method may further comprise maintaining each connection in the local network for at least a predetermined period; and transitioning back to the LIPA session before the predetermined period expires.

In at least one embodiment, a method for handover of a Wireless Transmitter/Receiver Unit (WTRU) moving between a local network and another network is disclosed. The WTRU may have established a Local IP access (LIPA) session in the local network via a first Access Point (AP). The method may comprise: receiving, by a second AP in the other network, a request to connect to the other network; and transitioning the LIPA session in the local network to a Managed Remote Access (MRA) session in the other network by: establishing a communication path between the first AP and the second AP via a gateway, and informing the gateway of the transition to the MRA session.

In at least one embodiment, a method for handover of a Wireless Transmitter/Receiver Unit (WTRU) moving between a local network and another network is disclosed. The WTRU may have established a communication session, as a Managed Remote access (MRA) session, in the other network using an established communication path between a first AP and a second AP wirelessly serving the WTRU. The method may comprise: relaying, by the first AP, packets that are associated with the communication session via the established communication path towards the second AP; establishing at least one radio bearer between the first AP and the WTRU; and transitioning the MRA session between the second AP and the WTRU in the other network to a Local IP access (LIPA) session in the local network using the established at least one radio bearer between the first AP and the WTRU.

In at least one embodiment, the transitioning of the MRA session to the LIPA session may include terminating, by the first AP, the relaying of packets that are associated with the communication session via the established communication path.

In at least one embodiment, the terminating of the relaying of the packets may occur: (1) at the same time as the transitioning to the of the MRA session to the LIPA session; (2) after the transitioning to the MRA session based on a trigger condition; or (3) at a predetermined time after the transitioning of the MRA session to the LIPA session.

In at least one embodiment, the method may further comprise discontinuing the established communication path between the first AP and the second AP after the establishing of the at least one radio bearer between the first AP and the WTRU.

In at least one embodiment, the method may further comprise receiving, by the first AP, a relay indication indicating whether to relay or whether to stop relaying packets towards the second AP.

In at least one embodiment, the method may further comprise updating, at the first AP, a MRA context for managing the WTRU that is being wirelessly served by the second AP to a second context for the first AP to wirelessly serve the WTRU.

In at least one embodiment, the method may further comprise sending data from the WTRU during the LIPA session towards a destination via a local gateway exclusive of any core network.

In at least one embodiment, a method, a method for terminating a communication path for a Managed Remote Access (MRA) session in the local network or another network responsive to a Local IP access (LIPA) session being established in the local network via a first Access Point (AP) is disclosed. The method may comprise: receiving, by a network entity outside the local network, a request to setup the LIPA session; and sending, by the network entity, one or more messages to discontinue at least a first tunnel between a gateway and the first AP in the local network and a second tunnel between the gateway and the second AP in the local network or the other network.

In at least one embodiment, the sending of the one or more messages may include sending information or parameters to the first AP including information or parameters for operation of the radio interface between the first AP and a Wireless Transmitter/Receiver Unit (WTRU).

In at least one embodiment, a method for handover of a Wireless Transmitter/Receiver Unit (WTRU) moving between a local network and another network is disclosed. The WTRU may have established Managed Remote Access (MRA) session via a first Access Point (AP). The method may comprise: receiving a request to connect to the local network; and transitioning the MRA session in the other network to a Local IP Access (LIPA) session by discontinuing an established communication path between the second AP and a local gateway, and informing the local gateway of the transition to the LIPA session.

In at least one embodiment, the method may further comprise sending data from the WTRU during the LIPA session towards a destination via the local gateway exclusive of any core network.

In at least one embodiment, the method may further comprise sending, by a network entity, a message to inform a second gateway, disposed between the first and second APs, to not forward uplink packets towards the local network In at least one embodiment, the transitioning to the LIPA session may include continuing the MRA session, as the LIPA session, by establishing radio resources at the first AP.

In at least one embodiment, the network entity may include at least one of: (1) a Mobile Management Entity; (2) the local gateway or (3) an AP that does not directly serve the WTRU.

In at least one embodiment, an access point (AP) for handover of a Wireless Transmitter/Receiver Unit (WTRU) moving between a local network and another network is disclosed. The WTRU may have established a communication session, as a Local IP access (LIPA) session, in the local network via the AP wirelessly serving the WTRU. The AP may comprise: a send/receive unit configured to relay packets towards a second AP that are associated with the communication session via a communication path established at least between the first AP and the second AP; and a controller configured to hand over to the second AP, the communication session with the WTRU.

In at least one embodiment, the controller may be configured to: maintain at least one wireless resource between the AP and the WTRU prior to handover of the communication session; and discontinue the at least one wireless resource between the AP and the WTRU.

In at least one embodiment, the controller may be configured to: maintain at least one radio bearer between the AP and the WTRU prior to handover; and terminate the at least one radio bearer between the first AP and the WTRU after the handover.

In at least one embodiment, the controller may be configured to discontinue the wireless resources between the AP and the WTRU based on completion of the handover.

In at least one embodiment, the controller may be configured to discontinue the wireless resources between the AP and the WTRU: (1) at the same time as a discontinuation of the LIPA session; (2) after a transition to the MRA session based on a trigger condition; or (3) at a predetermined time after the transition to the MRA session.

In at least one embodiment, the controller may be configured to discontinue at least one wireless resource between the first AP and the WTRU while maintaining a connection with at least one gateway disposed outside of the local network.

In at least one embodiment, the send/receive unit may be configured to receive a relay indication indicating whether to relay or whether to stop relaying packets towards the second AP; and the controller may be configured to control relaying of packets based on the received relay indication.

In at least one embodiment, the send/receive unit may be configured to receive a MRA context for managing the WTRU that is being wirelessly served by the second AP; and the controller may be configured to prevent any allocation of radio resources with the WTRU in accordance with the received MRA context.

In at least one embodiment, a network entity (NE) may be configured to setup a communication path for a Managed Remote Access (MRA) session in the local network or another network responsive to a Local IP access (LIPA) session having been established in the local network via a first Access Point (AP). The NE may comprise: a send/receive unit configured to receive a request to setup the MRA session; and a processor configured to determine endpoints of tunnels for the MRA session to send one or more messages in accordance with one or more access criteria, wherein the send/receive unit may be configured to send the one or more messages to establish the tunnels for the MRA session to setup the communication path at least between the first AP and a second AP.

In at least one embodiment, the send/receive unit may be configured to send information to a gateway which is an endpoint of at least one of the plurality of tunnels to inform the gateway that the first downlink packet after a specified WTRU transitions to connected mode from idle mode is to be sent towards the second AP.

In at least one embodiment, the NE may be configured to continue the established LIPA session, as the MRA session by controlling a release of radio resources at the first AP.

In at least one embodiment, the NE may be configured to modify a path used for data exchange by a Wireless Transmitter/Receiver Unit (WTRU) based on a configuration of a local gateway in the local network.

In at least one embodiment, the NE may be configured to modify a communication path used for a Wireless Transmitter/Receiver Unit (WTRU) based on an available resource at the first AP.

In at least one embodiment, a network entity (NE) may be configured to control handover of a Wireless Transmitter/Receiver Unit (WTRU) moving between another network. The WTRU may have established a communication session, as a Local IP access (LIPA) session, in the local network via a first Access Point (AP) wirelessly serving the WTRU. The NE may comprise: a controller configured to determine whether the other network is allowed to be accessed by the WTRU in accordance with one or more criteria and control establishment of a communication path at least between the first AP in the local network and a second AP in the other network, responsive to a determined result such that a first tunnel is initiated having a first tunnel endpoint of a local gateway and a second tunnel endpoint of the first AP and a second tunnel is initiated having a first tunnel endpoint of a serving gateway and a second tunnel endpoint of the first AP, wherein the controller is further configured to set the communication path to traverse the first and second tunnels via the at least one gateway.

In at least one embodiment, an access point (AP) may be configured to handover a Wireless Transmitter/Receiver Unit (WTRU) moving between a local network and another network. The WTRU may have established a Local IP access (LIPA) session in the local network via a first Access Point (AP) wirelessly serving the WTRU. The AP may comprise: a send/receive unit configured to receive a request to connect to the other network; and a controller configured to transition the LIPA session in the local network to a Managed Remote Access (MRA) session in the other network by establishing a communication path between the first AP and the second AP via a gateway, and informing the gateway of the transition to the MRA session.

In at least one embodiment, an access point (AP) may be configured to handover a Wireless Transmitter/Receiver Unit (WTRU) moving between a local network and another network. The WTRU may have established a communication session, as a Managed Remote access (MRA) session, in the other network using an established communication path between a first AP and a second AP wirelessly serving the WTRU. The AP may comprise: a send/receive unit configured to relay packets that are associated with the communication session via the established communication path towards the second AP; and a controller configured to establish at least one radio bearer between the AP and the WTRU; and transition the MRA session between the second AP and the WTRU in the other network to a Local IP access (LIPA) session in the local network using the established at least one radio bearer between the AP and the WTRU.

In at least one embodiment, the controller may be configured to terminate relaying of packets that are associated with the communication session via the established communication path.

In at least one embodiment, the controller may be configured to terminate the relaying of the packets: (1) at the same time as the transition of the MRA session to the LIPA session; (2) after the transition to the MRA session based on a trigger condition; or (3) at a predetermined time after the transitioning of the MRA session to the LIPA session.

In at least one embodiment, the controller may be configured to discontinue the established communication path between the first AP and the second AP after the establishment of the at least one radio bearer between the first AP and the WTRU.

In at least one embodiment, the send/receive unit may be configured to receive a relay indication indicating whether to relay or whether to stop relaying packets towards the second AP.

In at least one embodiment, the controller may be configured to update a MRA context for managing the WTRU that is being wirelessly served by the second AP to a second context for the AP to wirelessly serve the WTRU.

In at least one embodiment, the send/receive unit may be configured to send data from the WTRU during the LIPA session towards a destination via the local gateway exclusive of any core network.

In at least one embodiment, a network entity (NE) may be configured to terminate a communication path for a Managed Remote Access (MRA) session in the local network or another network responsive to a Local IP access (LIPA) session being established in the local network via a first Access Point (AP). The NE may comprise: a send/receive unit configured to receive a request to setup the LIPA session; and send one or more messages to discontinue at least a first tunnel between a gateway and the first AP in the local network and a second tunnel between the gateway and the second AP in the local network or the other network.

In at least one embodiment, the send/receive unit may be configured to send information or parameters to the first AP including information or parameters for operation of the radio interface between the first AP and a Wireless Transmitter/Receiver Unit (WTRU).

In at least one embodiment, the NE may include at least one of: (1) a Mobile Management entity; (2) a local gateway or (3) an AP, which does not directly serve the WTRU.

In at least one embodiment, an access point (AP) for controlling handover of a Wireless Transmitter/Receiver Unit (WTRU) moving between a local network and another network is disclosed. The WTRU may have established a Managed Remote Access (MRA) session via the AP and a second AP wirelessly serving the WTRU. The AP may comprise a send/receive unit configured to receive a request to connect to the local network; and a controller configured to control transition of the MRA session to a LIPA session in the local network by managing a discontinuation of a path between the first AP in the local network and the second AP in the other network and controlling sending of information to a local gateway to transition to the LIPA session such that packets associated the MRA session are not sent toward the established path between the first AP and the second AP.

In at least one embodiment, a method for setting up a communication path for a Managed Remote Access (MRA) session in the local network or another network via a first Access Point (AP) is disclosed. The method may comprise: receiving, by a network entity outside the local network, a request to setup the MRA session; and sending, by the network entity, one or more messages to establish a plurality of tunnels for the MRA session to setup the communication path at least between the first AP and a second AP.

In at least one embodiment, a method for terminating a communication path for a Managed Remote Access (MRA) session in the local network or another network via a first Access Point (AP) is disclosed. The method may comprise: receiving, by a network entity outside the local network, a request; and sending, by the network entity, one or more messages to discontinue at least a first tunnel between a gateway and the first AP in the local network and a second tunnel between the gateway and a second AP in the local network or the other network.

In at least one embodiment, a network entity (NE) is configured to setup a communication path for a Managed Remote Access (MRA) session in the local network or another network via a first Access Point (AP). The NE may comprise: a send/receive unit configured to receive a request to setup the MRA session; and a processor configured to determine endpoints of tunnels for the MRA session to send one or more messages in accordance with one or more access criteria, wherein the send/receive unit is configured to send the one or more messages to establish the tunnels for the MRA session to setup the communication path at least between the first AP and a second AP.

In at least one embodiment, a network entity (NE) is configured to terminate a communication path for a Managed Remote Access (MRA) session in the local network or another network via a first Access Point (AP). The NE may comprise: a send/receive unit configured to receive a request and send one or more messages to discontinue at least a first tunnel between a gateway and the first AP in the local network and a second tunnel between the gateway and the second AP in the local network or the other network.

In at least one embodiment, a method for selection of an Access Point (AP) for Managed Remote Access (MRA) of a Wireless Transmit/Receive Unit (WTRU) is disclosed. The method may comprise: receiving, by a network entity, a request; determining, by the network entity, a first AP to be used for MRA for the WTRU wirelessly served by a second AP; and sending, by the network entity, one or more messages to setup the first AP.

In at least one embodiment, a method for setup of Managed Remote Access (MRA) for a Wireless Transmit/Receive Unit (WTRU) via first and second Access Points (APs) is disclosed. The method may comprise: receiving, by a gateway, a setup message; and setting up, by the gateway, a first tunnel between the gateway and the first AP and a second tunnel between the gateway and the second AP.

In at least one embodiment, a network entity (NE) is configured to select an Access Point (AP) for Managed Remote Access (MRA) of a Wireless Transmit/Receive Unit (WTRU). The NE may comprise: a transmit/receive unit configured to receive a request; and a processor configured to determine a first AP to be used for MRA for the WTRU wirelessly served by a second AP, wherein the transmit/receive unit is configured to send one or more messages to setup the first AP.

In at least one embodiment, a gateway is configured to setup a Managed Remote Access (MRA) of a Wireless Transmit/Receive Unit (WTRU) via first and second Access Points (APs). The gateway may comprise: a transmit/receive unit configured to receive a setup message; and a processor configured to setup a first tunnel between the gateway and the first AP and a second tunnel between the gateway and the second AP.

In at least one embodiment, a method for setup of Managed Remote Access (MRA) for a Wireless Transmit/Receive Unit (WTRU) via an Access Point (AP) is disclosed. The method may comprise: receiving, by the AP, a setup message indicating a context for the WTRU that is not being served wirelessly by the AP; and setting up, by the AP, the received context.

In at least one embodiment, an Access Point (AP) is configured to setup a Managed Remote Access (MRA) for a Wireless Transmit/Receive Unit (WTRU). The AP may comprise: a transmit/receive unit configured to receive a setup message indicating a context for the WTRU that is not being served wirelessly by the AP; and a processor configured to setup the received context.

In at least one embodiment, a method for managing a Local IP Access (LIPA) session for a Wireless Transmit/Receive Unit (WTRU) moving out of a local network in idle mode is disclosed. The method may comprise: receiving, by a network entity, a first message; determining, by the network entity, whether or not to maintain the LIPA session based on the received first message, as a determined result; and sending, by the network entity, a second message to maintain or to terminate the LIPA session in accordance with the determined result.

In at least one embodiment, a network entity is configured to manage a Local IP Access (LIPA) session for a Wireless Transmit/Receive Unit (WTRU) moving out of a local network in idle mode. The NE may comprise: a transmit/receive unit configured to receive a first message; and a processor configured to determine whether or not to maintain the LIPA session based on the received first message, as a determined result, wherein the transmit/receive unit is configured to send a second message to maintain or to terminate the LIPA session in accordance with the determined result.

What is claimed is:

1. A method for handover of a Wireless Transmitter/Receiver Unit (WTRU) moving between a local network and another network using first and second Access Points (APs), the WTRU having established a communication session, as a Local IP access (LIPA) session, in the local network via the first AP, wherein the established communication session is sent over a first communication path between a local gateway and the first AP, the method comprising:
    establishing, by the first AP, a second communication path at least between the first AP, as an entry point for the WTRU to the local network, and the second AP, as an entry point for the WTRU to the other network;
    receiving, by the first AP, packets that are associated with the communication session via the first communication path; and
    sending, by the first AP, based on an indication sent by a network entity, the packets that are associated with the communication session: (1) via the established second communication path, from the first AP via the second AP towards the WTRU; or (2) via a wireless communication path, from the first AP towards the WTRU, the wireless communication path, the first communication path and the second communication path being different from one another,
    wherein:
        the first AP provides access to the local network for the WTRU on condition that the packets that are associated with the communication session are sent via the wireless communication path, and
        the first AP does not provide access to the local network on condition that the packets that are associated with the communication session are sent via the second communication path.

2. The method of claim 1, further comprising handing over the communication session by the first AP to the second AP including:
    maintaining, by the first AP, at least one wireless resource between the first AP and the WTRU prior to handover of the communication session; and discontinuing, by the first AP, the at least one wireless resource between the first AP and the WTRU.

3. The method of claim 2, wherein the discontinuing of the at least one wireless resource between the first AP and the WTRU occurs: (1) at the same time as discontinuing of the LIPA session; (2) after transitioning to a Managed Remote Access (MRA) session based on a trigger condition; or (3) at a predetermined time after the transitioning to the MRA session.

4. The method of claim 1, further comprising handing over the communication session by the first AP to the second AP including discontinuing, by the first AP, at least one wireless resource between the first AP and the WTRU while maintaining a connection with at least one gateway disposed outside of the local network and the other network.

5. The method of claim 1, further comprising:
receiving, by the first AP, a setup message indicating a context for the WTRU that is not being served wirelessly by the first AP; and
setting up, by the first AP, the received context.

6. The method of claim 1, wherein:
the second AP provides access to the other network for the WTRU on condition that the packets that are associated with the communication session are sent via the second communication path, and
the second AP does not provide access to the other network on condition that the packets that are associated with the communication session are sent via the wireless communication path.

7. A method for handover of a Wireless Transmitter/Receiver Unit (WTRU) moving between a local network and another network using first and second Access Points (APs), the WTRU having established a communication session, as a Local IP access (LIPA) session, in the local network via the first AP, the method comprising:
handing over, by the first AP to the second AP, the communication session with the WTRU, a communication path being established at least between the first AP and the second AP; and
relaying, by the first AP, packets that are associated with the communication session via the established communication path towards the second AP,
wherein the handing over of the communication session includes:
maintaining, by the first AP, the at least one wireless resource between the first AP and the WTRU prior to the handover of the communication session including maintaining at least one radio bearer between the first AP and the WTRU; and
discontinuing, by the first AP, the at least one wireless resource between the first AP and WTRU including:
maintaining, by the first AP, established resources with one or more gateways associated with the WTRU, and
deactivating the at least one wireless resource that was used for the WTRU.

8. A method for handover of a Wireless Transmitter/Receiver Unit (WTRU) moving between a local network and another network using first and second Access Points (APs), the WTRU having established a communication session, as a Local IP access (LIPA) session, in the local network via the first AP, the method comprising:
handing over, by the first AP to the second AP, the communication session with the WTRU, a communication path being established at least between the first AP and the second AP;
setting, at the first AP, a context for managing the WTRU that is being wirelessly served by the second AP;
preventing, by the first AP, any allocation of radio resources of the first AP for the WTRU while the context is set; and
relaying, by the first AP, packets that are associated with the communication session via the established communication path towards the second AP.

9. A method for handover of a Wireless Transmitter/Receiver Unit (WTRU) moving between a local network and another network, the WTRU having established a communication session, as a Managed Remote access (MRA) session, in the other network using a first communication path between a local gateway in the local network and a first access point (AP) in the local network and a second communication path between the first AP in the local network and a second AP in the other network, the second AP wirelessly serving the WTRU, the method comprising:
establishing at least one radio bearer between the first AP and the WTRU;
receiving, by the first AP from the local gateway, packets that are associated with the communication session via the first communication path;
sending, by the first AP based on an indication sent by a network entity, the received packets that are associated with the communication session: (1) via the second communication path from the first AP via the second AP towards the WTRU for the established MRA session; or (2) via a wireless communication path from the first AP, as an entry point for the WTRU to the local network, towards the WTRU using the established at least one radio bearer between the first AP and the WTRU to transition the MRA session between the second AP, as an entry point for the WTRU to the other network, and the WTRU in the other network to a Local IP access (LIPA) session in the local network, the first communication path, the second communication path and the wireless communication path being different from one another; and
updating, at the first AP, an MRA context for managing the WTRU that is being wirelessly served by the second AP to a second context for the first AP to wirelessly serve the WTRU.

10. The method of claim 9, further comprising transitioning the established MRA session to the LIPA session by terminating, by the first AP, the sending of the packets that are associated with the communication session via the second communication path such that the terminating of the sending of the packets occurs: (1) at the same time as the transitioning of the MRA session to the LIPA session; (2) after the transitioning to the LIPA session based on a trigger condition; or (3) at a predetermined time after the transitioning of the MRA session to the LIPA session.

11. An access point (AP) for handover of a Wireless Transmitter/Receiver Unit (WTRU) moving between a local network and another network, the WTRU having established a communication session, as a Local IP access (LIPA) session, in the local network via the AP wirelessly serving the WTRU, wherein the established communication session is sent over a first communication path between a local gateway and the AP, the AP being an entry point for the WTRU to the local network, comprising:
a send/receive unit configured to:
receive packets that are associated with the communication session via the first communication path;
send packets that are associated with the communication session based on an indication sent by a network entity: (1) from the AP via a second AP towards the WTRU using a second communication path established at least between the AP and the second AP; or (2) from the AP via a wireless communication path towards the WTRU, the wireless communication path, the first communication path and the second communication path being different being different from one another, the second AP being an entry point for the WTRU to the other network, wherein:

the AP provides access to the local network for the WTRU on condition that the packets that are associated with the communication session are sent via the wireless communication path, and the AP does not provide access to the local network on condition that the packets that are associated with the communication session are sent via the second communication path; and a controller configured to:
hand over to the second AP, the communication session with the WTRU.

12. The AP of claim 11, wherein the controller is configured to discontinue at least one wireless resource between the AP and the WTRU: (1) at the same time as a discontinuation of the LIPA session; (2) after a transition to a Managed Remote access (MRA) session based on a trigger condition; or (3) at a predetermined time after the transition to the MRA session.

13. The AP of claim 11, wherein the controller is configured to discontinue at least one wireless resource between the AP and the WTRU while maintaining a connection with at least one gateway disposed outside of the local network and the other network.

14. An access point (AP) for handover of a Wireless Transmitter/Receiver Unit (WTRU) moving between a local network and another network, the WTRU having established a communication session, as a Local IP access (LIPA) session, in the local network via the AP wirelessly serving the WTRU, comprising:

a send/receive unit configured to relay packets that are associated with the communication session towards a second AP via a communication path established at least between the AP and the second AP; and a controller configured to hand over to the second AP, the communication session with the WTRU, wherein:
the send/receive unit is configured to receive a Managed Remote Access (MRA) context for managing the WTRU that is being wirelessly served by the second AP, and the controller is configured to prevent any allocation of radio resources of the AP for the WTRU in accordance with the received MRA context.

* * * * *

UNITED STATES PATENT AND TRADEMARK OFFICE
CERTIFICATE OF CORRECTION

PATENT NO.       : 9,713,039 B2
APPLICATION NO.  : 13/626957
DATED            : July 18, 2017
INVENTOR(S)      : Mahmoud Watfa et al.

Page 1 of 1

It is certified that error appears in the above-identified patent and that said Letters Patent is hereby corrected as shown below:

In the Claims

In Claim 15, Column 53, Line 7, change "path being different being different" to --path being different--.

Signed and Sealed this
Second Day of October, 2018

Andrei Iancu
*Director of the United States Patent and Trademark Office*